US012809061B2

(12) United States Patent
Hart et al.

(10) Patent No.: US 12,809,061 B2
(45) Date of Patent: Nov. 24, 2026

(54) ARTICLES WITH THIN, DURABLE ANTI-REFLECTION COATINGS WITH EXTENDED INFRARED TRANSMISSION

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1125 days.

(21) Appl. No.: 17/852,452

(22) Filed: Jun. 29, 2022

(65) Prior Publication Data

US 2023/0010461 A1 Jan. 12, 2023

Related U.S. Application Data

(60) Provisional application No. 63/217,967, filed on Jul. 2, 2021.

(51) Int. Cl.
*G02B 1/115* (2015.01)
*G02B 1/14* (2015.01)
*G02B 5/02* (2006.01)

(52) U.S. Cl.
CPC ............ *G02B 1/115* (2013.01); *G02B 5/0278* (2013.01); *G02B 5/0294* (2013.01)

(58) Field of Classification Search
CPC ............................ G02B 1/11–118; G02B 1/14
See application file for complete search history.

(56) References Cited

U.S. PATENT DOCUMENTS 3,067,021 A 12/1962 Pelley et al.
3,150,032 A 9/1964 Rubenstein
(Continued)

FOREIGN PATENT DOCUMENTS

AU 199540318 8/1996
AU 07667/73 B2 10/2003
(Continued)

OTHER PUBLICATIONS

Radhakrishnan et al., "Order parameters in molecular simulations", Handbook of Materials Modeling, Chapter 6, 2005, pp. 1613-1626.
(Continued)

*Primary Examiner* — Ryan S Dunning
(74) *Attorney, Agent, or Firm* — William J. Tucker

(57) ABSTRACT

An article is described that includes: a substrate having opposing major surfaces; and an optical film structure in direct contact with a first major surface and comprising a physical thickness from ~50 nm to less than 500 nm, high refractive index (RI) and low RI layers with a first low RI layer directly on the first major surface, and a capping low RI layer. The high and low RI layers total three (3) layers to nine (9) layers, wherein each low RI layer and the capping low RI layer comprises a silicon-containing oxide and each high RI layer comprises a silicon-containing nitride or oxynitride. The article exhibits a Berkovich maximum hardness of 8 GPa or greater measured over an indentation depth ≥~50 nm. The article exhibits a two-side average transmittance >85% at infrared wavelengths from 840 to 860 nm and from 930 to 950 nm at 0° incidence.

23 Claims, 18 Drawing Sheets

(56) References Cited

U.S. PATENT DOCUMENTS

| | | | |
|---|---|---|---|
| 3,413,058 | A | 11/1968 | Fang et al. |
| 3,922,068 | A | 11/1975 | Toshio |
| 3,934,961 | A | 1/1976 | Toh et al. |
| 3,989,350 | A | 11/1976 | Cohen et al. |
| 4,033,667 | A | 7/1977 | Fleming, Jr. |
| 4,137,365 | A | 1/1979 | Fletcher et al. |
| 4,298,366 | A | 11/1981 | Dabby et al. |
| 4,310,595 | A | 1/1982 | Beall et al. |
| 4,423,925 | A | 1/1984 | Dabby et al. |
| 4,495,684 | A | 1/1985 | Sander et al. |
| 4,504,519 | A | 3/1985 | Zelez |
| 4,519,966 | A | 5/1985 | Aldinger et al. |
| 4,537,814 | A | 8/1985 | Itoh et al. |
| 4,568,140 | A | 2/1986 | van der Werf et al. |
| 4,571,519 | A | 2/1986 | Kawabata et al. |
| 4,579,765 | A | 4/1986 | Schachtner |
| 4,687,707 | A | 8/1987 | Matsuo et al. |
| 4,705,356 | A | 11/1987 | Berning et al. |
| 4,797,316 | A | 1/1989 | Hecq et al. |
| 4,826,734 | A | 5/1989 | Jackson et al. |
| 4,851,095 | A | 7/1989 | Scobey et al. |
| 4,896,928 | A | 1/1990 | Perilloux et al. |
| 4,946,923 | A | 8/1990 | Nagata et al. |
| 4,995,684 | A | 2/1991 | Tustison et al. |
| 5,071,206 | A | 12/1991 | Hood et al. |
| 5,138,219 | A | 8/1992 | Krisl et al. |
| 5,178,911 | A | 1/1993 | Gordon et al. |
| 5,210,253 | A | 5/1993 | Kinami et al. |
| 5,234,769 | A | 8/1993 | Shevlin |
| 5,268,217 | A | 12/1993 | Kimock et al. |
| 5,300,951 | A | 4/1994 | Yamazaki |
| 5,332,888 | A | 7/1994 | Tausch et al. |
| 5,390,274 | A | 2/1995 | Toyoda et al. |
| 5,393,574 | A | 2/1995 | Sulzbach |
| 5,399,387 | A | 3/1995 | Law et al. |
| 5,470,606 | A | 11/1995 | De Boer |
| 5,478,634 | A | 12/1995 | Setoyama et al. |
| 5,503,912 | A | 4/1996 | Setoyama et al. |
| 5,506,038 | A | 4/1996 | Knapp et al. |
| 5,508,092 | A | 4/1996 | Kimock et al. |
| 5,549,953 | A | 8/1996 | Li |
| 5,567,363 | A | 10/1996 | Jung et al. |
| 5,597,622 | A | 1/1997 | Zoeller et al. |
| 5,618,619 | A | 4/1997 | Petrmichl et al. |
| 5,635,245 | A | 6/1997 | Kimock et al. |
| 5,637,353 | A | 6/1997 | Kimock et al. |
| 5,643,638 | A | 7/1997 | Otto et al. |
| 5,718,773 | A | 2/1998 | Shiozaki |
| 5,719,705 | A | 2/1998 | Machol |
| 5,737,472 | A | 4/1998 | Bernasson et al. |
| 5,766,783 | A | 6/1998 | Utsumi et al. |
| 5,772,862 | A | 6/1998 | Ando et al. |
| 5,773,148 | A | 6/1998 | Charrue et al. |
| 5,811,191 | A | 9/1998 | Neuman |
| 5,846,650 | A | 12/1998 | Ko et al. |
| 5,935,716 | A | 8/1999 | McCurdy et al. |
| 5,938,898 | A | 8/1999 | Ando et al. |
| 6,045,894 | A | 4/2000 | Jonza et al. |
| 6,046,855 | A | 4/2000 | Goto |
| 6,074,730 | A | 6/2000 | Laird et al. |
| 6,077,569 | A | 6/2000 | Knapp et al. |
| 6,088,166 | A | 7/2000 | Lee |
| 6,114,043 | A | 9/2000 | Joret |
| 6,129,980 | A | 10/2000 | Tsukada et al. |
| 6,132,650 | A | 10/2000 | Nakamura |
| 6,165,598 | A | 12/2000 | Nelson |
| 6,166,125 | A | 12/2000 | Sugiyama et al. |
| 6,172,812 | B1 | 1/2001 | Haaland et al. |
| 6,174,599 | B1 | 1/2001 | Boire et al. |
| 6,208,389 | B1 | 3/2001 | Aben et al. |
| 6,217,272 | B1 | 4/2001 | Felsenthal et al. |
| 6,219,121 | B1 | 4/2001 | Sahouani et al. |
| RE37,183 | E | 5/2001 | Kawamura et al. |
| 6,238,781 | B1 | 5/2001 | Anderson et al. |
| 6,250,758 | B1 | 6/2001 | Yoshihara et al. |
| 6,254,913 | B1 | 7/2001 | Wadsworth et al. |
| 6,267,915 | B1 | 7/2001 | Park et al. |
| 6,286,965 | B1 | 9/2001 | Caskey et al. |
| 6,303,225 | B1 | 10/2001 | Veerasamy |
| 6,337,771 | B1 | 1/2002 | Chu et al. |
| 6,338,901 | B1 | 1/2002 | Veerasamy |
| 6,340,404 | B1 | 1/2002 | Oka et al. |
| 6,344,288 | B1 | 2/2002 | Oyama et al. |
| 6,355,334 | B1 | 3/2002 | Rondeau et al. |
| 6,355,344 | B1 | 3/2002 | Mamish et al. |
| 6,391,400 | B1 | 5/2002 | Russell et al. |
| 6,395,333 | B2 | 5/2002 | Veerasamy |
| 6,416,872 | B1 | 7/2002 | Maschwitz |
| 6,495,251 | B1 | 12/2002 | Arbab et al. |
| 6,503,557 | B1 | 1/2003 | Joret |
| 6,521,677 | B2 | 2/2003 | Yashiro et al. |
| 6,524,714 | B1 | 2/2003 | Neuman et al. |
| 6,535,333 | B1 | 3/2003 | Piepel et al. |
| 6,570,709 | B2 | 5/2003 | Katayama et al. |
| 6,572,990 | B1 | 6/2003 | Oyama et al. |
| 6,580,512 | B1 | 6/2003 | Hussey et al. |
| 6,583,935 | B1 | 6/2003 | Saif et al. |
| 6,596,368 | B1 | 7/2003 | Liebig et al. |
| 6,605,358 | B1 | 8/2003 | Stachowiak |
| 6,652,974 | B1 | 11/2003 | Krisko |
| 6,707,610 | B1 | 3/2004 | Woodard et al. |
| 6,723,423 | B1 | 4/2004 | Kaneko et al. |
| 6,730,352 | B2 | 5/2004 | Stachowiak |
| 6,743,516 | B2 | 6/2004 | Murphy et al. |
| 6,746,775 | B1 | 6/2004 | Boire et al. |
| 6,783,253 | B2 | 8/2004 | Thomsen et al. |
| 6,785,468 | B2 | 8/2004 | Takasaki et al. |
| 6,813,096 | B2 | 11/2004 | Ohta |
| 6,824,709 | B2 | 11/2004 | Shundo |
| 6,838,179 | B1 | 1/2005 | Legrand |
| 6,846,599 | B2 | 1/2005 | Ide |
| 6,862,139 | B2 | 3/2005 | Chang et al. |
| 6,875,468 | B2 | 4/2005 | Kunz et al. |
| 6,908,480 | B2 | 6/2005 | Jayaraman |
| 6,924,037 | B1 | 8/2005 | Joret et al. |
| 6,950,236 | B2 | 9/2005 | Hokazono et al. |
| 6,986,857 | B2 | 1/2006 | Klemm et al. |
| 6,998,177 | B2 | 2/2006 | Krzyzak et al. |
| 7,005,188 | B2 | 2/2006 | Anderson et al. |
| 7,018,727 | B2 | 3/2006 | Dzick |
| 7,037,573 | B2 | 5/2006 | Miyatake et al. |
| 7,055,954 | B2 | 6/2006 | Marechal |
| 7,122,253 | B2 | 10/2006 | Yamaguchi et al. |
| 7,128,428 | B2 | 10/2006 | Takahashi et al. |
| 7,149,032 | B2 | 12/2006 | Ohishi et al. |
| 7,156,533 | B2 | 1/2007 | Hoeing |
| 7,166,360 | B2 | 1/2007 | Coustet et al. |
| 7,171,676 | B2 | 1/2007 | Takeda et al. |
| 7,189,456 | B2 | 3/2007 | King |
| 7,229,684 | B2 | 6/2007 | Enniss et al. |
| 7,253,861 | B2 | 8/2007 | Niiyama et al. |
| 7,264,866 | B2 | 9/2007 | Hashimoto et al. |
| 7,332,213 | B2 | 2/2008 | Mimura et al. |
| 7,351,447 | B2 | 4/2008 | Nishida et al. |
| 7,371,439 | B2 | 5/2008 | Matsunaga et al. |
| 7,371,786 | B2 | 5/2008 | Yoshihara et al. |
| 7,378,146 | B1 | 5/2008 | Hedrick et al. |
| 7,381,469 | B2 | 6/2008 | Moelle et al. |
| 7,390,099 | B2 | 6/2008 | Takao et al. |
| 7,405,005 | B2 | 7/2008 | Watanabe |
| 7,410,686 | B2 | 8/2008 | Osada et al. |
| 7,426,328 | B2 | 9/2008 | Zhou et al. |
| 7,498,058 | B2 | 3/2009 | Harris et al. |
| 7,521,123 | B2 | 4/2009 | Hattori et al. |
| 7,541,102 | B2 | 6/2009 | Klippe et al. |
| 7,542,207 | B2 | 6/2009 | Matsunaga |
| 7,569,269 | B2 | 8/2009 | Takada et al. |
| 7,604,358 | B2 | 10/2009 | Ninomiya et al. |
| 7,629,400 | B2 | 12/2009 | Hyman |
| 7,643,719 | B1 | 1/2010 | Zhou et al. |
| 7,645,502 | B2 | 1/2010 | Mikami et al. |
| 7,655,298 | B2 | 2/2010 | Thies et al. |
| 7,724,241 | B2 | 5/2010 | Fukui et al. |
| 7,736,728 | B2 | 6/2010 | Loboda et al. |

(56) References Cited

U.S. PATENT DOCUMENTS

| | | | |
|---|---|---|---|
| 7,736,824 | B2 | 6/2010 | Yoshikawa et al. |
| 7,737,633 | B2 | 6/2010 | Zheng |
| 7,796,123 | B1 | 9/2010 | Irvin et al. |
| 7,799,732 | B2 | 9/2010 | Tanaka et al. |
| 7,903,340 | B2 | 3/2011 | Nagahama et al. |
| 7,910,215 | B2 | 3/2011 | Reymond et al. |
| 7,926,939 | B2 | 4/2011 | Kato et al. |
| 7,973,892 | B2 | 7/2011 | Lim |
| 7,978,402 | B2 | 7/2011 | Sweeney et al. |
| 8,026,021 | B2 | 9/2011 | Stumpe et al. |
| 8,062,731 | B2 | 11/2011 | Takada et al. |
| 8,062,749 | B2 | 11/2011 | Shelestak et al. |
| 8,067,094 | B2 | 11/2011 | Benson et al. |
| 8,088,502 | B2 | 1/2012 | Martin et al. |
| 8,110,278 | B2 | 2/2012 | Hsu et al. |
| 8,118,896 | B2 | 2/2012 | Can et al. |
| 8,124,215 | B2 | 2/2012 | Takao et al. |
| 8,187,671 | B2 | 5/2012 | Sol |
| 8,236,433 | B2 | 8/2012 | Chiu et al. |
| 8,273,801 | B2 | 9/2012 | Baikerikar et al. |
| 8,304,055 | B2 | 11/2012 | Haga et al. |
| 8,304,078 | B2 | 11/2012 | Varshneya |
| 8,312,739 | B2 | 11/2012 | Lee et al. |
| 8,325,418 | B2 | 12/2012 | Nagahama et al. |
| 8,360,574 | B2 | 1/2013 | Ishak et al. |
| 8,383,214 | B2 | 2/2013 | Schaepkens et al. |
| 8,400,592 | B2 | 3/2013 | Hirakata et al. |
| 8,409,716 | B2 | 4/2013 | Schultz et al. |
| 8,425,035 | B2 | 4/2013 | Von Blanckenhagen |
| 8,432,611 | B1 | 4/2013 | Wach |
| 8,445,112 | B2 | 5/2013 | Di Stefano |
| 8,446,673 | B2 | 5/2013 | Yoshihara |
| 8,460,804 | B2 | 6/2013 | Henn et al. |
| 8,508,703 | B2 | 8/2013 | Lee et al. |
| 8,514,351 | B2 | 8/2013 | Sasaki et al. |
| 8,561,429 | B2 | 10/2013 | Allan et al. |
| 8,568,890 | B2 | 10/2013 | Murata et al. |
| 8,628,896 | B2 | 1/2014 | Ikeda et al. |
| 8,679,631 | B2 | 3/2014 | Murata |
| 8,691,351 | B2 | 4/2014 | Asakura et al. |
| 8,746,880 | B2 | 6/2014 | Fukagawa et al. |
| 8,753,744 | B2 | 6/2014 | Borrelli et al. |
| 8,784,933 | B2 | 7/2014 | Krzyak et al. |
| 8,822,018 | B2 | 9/2014 | Thoumazet et al. |
| 8,840,257 | B2 | 9/2014 | Kawagishi et al. |
| 8,842,365 | B2 | 9/2014 | Koike et al. |
| 8,845,172 | B2 | 9/2014 | Jang et al. |
| 8,854,623 | B2 | 10/2014 | Fontaine et al. |
| 8,888,965 | B2 | 11/2014 | Kuppuswamy et al. |
| 9,023,457 | B2 | 5/2015 | Carrilero et al. |
| 9,041,885 | B2 | 5/2015 | Weber et al. |
| 9,042,019 | B2 | 5/2015 | Su et al. |
| 9,051,404 | B2 | 6/2015 | Jiang et al. |
| 9,051,423 | B2 | 6/2015 | Qiu |
| 9,079,802 | B2 | 7/2015 | Bellman et al. |
| 9,102,131 | B2 | 8/2015 | Derks et al. |
| 9,110,230 | B2 | 8/2015 | Koch et al. |
| 9,158,044 | B2 | 10/2015 | Akiyama et al. |
| 9,249,049 | B2 | 2/2016 | Fujii |
| 9,263,202 | B2 | 2/2016 | Lee et al. |
| 9,296,648 | B2 | 3/2016 | Henn et al. |
| 9,316,885 | B2 | 4/2016 | Lo et al. |
| 9,335,444 | B2 | 5/2016 | Hart et al. |
| 9,359,261 | B2 | 6/2016 | Bellman et al. |
| 9,366,784 | B2 | 6/2016 | Bellman et al. |
| 9,400,420 | B2 | 7/2016 | Pudleiner et al. |
| 9,411,180 | B2 | 8/2016 | Gollier et al. |
| 9,418,193 | B2 | 8/2016 | Dowski et al. |
| 9,535,280 | B2 | 1/2017 | Borrelli et al. |
| 9,550,161 | B2 | 1/2017 | Arfsten et al. |
| 9,573,842 | B2 | 2/2017 | Gollier et al. |
| 9,574,262 | B2 | 2/2017 | Henn et al. |
| 9,581,731 | B2 | 2/2017 | Bookbinder et al. |
| 9,588,263 | B2 | 3/2017 | Gollier et al. |
| 9,651,720 | B2 | 5/2017 | Lander et al. |
| 9,663,400 | B2 | 5/2017 | O'Malley et al. |
| 9,684,097 | B2 | 6/2017 | Koch et al. |
| 9,701,248 | B2 | 7/2017 | Neuman et al. |
| 9,701,579 | B2 | 7/2017 | Gollier et al. |
| 9,703,011 | B2 | 7/2017 | Adib et al. |
| 9,718,249 | B2 | 8/2017 | Kwong |
| 9,726,786 | B2 | 8/2017 | Hart et al. |
| 9,766,376 | B2 | 9/2017 | Ho et al. |
| 9,786,194 | B2 | 10/2017 | Hyman |
| 9,790,593 | B2 | 10/2017 | Adib et al. |
| 9,823,209 | B2 | 11/2017 | Yu et al. |
| 9,880,328 | B2 | 1/2018 | Gollier et al. |
| 9,896,596 | B2 | 2/2018 | Jung et al. |
| 9,939,557 | B2 | 4/2018 | David et al. |
| 9,957,609 | B2 | 5/2018 | Lee et al. |
| 9,964,773 | B2 | 5/2018 | Wang |
| 9,987,820 | B2 | 6/2018 | Mehlmann et al. |
| 10,162,084 | B2 | 12/2018 | Hart et al. |
| 10,183,889 | B2 | 1/2019 | Gollier et al. |
| 10,416,352 | B2 | 9/2019 | Hart et al. |
| 10,444,408 | B2 | 10/2019 | Bellman et al. |
| 10,451,773 | B2 | 10/2019 | Hart et al. |
| 10,613,340 | B2 | 4/2020 | Borrelli et al. |
| 10,698,151 | B2 | 6/2020 | Hamilton et al. |
| 10,899,661 | B2 | 1/2021 | Gollier et al. |
| 10,921,492 | B2 | 2/2021 | Gregorski et al. |
| 10,948,629 | B2 | 3/2021 | Hart et al. |
| 11,971,519 | B2 | 4/2024 | Hart |
| 2001/0002295 | A1 | 5/2001 | Anderson et al. |
| 2001/0016262 | A1 | 8/2001 | Toyoshima et al. |
| 2001/0017452 | A1 | 8/2001 | Bernard |
| 2001/0031365 | A1 | 10/2001 | Anderson et al. |
| 2002/0009593 | A1 | 1/2002 | Veerasamy |
| 2002/0017452 | A1 | 2/2002 | Zimmermann et al. |
| 2002/0051274 | A1 | 5/2002 | Kim et al. |
| 2002/0051294 | A1 | 5/2002 | Katayama et al. |
| 2002/0085284 | A1 | 7/2002 | Nakamura et al. |
| 2002/0090507 | A1 | 7/2002 | Barth et al. |
| 2002/0136908 | A1 | 9/2002 | Komatsu et al. |
| 2002/0167629 | A1 | 11/2002 | Blanchard |
| 2003/0019363 | A1 | 1/2003 | Grover et al. |
| 2003/0031879 | A1 | 2/2003 | Neuman et al. |
| 2003/0035044 | A1 | 2/2003 | Nakayama et al. |
| 2003/0044652 | A1 | 3/2003 | Wang |
| 2003/0116270 | A1 | 6/2003 | Hawa et al. |
| 2003/0116872 | A1 | 6/2003 | Klemm et al. |
| 2003/0179454 | A1 | 9/2003 | Thomsen et al. |
| 2003/0193636 | A1 | 10/2003 | Allen et al. |
| 2003/0234460 | A1 | 12/2003 | Hayashi et al. |
| 2004/0004778 | A1 | 1/2004 | Liu et al. |
| 2004/0005482 | A1 | 1/2004 | Kobayashi et al. |
| 2004/0065968 | A1 | 4/2004 | Klemm et al. |
| 2004/0147185 | A1 | 7/2004 | Decroupet |
| 2004/0184765 | A1 | 9/2004 | DiFrancesco et al. |
| 2004/0188874 | A1 | 9/2004 | Hikita et al. |
| 2004/0195960 | A1 | 10/2004 | Czeremuszkin et al. |
| 2004/0233174 | A1 | 11/2004 | Robrecht et al. |
| 2004/0258947 | A1 | 12/2004 | Moelle et al. |
| 2005/0007019 | A1 | 1/2005 | Kim et al. |
| 2005/0008863 | A1 | 1/2005 | Mimura et al. |
| 2005/0012569 | A1 | 1/2005 | Sasaki |
| 2005/0074591 | A1 | 4/2005 | Zagdoun |
| 2005/0084705 | A1 | 4/2005 | Klippe et al. |
| 2005/0123772 | A1 | 6/2005 | Coustet et al. |
| 2005/0196632 | A1 | 9/2005 | Maschwitz et al. |
| 2005/0233091 | A1 | 10/2005 | Kumar et al. |
| 2005/0263775 | A1 | 12/2005 | Ikeda et al. |
| 2005/0287309 | A1 | 12/2005 | Veerasamy |
| 2006/0008654 | A1 | 1/2006 | Veerasamy |
| 2006/0008655 | A1 | 1/2006 | Butz et al. |
| 2006/0008656 | A1 | 1/2006 | Veerasamy |
| 2006/0017707 | A1 | 1/2006 | Fukui et al. |
| 2006/0019119 | A1 | 1/2006 | Spitsberg et al. |
| 2006/0093833 | A1 | 5/2006 | Meyer et al. |
| 2006/0115651 | A1 | 6/2006 | Merfeld et al. |
| 2006/0134436 | A1 | 6/2006 | Maschwitz |
| 2006/0139783 | A1 | 6/2006 | Decroupet |
| 2006/0152801 | A1 | 7/2006 | Matsunaga |
| 2006/0153979 | A1 | 7/2006 | Asakura et al. |

(56) References Cited

U.S. PATENT DOCUMENTS

2006/0154044 A1 7/2006 Yamada et al.
2006/0165963 A1 7/2006 Fleury et al.
2006/0197096 A1 9/2006 Kerdiles et al.
2006/0222863 A1 10/2006 Nadaud et al.
2006/0240266 A1 10/2006 Schicht et al.
2006/0274047 A1 12/2006 Spath et al.
2006/0274048 A1 12/2006 Spath et al.
2006/0286465 A1 12/2006 Kim
2007/0014981 A1 1/2007 Chiang et al.
2007/0018671 A1 1/2007 Steck, Jr.
2007/0018871 A1 1/2007 Riley
2007/0030569 A1 2/2007 Lu et al.
2007/0063147 A1 3/2007 Yamazaki et al.
2007/0097509 A1 5/2007 Nevitt et al.
2007/0128528 A1 6/2007 Hess et al.
2007/0141357 A1 6/2007 Bekiarian et al.
2007/0146887 A1 6/2007 Ikeda et al.
2007/0152985 A1 7/2007 Ostergaard et al.
2007/0166536 A1 7/2007 Dollase et al.
2007/0188871 A1 8/2007 Fleury et al.
2007/0237918 A1 10/2007 Jonza et al.
2007/0240804 A1 10/2007 Arai et al.
2007/0247567 A1 10/2007 Sato et al.
2007/0249789 A1 10/2007 Buehler et al.
2007/0266896 A1 11/2007 Suwa et al.
2007/0285776 A1 12/2007 Nakamura et al.
2008/0024867 A1 1/2008 Kawashima et al.
2008/0032157 A1 2/2008 Koeckert et al.
2008/0138606 A1 6/2008 Yoshihara et al.
2008/0191463 A1 8/2008 Vermeulen et al.
2008/0239488 A1 10/2008 Asakura et al.
2008/0241523 A1 10/2008 Huignard et al.
2009/0004462 A1 1/2009 Zhang et al.
2009/0017314 A1 1/2009 Nadaud et al.
2009/0023254 A1 1/2009 Lim et al.
2009/0040440 A1 2/2009 Park
2009/0051668 A1 2/2009 Cheng
2009/0052041 A1 2/2009 Watanabe et al.
2009/0086778 A1 4/2009 Kameyama et al.
2009/0086783 A1 4/2009 Kameyama et al.
2009/0104385 A1 4/2009 Reymond et al.
2009/0109537 A1 4/2009 Bright et al.
2009/0135492 A1 5/2009 Kusuda et al.
2009/0141357 A1 6/2009 Kamura et al.
2009/0155490 A1 6/2009 Bicker et al.
2009/0178704 A1 7/2009 Kalejs et al.
2009/0195865 A1 8/2009 Kleideiter et al.
2009/0197048 A1 8/2009 Amin et al.
2009/0217968 A1 9/2009 Joshi et al.
2009/0223437 A1 9/2009 Ballard
2009/0268299 A1 10/2009 Furui et al.
2009/0297877 A1 12/2009 Chang et al.
2009/0298669 A1 12/2009 Akiba et al.
2009/0324844 A1 12/2009 Haoto et al.
2010/0009154 A1 1/2010 Allan et al.
2010/0027383 A1 2/2010 Suzuki et al.
2010/0028607 A1 2/2010 Lee et al.
2010/0047521 A1 2/2010 Amin et al.
2010/0060979 A1 3/2010 Harris et al.
2010/0062217 A1 3/2010 Kurematsu
2010/0062245 A1 3/2010 Martin et al.
2010/0119486 A1 5/2010 Sakamoto et al.
2010/0127154 A1 5/2010 Kameyama
2010/0130348 A1 5/2010 Kang et al.
2010/0149483 A1 6/2010 Chiavetta, III
2010/0167019 A1 7/2010 Ohyanagi et al.
2010/0177380 A1 7/2010 Nagahama et al.
2010/0177398 A1 7/2010 Watanabe et al.
2010/0182551 A1 7/2010 Tochigi et al.
2010/0183857 A1 7/2010 Nouvelot et al.
2010/0195311 A1 8/2010 Furui et al.
2010/0196650 A1 8/2010 Okawa et al.
2010/0196685 A1 8/2010 Murata et al.
2010/0215950 A1 8/2010 Schultz et al.
2010/0238384 A1 9/2010 Tochigi et al.
2010/0247745 A1 9/2010 Rudmann et al.
2010/0258752 A1 10/2010 Mochizuki et al.
2010/0272990 A1 10/2010 Bondesan et al.
2010/0291353 A1 11/2010 Dejneka et al.
2010/0304090 A1 12/2010 Henn et al.
2010/0311868 A1 12/2010 Bekiarian et al.
2010/0313875 A1 12/2010 Kennedy
2010/0316861 A1 12/2010 Kubler et al.
2010/0330350 A1 12/2010 Osada et al.
2011/0033635 A1 2/2011 Nishimoto et al.
2011/0033681 A1 2/2011 Adachi et al.
2011/0043719 A1 2/2011 Thunhorst et al.
2011/0064943 A1 3/2011 Wang
2011/0100424 A1 5/2011 Roche et al.
2011/0114160 A1 5/2011 Murashige et al.
2011/0120554 A1 5/2011 Chhajed et al.
2011/0128664 A1 6/2011 Coue et al.
2011/0129287 A1 6/2011 Lecoutre
2011/0151173 A1 6/2011 Ramadas et al.
2011/0157703 A1 6/2011 Broadway et al.
2011/0177241 A1 7/2011 Lee et al.
2011/0235181 A1 9/2011 Hayashibe et al.
2011/0262742 A1 10/2011 Takeuchi et al.
2011/0262752 A1 10/2011 Bawendi et al.
2011/0262754 A1 10/2011 Zehentmaier et al.
2011/0290982 A1 12/2011 Boutami et al.
2011/0293929 A1 12/2011 Maschwitz
2011/0297979 A1 12/2011 Diana et al.
2012/0008217 A1 1/2012 Ishak et al.
2012/0013983 A1 1/2012 Chang et al.
2012/0027968 A1 2/2012 Chang et al.
2012/0040179 A1 2/2012 Dave
2012/0052271 A1 3/2012 Gomez et al.
2012/0057236 A1 3/2012 Broadway et al.
2012/0070603 A1 3/2012 Hsu
2012/0099188 A1 4/2012 Akozbek et al.
2012/0099323 A1 4/2012 Thompson
2012/0107607 A1 5/2012 Takaki et al.
2012/0113043 A1 5/2012 Liu et al.
2012/0135153 A1 5/2012 Osakabe et al.
2012/0154921 A1 6/2012 Yoshida et al.
2012/0196103 A1 8/2012 Murashige et al.
2012/0198888 A1 8/2012 Hasegawa et al.
2012/0212826 A1 8/2012 Henn et al.
2012/0219792 A1 8/2012 Yamamoto et al.
2012/0228641 A1 9/2012 Thoumazet et al.
2012/0235399 A1 9/2012 Lochbihler
2012/0247152 A1 10/2012 Ohara et al.
2012/0250135 A1 10/2012 Yeh et al.
2012/0250314 A1 10/2012 Maikowski et al.
2012/0251773 A1 10/2012 Krasnov et al.
2012/0268809 A1 10/2012 Guo et al.
2012/0270041 A1 10/2012 Matsumoto et al.
2012/0281292 A1 11/2012 Baca et al.
2012/0301676 A1 11/2012 Ushida et al.
2012/0321898 A1 12/2012 Meinhardt et al.
2012/0327568 A1 12/2012 Shedletsky et al.
2013/0013574 A1 1/2013 Wu
2013/0021669 A1 1/2013 Xi et al.
2013/0022798 A1 1/2013 Fukawa et al.
2013/0029118 A1 1/2013 Kishi et al.
2013/0057950 A1 3/2013 Lin et al.
2013/0058640 A1 3/2013 Taki
2013/0059137 A1 3/2013 Hevesi et al.
2013/0120842 A1 5/2013 Moens et al.
2013/0127202 A1 5/2013 Hart
2013/0128342 A1 5/2013 Mitarai et al.
2013/0135741 A1 5/2013 Lee et al.
2013/0135742 A1 5/2013 Fukagawa et al.
2013/0135750 A1 5/2013 Walker et al.
2013/0142994 A1 6/2013 Wang et al.
2013/0170044 A1 7/2013 Mont et al.
2013/0176615 A1 7/2013 Uefuji et al.
2013/0177751 A1 7/2013 Oh et al.
2013/0183489 A1 7/2013 Cremer et al.
2013/0187185 A1 7/2013 Deshazer et al.
2013/0189184 A1 7/2013 Lub et al.
2013/0209762 A1 8/2013 Damm et al.
2013/0260115 A1 10/2013 Suzuki et al.

(56) References Cited

U.S. PATENT DOCUMENTS

2013/0263784 A1 10/2013 Lee et al.
2013/0271836 A1 10/2013 Fukaya et al.
2013/0322270 A1 12/2013 Ko
2013/0334031 A1 12/2013 Lee et al.
2014/0022630 A1 1/2014 Reymond et al.
2014/0036175 A1 2/2014 Morishima et al.
2014/0049827 A1 2/2014 Fujii et al.
2014/0087101 A1 3/2014 Tixhon et al.
2014/0090864 A1 4/2014 Paulson
2014/0090974 A1 4/2014 Ballet et al.
2014/0091419 A1 4/2014 Hasegawa et al.
2014/0093711 A1 4/2014 Paulson
2014/0106141 A1 4/2014 Bellman et al.
2014/0106146 A1 4/2014 Decker et al.
2014/0106150 A1 4/2014 Decker et al.
2014/0111859 A1 4/2014 Duraes et al.
2014/0113083 A1 4/2014 Lee et al.
2014/0113120 A1 4/2014 Thiel
2014/0116329 A1 5/2014 Chaudhari
2014/0131091 A1 5/2014 Smith
2014/0139978 A1 5/2014 Kwong
2014/0154661 A1 6/2014 Bookbinder et al.
2014/0170765 A1 6/2014 Ockenfuss
2014/0174532 A1 6/2014 Stewart et al.
2014/0186615 A1 7/2014 An et al.
2014/0220327 A1 8/2014 Adib et al.
2014/0226208 A1 8/2014 Gyorgy
2014/0233104 A1 8/2014 Nagahama et al.
2014/0233106 A1 8/2014 Vergoehl et al.
2014/0247415 A1 9/2014 Kleptsyn
2014/0255616 A1 9/2014 Paulson
2014/0261615 A1 9/2014 Nair et al.
2014/0264321 A1 9/2014 Liang et al.
2014/0295330 A1 10/2014 Pruneri et al.
2014/0313441 A1 10/2014 Lim
2014/0320422 A1 10/2014 Williams et al.
2014/0320806 A1 10/2014 Cohen-Tannoudji et al.
2014/0334006 A1 11/2014 Adib et al.
2014/0335330 A1 11/2014 Bellman et al.
2014/0347722 A1 11/2014 Hevesi
2014/0353618 A1 12/2014 Shim et al.
2014/0362444 A1 12/2014 Paulson
2014/0368029 A1 12/2014 Park
2014/0370264 A1 12/2014 Ohara et al.
2014/0376094 A1 12/2014 Bellman et al.
2014/0377522 A1 12/2014 Koch et al.
2015/0002809 A1 1/2015 Cohen-Tannoudji et al.
2015/0037554 A1 2/2015 Gao et al.
2015/0043058 A1 2/2015 Saito
2015/0062695 A1 3/2015 Chu et al.
2015/0062710 A1 3/2015 Grillmayer et al.
2015/0079368 A1 3/2015 Koike et al.
2015/0079398 A1 3/2015 Amin et al.
2015/0083464 A1 3/2015 Zilbauer et al.
2015/0111725 A1 4/2015 Van et al.
2015/0116832 A1 4/2015 Kamiuto et al.
2015/0160376 A1 6/2015 Kohli et al.
2015/0174625 A1 6/2015 Hart et al.
2015/0177778 A1 6/2015 Chen et al.
2015/0185554 A1 7/2015 Zhao et al.
2015/0212245 A1 7/2015 Ueda
2015/0219798 A1 8/2015 Sonoda et al.
2015/0250237 A1 9/2015 Shoham et al.
2015/0253467 A1 9/2015 Sano
2015/0260888 A1 9/2015 Yoshihara et al.
2015/0284840 A1 10/2015 Henn et al.
2015/0293284 A1 10/2015 Tatemura
2015/0309628 A1 10/2015 Chen et al.
2015/0316442 A1 11/2015 Tamada et al.
2015/0322270 A1 11/2015 Amin et al.
2015/0323705 A1 11/2015 Hart et al.
2015/0323812 A1 11/2015 Ishak et al.
2015/0346403 A1 12/2015 Jidai et al.
2015/0355382 A1 12/2015 Henn et al.
2015/0376057 A1 12/2015 Koch et al.
2016/0002498 A1 1/2016 Maghsoodi et al.
2016/0011348 A1 1/2016 Hirakoso et al.
2016/0016845 A1 1/2016 Cho et al.
2016/0018576 A1 1/2016 Yamamoto et al.
2016/0041308 A1 2/2016 Kramer et al.
2016/0076135 A1 3/2016 Cheah et al.
2016/0083835 A1 3/2016 Adib et al.
2016/0137548 A1 5/2016 Cabral et al.
2016/0137873 A1 5/2016 Kostromine et al.
2016/0146978 A1 5/2016 Lee et al.
2016/0236974 A1 8/2016 Sinapi et al.
2016/0246154 A1 8/2016 O'Keeffe
2016/0306046 A1 10/2016 Axelsson et al.
2016/0362583 A1 12/2016 Naik et al.
2016/0363698 A1 12/2016 Fan et al.
2016/0372532 A1 12/2016 Song et al.
2017/0003420 A1 1/2017 Berit-Debat et al.
2017/0015584 A1 1/2017 Krzyzak et al.
2017/0050349 A1 2/2017 Hara et al.
2017/0075039 A1 3/2017 Hart et al.
2017/0087144 A1 3/2017 Rowe et al.
2017/0129806 A1 5/2017 Fujii et al.
2017/0183255 A1 6/2017 Walther et al.
2017/0183257 A1 6/2017 Apitz et al.
2017/0184762 A1 6/2017 Fujii et al.
2017/0199307 A1 7/2017 Hart et al.
2017/0210666 A1 7/2017 Chang et al.
2017/0235418 A1 8/2017 Inamoto et al.
2017/0260620 A1 9/2017 Cheah et al.
2017/0276838 A1 9/2017 Oishi et al.
2017/0285227 A1 10/2017 Chen et al.
2017/0307790 A1 10/2017 Bellman et al.
2017/0317217 A1 11/2017 Ito et al.
2017/0355172 A1 12/2017 Paulson
2017/0369992 A1 12/2017 Adib et al.
2018/0095303 A1 4/2018 Cho et al.
2018/0128957 A1 5/2018 Davis et al.
2018/0162091 A1 6/2018 Takeda et al.
2018/0203163 A1 7/2018 Thakkar et al.
2018/0251398 A1 9/2018 Ikegami et al.
2018/0352668 A1 12/2018 Amin et al.
2018/0372919 A1 12/2018 Suzuki et al.
2019/0039935 A1 2/2019 Couillard et al.
2019/0039946 A1 2/2019 Bayne et al.
2019/0045038 A1 2/2019 Zhou et al.
2019/0062200 A1 2/2019 He et al.
2019/0077352 A1 3/2019 Bhatia et al.
2019/0219739 A1 7/2019 Gregorski et al.
2020/0057177 A1 2/2020 Hart et al.
2020/0158917 A1 5/2020 Hart et al.
2020/0158922 A1 5/2020 Hayashi et al.
2020/0377409 A1 12/2020 Jin et al.
2020/0379143 A1 12/2020 Gu et al.
2021/0017068 A1 1/2021 Torfs et al.
2021/0181382 A1 6/2021 Gregorski et al.
2022/0011467 A1 1/2022 Feng et al.

FOREIGN PATENT DOCUMENTS

AU 2002341016 B2 8/2008
AU 2015252116 A1 11/2015
CA 2141536 A1 2/1994
CA 2629555 A1 11/2009
CN 1134555 A 10/1996
CN 1312450 A 9/2001
CN 1318722 A 10/2001
CN 1423682 A 6/2003
CN 1575970 A 2/2005
CN 1653880 A 8/2005
CN 1688904 A 10/2005
CN 1703631 A 11/2005
CN 1869736 A 11/2006
CN 2859579 Y 1/2007
CN 1936623 A 3/2007
CN 1940601 A 4/2007
CN 1946646 A 4/2007
CN 101019043 A 8/2007
CN 101044266 A 9/2007
CN 100360449 C 1/2008

(56) References Cited

FOREIGN PATENT DOCUMENTS

| | | | |
|---|---|---|---|
| CN | 101236264 | A | 8/2008 |
| CN | 101295030 | A | 10/2008 |
| CN | 201165502 | Y | 12/2008 |
| CN | 101349769 | A | 1/2009 |
| CN | 101356455 | A | 1/2009 |
| CN | 201201777 | Y | 3/2009 |
| CN | 101400619 | A | 4/2009 |
| CN | 101639663 | A | 2/2010 |
| CN | 201483977 | U | 5/2010 |
| CN | 101724812 | A | 6/2010 |
| CN | 101734867 | A | 6/2010 |
| CN | 101809512 | A | 8/2010 |
| CN | 101939266 | A | 1/2011 |
| CN | 201707457 | U | 1/2011 |
| CN | 102016962 | A | 4/2011 |
| CN | 102109630 | A | 6/2011 |
| CN | 201945707 | U | 8/2011 |
| CN | 201984393 | U | 9/2011 |
| CN | 102278833 | A | 12/2011 |
| CN | 202171708 | U | 3/2012 |
| CN | 202177751 | U | 3/2012 |
| CN | 202177765 | U | 3/2012 |
| CN | 202182978 | U | 4/2012 |
| CN | 102470637 | A | 5/2012 |
| CN | 102574736 | A | 7/2012 |
| CN | 102627407 | A | 8/2012 |
| CN | 102681042 | A | 9/2012 |
| CN | 102736136 | A | 10/2012 |
| CN | 202615053 | U | 12/2012 |
| CN | 202661651 | U | 1/2013 |
| CN | 102923969 | A | 2/2013 |
| CN | 102934010 | A | 2/2013 |
| CN | 102967947 | A | 3/2013 |
| CN | 103011618 | A | 4/2013 |
| CN | 103013196 | A | 4/2013 |
| CN | 103013219 | A | 4/2013 |
| CN | 103068764 | A | 4/2013 |
| CN | 202904161 | U | 4/2013 |
| CN | 103073196 | A | 5/2013 |
| CN | 103099529 | A | 5/2013 |
| CN | 202924088 | U | 5/2013 |
| CN | 202924096 | U | 5/2013 |
| CN | 103171230 | A | 6/2013 |
| CN | 203025361 | U | 6/2013 |
| CN | 103254670 | A | 8/2013 |
| CN | 103302934 | A | 9/2013 |
| CN | 103305816 | A | 9/2013 |
| CN | 203260587 | U | 10/2013 |
| CN | 103395247 | A | 11/2013 |
| CN | 103492173 | A | 1/2014 |
| CN | 103499852 | A | 1/2014 |
| CN | 103508678 | A | 1/2014 |
| CN | 103707578 | A | 4/2014 |
| CN | 203535376 | U | 4/2014 |
| CN | 203567294 | U | 4/2014 |
| CN | 203620645 | U | 6/2014 |
| CN | 103902122 | A | 7/2014 |
| CN | 103921487 | A | 7/2014 |
| CN | 103934756 | A | 7/2014 |
| CN | 203689480 | U | 7/2014 |
| CN | 103964705 | A | 8/2014 |
| CN | 104040016 | A | 9/2014 |
| CN | 104418511 | A | 3/2015 |
| CN | 104422971 | A | 3/2015 |
| CN | 104553126 | A | 4/2015 |
| CN | 104559625 | A | 4/2015 |
| CN | 104845544 | A | 8/2015 |
| CN | 204727835 | U | 10/2015 |
| CN | 105142900 | A | 12/2015 |
| CN | 204894681 | U | 12/2015 |
| CN | 105446558 | A | 3/2016 |
| CN | 105593705 | A | 5/2016 |
| CN | 105737103 | A | 7/2016 |
| CN | 105764866 | A | 7/2016 |
| CN | 205368144 | U | 7/2016 |
| CN | 105843452 | A | 8/2016 |
| CN | 105848883 | A | 8/2016 |
| CN | 105859148 | A | 8/2016 |
| CN | 106113837 | A | 11/2016 |
| CN | 205687804 | U | 11/2016 |
| CN | 106199812 | A | 12/2016 |
| CN | 205818592 | U | 12/2016 |
| CN | 106338783 | A | 1/2017 |
| CN | 106378880 | A | 2/2017 |
| CN | 106431004 | A | 2/2017 |
| CN | 106604900 | A | 4/2017 |
| CN | 106941545 | A | 7/2017 |
| CN | 107042642 | A | 8/2017 |
| CN | 107076874 | A | 8/2017 |
| CN | 107076878 | A | 8/2017 |
| CN | 107174867 | A | 9/2017 |
| CN | 107310209 | A | 11/2017 |
| CN | 107735697 | A | 2/2018 |
| CN | 108585479 | A | 9/2018 |
| DE | 102014104798 | A1 | 10/2015 |
| DE | 102015114877 | A1 | 3/2017 |
| EP | 0566271 | A2 | 10/1993 |
| EP | 0592986 | A1 | 4/1994 |
| EP | 0698798 | A2 | 2/1996 |
| EP | 0966410 | A1 | 12/1999 |
| EP | 0996410 | A1 | 5/2000 |
| EP | 1069088 | A1 | 1/2001 |
| EP | 1275623 | A1 | 1/2003 |
| EP | 1432874 | A1 | 6/2004 |
| EP | 2149540 | A1 | 2/2010 |
| EP | 2196870 | A1 | 6/2010 |
| EP | 2363383 | A1 | 9/2011 |
| EP | 1289898 | B1 | 8/2012 |
| EP | 2492090 | A1 | 8/2012 |
| EP | 2328818 | B1 | 12/2012 |
| EP | 1490715 | B1 | 1/2013 |
| EP | 2628818 | A1 | 8/2013 |
| EP | 2711744 | A1 | 3/2014 |
| EP | 3178796 | A1 | 6/2017 |
| EP | 3822234 | A1 | 5/2021 |
| FR | 2966934 | A3 | 5/2012 |
| FR | 2982607 | A1 | 5/2013 |
| GB | 1517585 | A | 7/1978 |
| GB | 2485522 | A | 5/2012 |
| ID | 11085 | | 3/2011 |
| IN | 201201777 | | 10/2015 |
| JP | 58-127463 | A | 7/1983 |
| JP | 61-019888 | A | 1/1986 |
| JP | 63-238260 | A | 10/1988 |
| JP | 63-265846 | A | 11/1988 |
| JP | 02-077434 | A | 3/1990 |
| JP | 02-156448 | A | 6/1990 |
| JP | 04-250834 | A | 9/1992 |
| JP | 07-035267 | B2 | 4/1995 |
| JP | 07-290652 | A | 11/1995 |
| JP | 07-331115 | A | 12/1995 |
| JP | 09-068602 | A | 3/1997 |
| JP | 10-000009 | A | 1/1998 |
| JP | 11-311702 | A | 11/1999 |
| JP | 2974879 | B2 | 11/1999 |
| JP | 2000-121806 | A | 4/2000 |
| JP | 2000-171601 | A | 6/2000 |
| JP | 2000-171605 | A | 6/2000 |
| JP | 2000-214302 | A | 8/2000 |
| JP | 2000-275404 | A | 10/2000 |
| JP | 2001-503100 | A | 3/2001 |
| JP | 2001-511539 | A | 8/2001 |
| JP | 2001-281402 | A | 10/2001 |
| JP | 2001-281406 | A | 10/2001 |
| JP | 2001-303246 | A | 10/2001 |
| JP | 2001-311806 | A | 11/2001 |
| JP | 2002-082207 | A | 3/2002 |
| JP | 2002-116303 | A | 4/2002 |
| JP | 2002-174810 | A | 6/2002 |
| JP | 2002-210906 | A | 7/2002 |
| JP | 2002-212317 | A | 7/2002 |
| JP | 2002-267835 | A | 9/2002 |
| JP | 2003-026826 | A | 1/2003 |
| JP | 2003-082127 | A | 3/2003 |

(56) References Cited

FOREIGN PATENT DOCUMENTS

| | | | |
|---|---|---|---|
| JP | 2003-514746 | A | 4/2003 |
| JP | 2003-131011 | A | 5/2003 |
| JP | 2003-236970 | A | 8/2003 |
| JP | 2003-266607 | A | 9/2003 |
| JP | 2003-285343 | A | 10/2003 |
| JP | 2004-069878 | A | 3/2004 |
| JP | 2004-138662 | A | 5/2004 |
| JP | 2004-163549 | A | 6/2004 |
| JP | 2004-244594 | A | 9/2004 |
| JP | 2004-526605 | A | 9/2004 |
| JP | 2004-291303 | A | 10/2004 |
| JP | 2004-333901 | A | 11/2004 |
| JP | 2005-042072 | A | 2/2005 |
| JP | 2005-070724 | A | 3/2005 |
| JP | 2005-114649 | A | 4/2005 |
| JP | 2005-187639 | A | 7/2005 |
| JP | 2005-187640 | A | 7/2005 |
| JP | 2005-219223 | A | 8/2005 |
| JP | 2005-227415 | A | 8/2005 |
| JP | 2005-246296 | A | 9/2005 |
| JP | 2005-274527 | A | 10/2005 |
| JP | 2005-300576 | A | 10/2005 |
| JP | 2006-047504 | A | 2/2006 |
| JP | 2006-079067 | A | 3/2006 |
| JP | 2006-110754 | A | 4/2006 |
| JP | 2006-116754 | A | 5/2006 |
| JP | 2006-208726 | A | 8/2006 |
| JP | 2006-317957 | A | 11/2006 |
| JP | 2006-352105 | A | 12/2006 |
| JP | 2007-055064 | A | 3/2007 |
| JP | 2007-072372 | A | 3/2007 |
| JP | 2007-086521 | A | 4/2007 |
| JP | 2007-099557 | A | 4/2007 |
| JP | 2007-114377 | A | 5/2007 |
| JP | 2007-156017 | A | 6/2007 |
| JP | 2007-156205 | A | 6/2007 |
| JP | 2007-213021 | A | 8/2007 |
| JP | 2007-523776 | A | 8/2007 |
| JP | 2007-240707 | A | 9/2007 |
| JP | 2007-527328 | A | 9/2007 |
| JP | 2007-271953 | A | 10/2007 |
| JP | 2007-271958 | A | 10/2007 |
| JP | 2007-298667 | A | 11/2007 |
| JP | 2008-003425 | A | 1/2008 |
| JP | 2008-032949 | A | 2/2008 |
| JP | 2008-033348 | A | 2/2008 |
| JP | 2008-116596 | A | 5/2008 |
| JP | 2008-133535 | A | 6/2008 |
| JP | 2008-158156 | A | 7/2008 |
| JP | 2008-524030 | A | 7/2008 |
| JP | 2008-242425 | A | 10/2008 |
| JP | 2008-247732 | A | 10/2008 |
| JP | 2009-025384 | A | 2/2009 |
| JP | 4250834 | B2 | 4/2009 |
| JP | 2009-109850 | A | 5/2009 |
| JP | 2009-116218 | A | 5/2009 |
| JP | 2009-116219 | A | 5/2009 |
| JP | 2009-116220 | A | 5/2009 |
| JP | 2009-149468 | A | 7/2009 |
| JP | 2009-175725 | A | 8/2009 |
| JP | 2009-529715 | A | 8/2009 |
| JP | 2009-199022 | A | 9/2009 |
| JP | 2009-204506 | A | 9/2009 |
| JP | 2009-265601 | A | 11/2009 |
| JP | 2010-037115 | A | 2/2010 |
| JP | 4421142 | B2 | 2/2010 |
| JP | 2010-061044 | A | 3/2010 |
| JP | 2010-125719 | A | 6/2010 |
| JP | 2010-167410 | A | 8/2010 |
| JP | 2010-202514 | A | 9/2010 |
| JP | 2011-017782 | A | 1/2011 |
| JP | 4612827 | B2 | 1/2011 |
| JP | 2011-057547 | A | 3/2011 |
| JP | 2011-093728 | A | 5/2011 |
| JP | 4707656 | B2 | 6/2011 |
| JP | 2011-133800 | A | 7/2011 |
| JP | 2011-134464 | A | 7/2011 |
| JP | 2011-150821 | A | 8/2011 |
| JP | 4765069 | B2 | 9/2011 |
| JP | 4790396 | B2 | 10/2011 |
| JP | 2011-237789 | A | 11/2011 |
| JP | 2011-246365 | A | 12/2011 |
| JP | 2012-132022 | A | 7/2012 |
| JP | 2012-171866 | A | 9/2012 |
| JP | 2012-189760 | A | 10/2012 |
| JP | 2012-194546 | A | 10/2012 |
| JP | 2012-203187 | A | 10/2012 |
| JP | 2012-228811 | A | 11/2012 |
| JP | 2012-230290 | A | 11/2012 |
| JP | 2012-242837 | A | 12/2012 |
| JP | 2013-025318 | A | 2/2013 |
| JP | 2013-070093 | A | 4/2013 |
| JP | 2013-097356 | A | 5/2013 |
| JP | 2013-122516 | A | 6/2013 |
| JP | 2013-142817 | A | 7/2013 |
| JP | 2013-205634 | A | 10/2013 |
| JP | 2013-224964 | A | 10/2013 |
| JP | 2013-226666 | A | 11/2013 |
| JP | 2013-234571 | A | 11/2013 |
| JP | 2013-252992 | A | 12/2013 |
| JP | 2013-258209 | A | 12/2013 |
| JP | 2014-056215 | A | 3/2014 |
| JP | 2014-081522 | A | 5/2014 |
| JP | 2014-194530 | A | 10/2014 |
| JP | 2015-006650 | A | 1/2015 |
| JP | 5650347 | B1 | 1/2015 |
| JP | 2015-058605 | A | 3/2015 |
| JP | 2015-058606 | A | 3/2015 |
| JP | 2015-506895 | A | 3/2015 |
| JP | 2015-068944 | A | 4/2015 |
| JP | 5736214 | B2 | 6/2015 |
| JP | 2015-167470 | A | 9/2015 |
| JP | 2015-171770 | A | 10/2015 |
| JP | 2015-535804 | A | 12/2015 |
| JP | 2015-536892 | A | 12/2015 |
| JP | 2016-009172 | A | 1/2016 |
| JP | 2016-530194 | A | 9/2016 |
| JP | 2016-531330 | A | 10/2016 |
| JP | 2016-534962 | A | 11/2016 |
| JP | 2016-201236 | A | 12/2016 |
| JP | 2017-515780 | A | 6/2017 |
| JP | 2017-523310 | A | 8/2017 |
| JP | 2017-528411 | A | 9/2017 |
| JP | 2018-010275 | A | 1/2018 |
| KR | 10-2005-0043647 | A | 5/2005 |
| KR | 10-2006-0024545 | A | 3/2006 |
| KR | 10-2006-0060171 | A | 6/2006 |
| KR | 10-2006-0065724 | A | 6/2006 |
| KR | 10-0709879 | B1 | 4/2007 |
| KR | 10-2007-0054850 | A | 5/2007 |
| KR | 10-2007-0063134 | A | 6/2007 |
| KR | 10-2008-0048578 | A | 6/2008 |
| KR | 10-2008-0057443 | A | 6/2008 |
| KR | 10-2008-0102154 | A | 11/2008 |
| KR | 10-2009-0098975 | A | 9/2009 |
| KR | 10-2009-0119968 | A | 11/2009 |
| KR | 10-2010-0013836 | A | 2/2010 |
| KR | 10-2010-0123624 | A | 11/2010 |
| KR | 10-2011-0054057 | A | 5/2011 |
| KR | 2011-0047596 | A | 5/2011 |
| KR | 10-2011-0078682 | A | 7/2011 |
| KR | 10-1103041 | B1 | 1/2012 |
| KR | 10-1121207 | B1 | 3/2012 |
| KR | 10-1194257 | B1 | 10/2012 |
| KR | 10-2013-0031689 | A | 3/2013 |
| KR | 10-2014-0034172 | A | 3/2014 |
| KR | 10-2014-0061842 | A | 5/2014 |
| KR | 10-2015-0045476 | A | 4/2015 |
| KR | 10-1517051 | B1 | 5/2015 |
| KR | 10-2015-0116802 | A | 10/2015 |
| KR | 10-2017-0028190 | A | 3/2017 |
| KR | 10-2017-0043566 | A | 4/2017 |
| TW | 1245919 | B | 12/2005 |
| TW | 200600824 | A | 1/2006 |

(56) References Cited

FOREIGN PATENT DOCUMENTS

| | | | |
|---|---|---|---|
| TW | 201335090 | A | 9/2013 |
| TW | 201500757 | A | 1/2015 |
| TW | 201520585 | A | 6/2015 |
| TW | 201615588 | A | 5/2016 |
| TW | 201715257 | A | 5/2017 |
| TW | 201815720 | A | 5/2018 |
| WO | 97/13003 | A2 | 4/1997 |
| WO | 98/37254 | A2 | 8/1998 |
| WO | 98/40323 | | 9/1998 |
| WO | 98/52518 | A1 | 11/1998 |
| WO | 00/37384 | A1 | 6/2000 |
| WO | 02/00772 | A1 | 1/2002 |
| WO | 02/42834 | A2 | 5/2002 |
| WO | 02/42843 | A2 | 5/2002 |
| WO | 03/09767 | A1 | 2/2003 |
| WO | 03/27397 | A1 | 4/2003 |
| WO | 2006/066101 | A2 | 6/2006 |
| WO | 2006/099765 | A1 | 9/2006 |
| WO | 2007/049589 | A1 | 5/2007 |
| WO | 2008/062605 | A1 | 5/2008 |
| WO | 2008/108332 | A1 | 9/2008 |
| WO | 2009/008240 | A1 | 1/2009 |
| WO | 2009/037886 | A1 | 3/2009 |
| WO | 2009/041528 | A1 | 4/2009 |
| WO | 2009/065490 | A2 | 5/2009 |
| WO | 2009/107536 | A1 | 9/2009 |
| WO | 2010/114135 | A1 | 10/2010 |
| WO | 2012/043341 | A1 | 4/2012 |
| WO | 2012/144499 | A1 | 10/2012 |
| WO | 2012/157719 | A1 | 11/2012 |
| WO | 2013/001023 | A1 | 1/2013 |
| WO | 2013/023359 | A1 | 2/2013 |
| WO | 2013/082477 | A2 | 6/2013 |
| WO | 2013/082488 | A2 | 6/2013 |
| WO | 2013/085795 | A1 | 6/2013 |
| WO | 2013/088856 | A1 | 6/2013 |
| WO | 2013/098641 | A2 | 7/2013 |
| WO | 2013/160233 | A1 | 10/2013 |
| WO | 2014/041257 | A1 | 3/2014 |
| WO | 2014/055489 | A1 | 4/2014 |
| WO | 2014/061614 | A1 | 4/2014 |
| WO | 2014/085414 | A1 | 6/2014 |
| WO | 2014/117333 | A1 | 8/2014 |
| WO | 2014/167293 | A1 | 10/2014 |
| WO | 2014/182639 | A1 | 11/2014 |
| WO | 2014/182640 | A1 | 11/2014 |
| WO | 2014/182693 | A1 | 11/2014 |
| WO | 2015/000534 | A1 | 1/2015 |
| WO | 2015/009377 | A1 | 1/2015 |
| WO | 2015/015338 | A2 | 2/2015 |
| WO | 2015/030118 | A1 | 3/2015 |
| WO | 2015/031428 | A2 | 3/2015 |
| WO | 2015/041257 | A1 | 3/2015 |
| WO | 2015/070254 | A1 | 5/2015 |
| WO | 2015/076914 | A1 | 5/2015 |
| WO | 2015/084253 | A1 | 6/2015 |
| WO | 2015/085283 | A1 | 6/2015 |
| WO | 2015/095288 | A2 | 6/2015 |
| WO | 2015/108266 | A1 | 7/2015 |
| WO | 2015/115154 | A1 | 8/2015 |
| WO | 2015/125498 | A1 | 8/2015 |
| WO | 2015/137196 | A1 | 9/2015 |
| WO | 2015/142837 | A1 | 9/2015 |
| WO | 2015/174625 | A1 | 11/2015 |
| WO | 2015/175390 | A1 | 11/2015 |
| WO | 2015/179739 | A1 | 11/2015 |
| WO | 2015/190374 | A1 | 12/2015 |
| WO | 2016/018490 | A1 | 2/2016 |
| WO | 2016/069113 | A1 | 5/2016 |
| WO | 2016/118462 | A2 | 7/2016 |
| WO | 2016/190047 | A1 | 12/2016 |
| WO | 2016/204009 | A1 | 12/2016 |
| WO | 2016/205317 | A1 | 12/2016 |
| WO | 2017/041307 | A1 | 3/2017 |
| WO | 2018/043253 | A1 | 3/2018 |
| WO | 2018/125676 | A1 | 7/2018 |
| WO | 2019/055745 | A1 | 3/2019 |
| WO | 2020/013012 | A1 | 1/2020 |
| WO | 2020/123367 | A1 | 6/2020 |
| WO | 2022/011070 | A1 | 1/2022 |
| WO | 2022/011071 | A1 | 1/2022 |
| WO | 2022/125846 | A1 | 6/2022 |

OTHER PUBLICATIONS

I.V. Afanasyev-Charkin et al. “Hard Si—N—C films with a tunable band gap produced by pulsed glow discharge deposition”, Surface & Coatings Technology, 1999, pp. 38-42. (Year: 1999).

Inkin et al; “Properties of aluminium nitride coaling obtained by vacuum arc discharge method with plasma flow separation.” Elsevier, Diamond and Related Materials, 10 (2001) 1314-1316.

Ishiguro et al “Solar Light Absorption Property of Sputtered Al—N Films with Enhanced Surface Roughness during Film Growth.” Jpn. J. Appl. Phys. vol. 41 (2002) pp. 292-300.

James F. Shackelford, “Introduction to Materials Science for Engineers,” Sixth Edition, Pearson Prentice Hall, New Jersey, 2005, pp. 404-418.

Kelley, E., “Proposed Diffuse Ambient Contrast Measurement Methods for Flat Panel Displays,” 2001, NISTIR 6738, National Institute of Standards and Technology, Gaithersburg, Maryland, 7 pages.

Kittel, C., Introduction to Solid State Physics, seventh edition, John Wiley & Sons, Inc., NY, 1996, pp. 611-627.

Krupitskaya, Auner. “Optical Characatization of Inn Films Grown by Plasma Source Molecular Beam Epitaxy.” Journal of Applied Physices 84, 2861-2865, 1998.

Li et al, “Low-temperature magnetron sputter deposition, hardness and electrical resistivity of amorphous and crystalline alumina thin films” Journal of Vacuum Science & Technology A 18, 2333 (2000). (See copy).

Liaoning Provincial Popular Science Writers Association, “High Technology Around Your Life”, Popular Science Press, p. 217, Oct. 1992 (English Translation Attached).

Liu, B.T. et al., “Strength of the interactions between light-scattering particles and resins affects the haze of anti-glare films,” Colloids Surf. A Physicochem. Eng. Aspects 2011, 389, pp. 138-143.

Madocks et al Durable Neutral Color Anti-Reflective Coaling for Mobile Displays; SVC Bulletin Fall 2014 3 pages.

Mania “Magnetron Sputtering for Deposition of Aluminum Nitride Thin Films.” Prace Komisji Nauk Ceramiczynych, 54, 429-433, 1997.

Martinet er al; “Deposition of SiO2 and TiO2 thin films by plasma enhanced chemical vapors deposition for antireflection coating”, J_ Non-Crystalline Solids; 216 (1997) 77-82.

Mccauley, et al, “AION: A brief history of its emergence and evolution.” Journal of the European Ceramic Society 29 (2009), 223-236. (See Copy).

Modified ASTM D5767-18 test protocol, “Standard Test Method for Instrumental Measurement of Distinctness-of-Image (DOI) Gloss of Coated Surfaces using a Rhopoint IQ Gloss Haze & DOI Meter,” Rhopoint Instruments Ltd.

Moghal et al., “Nanomechanical study of thin film nanocomposite and PVD thin films on polymer substrate for optical applications”, J_ Phys. D: Appl. Phys. 46 (2013).

Moore; “Gradient Index Optics: A Review,” Applied Optics, vol. 19, No. 7, Apr. 1, 1980, pp. 1035-1038.

Oliver et al. “An improved technique for determining hardness and elastic modulus using load and displacement sensing indentation experiments”. J_ Mater. Res., vol. 7, No. 6, 1992, 1564-1583.

Oliver et al. “Measurement of Hardness and Elastic Modulus by Instrument Indentation: Advances in Understanding and Refinements to Methodology”. J_ Mater. Res., vol. 19, No. 1, 2004, 3-20.

Pantano; “Al2O3 Coating by Atomic Layer Deposition (ALD) on various glass substrates for Surface Strength Improvement” The 23rd International Congress on Glass, Jul. 1-5, 2013. 3 pgs.

Paradis, Suzanne, Characterization and optimization of Si02 and Si3N4 thin films. 2013, Defence Research and Development Canada (Year: 2013).

(56) References Cited

OTHER PUBLICATIONS

Park et al; "Atomic Layer Deposition of Yttria-Stabilized Zirconia Thin Films for Enhanced Reactivity and Stability of Solid Oxide Fuel Cells"; Energy; vol. 116; (2016); pp. 170-176.
Portinha et al., "Hard Zr02/A12O3 nanolamianted PVD coatings evaluated by nanoindentation", Surface & Coatings Technology 200 (2005) 765-768.
Reinhold et al; "Plasma Nitriding of Aluminum Alloys." Proceedings of the 1st International Automotive Heat Treating Conference. Jul. 13-15, 1998. pp 213-220.
Ruddell et al; "The Effect of Deposition Parameters on the Properties of Yttria-Stabilzed Zrconia Thin Films"; Thin Solid Films, 445 (2003) pp. 14-19.
Savage; "Preparation and properties of hard crystalline materials for optical applications—a review." Journal of Crystal Growth 113 (1991) 698-715.
Schlömer, T. et al., "Farthest-points optimized point sets with maximized minimum distance," Proc. ACM SIGGRAPH Symposium on high performance graphics: HPG 2011 pp. 135-142.
Schroter et al; "X-ray pholoelectron diffraction on SiC and AlN epitaxial films: polytype structure and polarity." Elsevier, Journal of Electron Spectroscopy and Related Phenomena. 114-116 (2001) 443-450.
Shackelford, J.F., Introduction to Materials Science for Engineers, Sixth Edition, Pearson Prentice Hall, New Jersey, 2005, pp. 404-418.
Simonsen, et al., "Haze of random systems: an approximate analytic approach," Phys Rev A 79 063813 (2009), 23 pages.
Singh et al; "Structural and optical properties of RF magnetron sputtered aluminium nitride films without external substrate healing." Elsevier, Applied Surface Sceince 257 (2011) 9568-9573.
Smart and Moore, Solid State Chemistry, An introduction, Chapman & Hall University and Professional Division, London, 1992, pp. 136-151.
Sonderby et al; "Deposition of Yttria-Stabilized Zirconia Thin Films By High Power Impulse Magnetron Sputiering and Pulsed Magnetron Sputiering"; Surface & Coatings Technology; 240; (2014) pp. 1-6.
Southwell; "Coating design using very thin high- and low-index layers," Applied Optics, vol. 24, Issue 4, pp. 457-460 (1985).
Stillwell, A. et al., "Perception of Sparkle in Anti-Glare Display Screens," JSID 22(2), 129-136 (2014).
Taguchi et al; "Ultra-Low-Reflective 60-In. LCD With Uniform Moth-Eye Surface for Digital Signage," SID 10 DIGEST, 80.3, p. 1196, 2010.
Tang et al. "Optical, structural, and mechanical properties of silicon oxyynitride films sputtering by pulsed magnetron sputtering," Applied Optics 56(4) 2016, pp. C168-C174.
Tsui, et al., "Effects of Adhesion on the Measurement of Thin Film Mechanical Properties by Nanoindenlalion." Mal. Res. Soc. Symp. Proc. vol. 473 1997.
Urushidani et al; "Etalon-Type Optical Filters, Their Modules, Spectrometers, and Optical Devices." Jpn. Kokai Tokkyo Koho, 2012.
Urushidani et al; "Optical Filters Including Optical Films Covered with Thickness-Controlled Dielectric Films, and Optical Filter Modules, Spectrometers and Optical Apparatus Containing Them." 2012.
Wang et al. "Tribological and optical properties of crystalline and amorphous alumina thin films grown by low iemperature reactive magnetron sputter-deposition", Surface and coatings technology, 146-147 (2001) pp. 189-194.
Wang et al; "Roughness Improvement and Hardness Enhancement in Nanoscale Al/AlN Multilayered Thin Films." Applied Physics Letters vol. 71, No. 14, 1951-1953, Oct. 6, 1997.
Wang et al; "Study of ALON and CRON films deposited by arc ion plating as diffusion barriers." Jinshu Xuebao (2004), 40, 1, 83-87.
Wang et al; "Towards Hard yet Touch Ceramic Coatings", Surface & Coatings Technology; 258 (2014) pp. 1-16.
Watanabe et al; "Surface Oxidation of Aluminum Nitride Thin Films." Surface Modification Technologies XIII, Edited by Sudarshan, Khor, Jeandin, ASM International, Materials Park, Ohio, 1999. pp. 209-215.
Wen et al. "The AlN layer thickness dependent coherent epitaxial growth, stress and hardness in NbN/AlN nanostructured multi-layer films." Surface and Coatings Technology 235 (2013) 367-375.
Xi et al; "The Preparation and Optical properties of AlN Thin Films." Diwen Wuli Xuebao (2012), 34)6), 467-470.
XS Miao and YC Chan. "Optical Properties and Reactive Sputtering Conditions of AlN and AlSiN Thin Films for Magneto-Optical Applications." Journal of Electronic Materials, vol. 26, No. 1, 1997.
Xu et al; "Chemical control of physical properties in silicon nitride films"; Appl Phys A (2013) 111: 867-876.
Yamamoto et al; "Manufacture of IR-Reflecling Bent Plate Glass." Jpn. Kokai Tokkyo Koho, 1988.
Chinese Patent Application No. 202180059815.5, Office Action dated Mar. 29, 2025, 4 pages (English Translation only), Chinese Patent Office.
ASTM Standard Test Method for Haze and Luminous Transmittance of Transparent Plastics; Designation D 1003-07, Nov. 2007.
International Search Report and Written Opinion of the International Searching Authority; PCT/US2022/034624; dated Oct. 25, 2022; 11 pages; European Patent Office.
International Search Report and Written Opinion of the International Searching Authority; PCT/US2022/034812; dated Oct. 24, 2022; 12 pages; European Patent Office.
Yamashita et al. "Preparation and Properties of AlON—SiAlON Composites." Journal of the Ceramic Society of Japan 109, pp. 434-439, 2001.
Yan et al; "The Preparation and Properties ofY2O3/AlN Anti-Reflection Films on Chemical Vapor Deposition Diamond." Elsevier, Thin Solid Films, 520, pp. 734-738, 2011.
Yang et al; "Preparation and Properties of AlN Thin Films by Pure Nitrogen Reactive Sputtering." Rengong Jingti Kuebao, 39 (1), pp. 190-196, 2010.
Yang et al; "Preparation and Properties of C-Axis Preferred Orientation AlN Thin Films by Pure Nitrogen Reactive Sputtering." Xianjiang Daxue Xuebao, Ziran Kexueban, 26 (4), pp. 444-449, 2009.
Yun et al.. "Optical and Structural Investigation of AlN Grown on Sapphire with Reactive MBE Using RF Nitrogen or Ammonia." Mat. Res. Soc. Symp. Proc, vol. 764, 2003.
Zabinski et al "Stoichiometry and characterization of aluminium oxynitride thin films grown by ion-beam assisted pulsed laser deposition." Elsevier, Thin Solid Films, 516, pp. 6215-6219, 2008.
Zayats et al; "Optical Studies of AlN/n-Si( 100) Films Obtained by the Method of High-Frequency Magnetron Sputtering." Semiconductors, 2008, vol. 42 No.2 , pp. 195-198.
"CIELUV", Available at: https://en.wikipedia.org/wiki/CIELUV, 1976, 5 pages.
"Heron's formula", Available at: https://en.wikipedia.org/wiki/Heron%27s_formula, Jul. 2021, 8 pages.
"High-precision, fast array spectroradiometer—for demanding measurements", Available at: https://www.instrumentsystems.com/en/products/spectrometers/cas-140d, 4 pages, retreived on Aug. 6, 2021.
"Illuminance Meters", Available at: https://sensing konicaminolta.us/us/technologies/illuminance-meters/, 2 pages, Retreived on Aug. 2021.
"Welcome to Display-Metrology & Systems", Available at: www.display-messtechnik.de/en/measurement, 2014, 1 page.
Afanasyev-Charkin et al; "Hard Si—N—C films with a tunable band gap produced by pulsed glow discharge deposition"; Surface & Coatings Technology; 199 (2005) 38-42.
Aissa et al; "Comparison of the structural properties and residual stress of AlN films deposited by de magnetron sputtering and high power impulse magnetron sputtering at different working pressures." Elsevier, Thin Solid Films, 550 (2014) 264-267.
Al-Dahoudi, N. et al., "Transparent conducting, anti-static and anti-static-anti-glare coatings on plastic substrates," Thin Solid Films 2001, 392, pp. 299-304.

(56) References Cited

OTHER PUBLICATIONS

Assouar et al; "Study of Acoustical and Optical Properties of AlN Films for SAW and BAW Devices: Correlation Between These Properties." Integrated Ferroelectrics, 82: 45-54, 2006.
ASTM C770-16(2020), "Standard Test Method for Measurement of Glass Stress-Optical Coefficient," ASTM International, West Conshohocken, PA, 2020, www.astm.org.
ASTM D1003-21, "Standard Test Method for Haze and Luminous Transmittance of Transparent Plastics," ASTM International, West Conshohocken, PA, 2021, www.astm.org.
ASTM D523-14(2018), "Standard Test Method for Specular Gloss," ASTM International, West Conshohocken, PA, 2018, www.astm.org.
ASTM E2001-13, "Standard Guide for Resonant Ultrasound Spectroscopy for Defect Detection in Both Metallic and Non-metallic Parts," ASTM International, West Conshohocken, PA, 2013, www.astm.org.
Baek et al; "Correlations between optical properties, microstructure, and processing conditions of Aluminum nitride thin films fabricated by pulsed laser deposition." Elsevier, Thin Solid Films 515 (2007) 7096-7104.
Bitierlich et al; "Particle-reinforced SiAlONs for Cutting Tools." Materials Science Forum vol. 554 (2007) pp. 129-134.
Boerner et al; "Holographic Antiglare and Antireflection Films for Flat Panel Displays" SID 03 Digest, 7.3, p. 68, 2003.
Boichot et al; "Epitaxial growth of AlN on c-plane sapphire by High Temperature Hydride Vapor Phase Epitaxy: Incluence of the gas phase NlAi ratio and low temperature protective layer." Elsevier, Surface & Coatings Technology 237 (2013) 118-125.
Borges et al "Optical Properties of AlNxOy Thin Films Deposited by DC Magnetron Sputtering." Proceedings of SPIE, 2011.
Caceres and Prieto, "Mechanical properties of sputtered silicon notride thin films", Journal of Applied Physics 94(12) 2003, pp. 7868-7873.
Caliendo et al; "Structural, optical, and acoustic characterization of high-quality AlN thick films sputtered on Al203 (001) at temperature for GHz band electroacoustic devices applications." Journal of Applied Physics 96, No. 5, 2610 (2004).
Carniero et al. "Hardness Evaluation of Nanolayered PVD Coatings Using Nanoindenlalion", Rev. Adv. Maler. Sci., 2014 p. 83-90.
Cecala, C. et al., "Fourier Optics Modeling of Display Sparkle from Anti-Glare Cover Glass: Comparison to Experimental Data," Imaging and Applied Optics Congress, OSA Technical Digest (Optical Society of America, 2020), paper JW5B.8, 2 pages.
Chan et al; "Fracture Toughness Improvements of Dental Ceramic Through Use of Ytiria- Stabilized Zirconia (YSZ) Thin-Film Coating"; Dental Materials, 29 (2013) pp. 881-887.
Chang et al. "Characteristics of Si—C—N films deposited by microwave plasma CVD on Si wafers with various buffer layer materials", Diamond and Related Material, 2001, vol. 10, pp. 1910-1915 (Year: 2001).
Chen et al; "Optical Reflectance of Bulk AlN Crystals and AlN Epitaxial Films." AIP Conference Proceedings, 772, 297-298, 2005.
Chen et al; "Thickness-dependent structural transformation in the AlN film." Elsevier, Acta Materialia 53 (2005) 5223-5227.
Chi et. al. "Cracking in coating-substrate composites with multi-layered and FGM coatings," Engineering Fracture Mechanics 70 (2003) p. 1227.
Chou, S.Y. et al, "Imprint of Sub-25 nm Vias and Trenches in Polymers," Appl. Phys. Lett. 67, 3114, 1995, 3 pages.
Cook, R. L., "Stochastic sampling in computer graphics," Computer Graphics (Proceedings of ACM SIGGRAPH 86) 5, 1 (1986), pp. 51-72.
Corbin et al; Aluminum Oxynitride Spinel (ALON): A Review, Jul. 1987. Journal of the European Ceramic Society vol. 5, Issue 3, 1989, pp. 143-154.
Corning, "Corning Gorilla Glass 5," Product Info Sheet, 2 pgs, 2016, retrieved from: https://www.coming.com/microsites/csm/gorillaglass/PIsheets/Coming%20Gorilla%2-Glass%205%2005%20Sheet.pdf.
Corning, Corning Eagle XG AMLCD Glass Substrates Material Information, MIE 301, Issued: Jan. 2006, pp. 1-3.
Corning, Corning Eagle2000 Glass, Materials Information, Revised Aug. 2000, 5 Pgs.
Corning, Corning Gorilla Glass for Large Cover Glass Applications, 2013, 3 Pgs.
Danylyuk, et al., "Optical and Electrical Properties of Al 1-x InxN Films Grown on Sapphire (0001) by Plasma Source Molecular Beam Epitaxy." Mat. Res. Soc. Symp., vol. 639, 2001.
Easwarakhanthan et al; "Spectroellipsometric investigation of optical, morphological, and structural properties of reactively sputtered polycrystalline AlN films." J_ Vac. Sci. Technology A 28 (3), pp. 495-501, May/Jun. 2010.
Fischer-Cripps; "Critical Review of Analysis and Interpretation of Nanoindentation Test Data"; Surface & Coatings Technology 200 (2006) pp. 4153-4165.
Fraunhofer IWS, Available online at <https://www.iws.fraunhofer.de/content/dam/iws/en/documents/publications/product_sheets/200-1a_large_en.pdf>, retrieved in 2020, 1 page.
Gazda et al; "Formation of ALN films on Ti/TiN Arc-Layer Interface with Al-0.5% Cu Interconects evaluated by XPS and Energy-filtered-TEM." Mat. Res. Soc. Symp. Proc. vol. 589, 365-370, 2001.
General Plasma Inc., "Introducing disruptive large area Coating technology for the 21st century", Available online at https://web.archive.org/web/20140704064921/http://generalplasma.com/products/large-area-pecvd/, retrieved on 2014, 1 page.
Godeker et al., "Antireflection coating for sapphire with consideratino of mechanical properties", Surface & Cotings Technology, 241 (2014) 59-63.
Goldman et al., "Scale Up of Large ALON Windows", Window and Dome Technologies and Materials XIII, edited by Randal W. Tustison, Brian J. Zelinski, Proc of SPIE vol. 8708, 870804 (Jun. 4, 2013) (See Copy).
Gy, "Ion exchange for glass strengthening," Materials Science and Engineering B 149 (2008) 159-165.
Hajakbari et al; "Optical Properties of Amorphous AlN Thin Films on Glass and Silicon Substrates Grown by Single Ion Beam Sputtering." Jpn. J. Appl. Phys. 49, 095802 (2010).
Harding et al; "Cracking During Indentation and Its Use in the Measurement of Fracture Toughness"; Mat. Res. Soc. Symp. Proc.; vol. 356, 1995, pp. 663-668.
Hay et al; "Continuous Stiffness Measurement During Instrumented Indentation Testing"; Experimental Techniques; May/Jun. 2010; pp. 86-94.
Hirai et al; "Formation of Aluminum Nitride by CartJothermic Reduction of Alumina in a Flowing Nitrogen Atmosphere." Nippon Kinzoku Gakkaishi (1989, 53 (10), 1035-40.
Hu et al; "Dynamic Fracturing of Strengthened Glass Under Biaxial Tensile Loading"; Journal of Non-Crystalline Solids; 405 (2014); pp. 153-158.
Huang et al; "Effect of deposition conditions on mechanical properties of low-temperature PECVD silicon nitride films"; Materials Science and Engineering A 435-436 (2006) 453-459.
Huang et al; "Effects of Substrate Temperature on Aluminum Nitride Films by Reactive Magnetron Sputtering." Xiyou Jinshu, 35 (5), pp. 715-718, 2011.
Corning Inc., "Information Related to Coatings on Commercially Available Tablet Devices—Supplying data related to the Apple iPad Air 2 (released Oct. 2014), Apple iPad Pro 2nd Generation (released Jun. 2017), and Apple iPad Air 4th Generation" (released Oct. 2020). 28 pages. This document has not been published in a book, magazine, journal, etc.

ARTICLES WITH THIN, DURABLE ANTI-REFLECTION COATINGS WITH EXTENDED INFRARED TRANSMISSION

CLAIM OF PRIORITY

This application claims the benefit of priority under 35 U.S.C. § 119 of U.S. Provisional Application No. 63/217,967, filed on Jul. 2, 2021, the contents of which are relied upon and incorporated herein by reference in their entirety.

TECHNICAL FIELD

The present invention relates to articles with thin, durable anti-reflection coatings with extended infrared transmission.

BACKGROUND

The disclosure relates to articles with thin, durable anti-reflective structures with extended infrared (IR) transmission, and more particularly to articles with thin, multi-layer anti-reflective coatings with such properties.

Cover articles are often used to protect devices and components within electronic products, to provide a user interface for input and/or display, protect a camera cover and/or sensor, and/or for many other functions. Such products include mobile devices, for example smart phones, smart watches, mp3 players and computer tablets. Cover articles also include architectural articles, transportation articles (e.g., interior and exterior display and non-display articles used in automotive applications, trains, aircraft, sea craft, etc.), appliance articles, or any article that may benefit from some transparency, scratch-resistance, abrasion resistance or a combination thereof. These applications often demand scratch-resistance and strong optical performance characteristics, in terms of maximum light transmittance and minimum reflectance. In some display, camera and sensor applications, the article that covers one or more of these elements should provide mechanical protection, as well as high visible light transmission (e.g., over cameras and displays) and high transmission in IR wavelengths (e.g., 940 nm) (e.g., for sensor applications, such as proximity, light-detection and ranging (LIDAR), and time-of-flight sensors).

Furthermore, for some cover applications it is beneficial that the color exhibited or perceived, in reflection and/or transmission, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic appearance or other functional aspects of the device.

These display and non-display articles are often used in applications (e.g., mobile devices) with packaging constraints. In particular, many of these applications can significantly benefit from reductions in overall thickness, even reductions of a few percent. In addition, many of the applications that employ such display and non-display articles benefit from low manufacturing cost, e.g., through the minimization of raw material costs, minimization of process complexity and yield improvements. Smaller packaging with optical and mechanical property performance attributes comparable to existing display and non-display articles can also serve the desire for reduced manufacturing cost (e.g., through less raw material costs, through reductions in the number of layers in an anti-reflective structure, etc.).

The optical performance of cover articles can be improved by using various anti-reflective coatings; however, known anti-reflective coatings are susceptible to wear or abrasion. Such abrasion can compromise any optical performance improvements achieved by the anti-reflective coating. Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

Accordingly, there is a need for new cover articles which are abrasion resistant, have acceptable or improved optical performance, including IR transmission, and are thinner optical structures.

SUMMARY

According to some aspects of the disclosure, an article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. Further, the article exhibits a two-side average transmittance that is greater than 85% at infrared wavelengths from 840 nm to 860 nm and greater than 85% at infrared wavelengths from 930 nm to 950 nm at 0° incidence.

According to some aspects of the disclosure, an article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. In addition, a combined physical thickness of the high RI layers is from about 40% to 60% of the physical thickness of the optical film structure. Further, the article exhibits a two-side average transmittance that is greater than 85% at infrared wavelengths from 840 nm to 860 nm and greater than 85% at infrared wavelengths from 930 nm to 950 nm at 0° incidence.

According to some aspects of the disclosure, an article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. In addition, the thickest high RI layer has a physical thickness from 120 nm to 180 nm, the first low RI layer directly on and in contact with the first major surface has a physical thickness from 15 nm to 35 nm, and the capping low RI layer has a thickness from 80 nm to 100 nm. Further, the article exhibits a two-side average transmittance that is greater than 85% at infrared wavelengths from 840 nm to 860 nm and greater than 85% at infrared wavelengths from 930 nm to 950 nm at 0° incidence.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
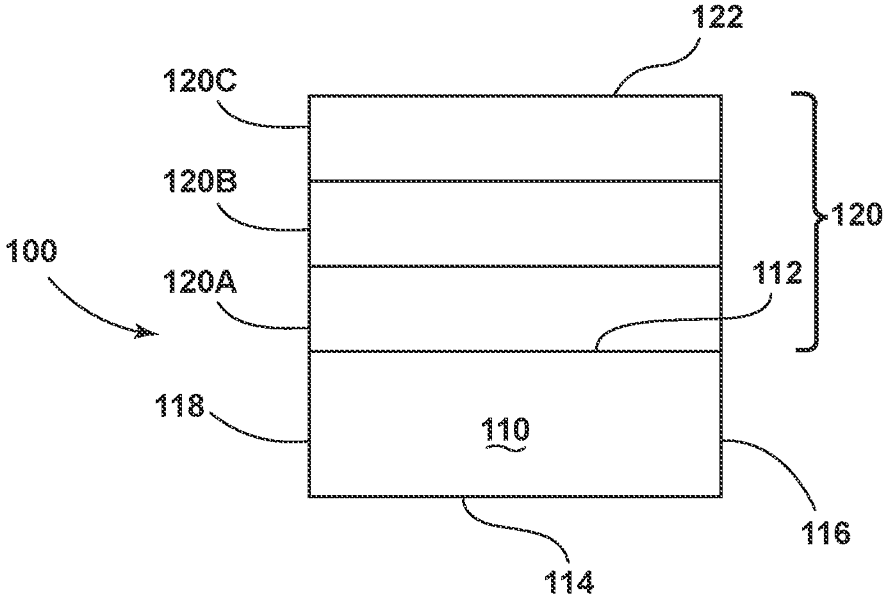
FIG. 1 is a side view of an article, according to one or more embodiments.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

Directional terms as used herein—for example "up," "down," "right," "left," "front," "back," "top," "bottom"—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

Embodiments of the disclosure relate to articles with thin, durable anti-reflective structures, and more particularly to articles with thin, multi-layer anti-reflective coatings exhibiting abrasion resistance, low reflectivity, color less transmittance, color less reflectance, and/or high transmittance in the IR spectrum. Embodiments of these articles possess anti-reflective optical structures with a total physical thickness of about 50 nm to less than 500 nm, while maintaining the hardness, abrasion resistance and optical properties associated with the intended applications for these articles (e.g., as display, camera and sensor covers, housings and substrates for display devices, interior and exterior automotive components, etc.).

Referring to FIG. 1, the article 100 according to one or more embodiments may include a substrate 110, and an anti-reflective coating 120 (also denoted herein as an "optical film structure") disposed on the substrate. The substrate 110 includes opposing major surfaces 112, 114 and opposing minor surfaces 116, 118. The anti-reflective coating 120 is shown in FIG. 1 as being disposed on a first opposing major surface 112; however, the anti-reflective coating 120 may be disposed on the second opposing major surface 114 and/or one or both of the opposing minor surfaces 116, 118 (e.g., the surfaces as 90° from the major surfaces 112, 114), in addition to or instead of being disposed on the first opposing major surface 112. In addition, the anti-reflective coating 120 forms an anti-reflective surface 122.

The anti-reflective coating 120 includes at least three (3) layers. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by a discrete deposition or a continuous deposition process. In one or more embodiments, the layer may be formed using only continuous deposition processes, or, alternatively, only discrete deposition processes.

As used herein, the term "dispose" includes coating, depositing and/or forming a material onto a surface. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

According to one or more embodiments, the anti-reflective coating 120 of the article 100 (e.g., as shown and described in connection with FIG. 1) can be characterized with abrasion resistance according to the Alumina SCE Test. As used herein, the "Alumina SCE Test" is conducted by subjecting a sample to a commercial 800 grit alumina sandpaper (10 mm×10 mm) with a total weight of 0.7 kg for fifty (50) abrasion cycles, using an ~1" stroke length powered by a Taber Industries 5750 linear abrader. Abrasion resistance is then characterized, according to the Alumina SCE Test, by measuring reflected specular component excluded (SCE) values from the abraded samples according to principles understood by those with ordinary skill in the field of the disclosure. More particularly, SCE is a measure of diffuse reflection off of the surface of the anti-reflective coating 120, as measured using a Konica-Minolta CM700D with a 6 mm diameter aperture. According to some implementations, the anti-reflective coating 120 of the articles 100 can exhibit SCE values, as obtained from the Alumina SCE Test, of less than 0.4%, less than 0.2%, less than 0.18%, less than 0.16%, or even less than 0.08%. Abrasion-induced damage increases the surface roughness leading to the increase in diffuse reflection (i.e., SCE values). Lower SCE values indicates less severe damage, indicative of improved abrasion resistance.

The anti-reflective coating 120 and the article 100 may be described in terms of a hardness measured by a Berkovich Indenter Hardness Test. Further, those with ordinary skill in the art can recognize that abrasion resistance of the anti-reflective coating 120 and the article 100 can be correlated to the hardness of these elements. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the article 100 or the surface of the anti-reflective coating 120 (or the surface of any one or more of the layers in the anti-reflective coating) with the diamond Berkovich indenter to form an indent to an indentation depth in the range from about 50 nm to about 500 nm (or the entire thickness of the anti-reflective coating or layer, whichever is less) and measuring the hardness from this indentation at various points along the entire indentation depth range, along a specified segment of this indentation depth (e.g., in the depth range from about 100 nm to about 500 nm), or at a particular indentation depth (e.g., at a depth of 50 nm, 100 nm, 150 nm, 200 nm, 250 nm, 300 nm, 350 nm, 400 nm, 450 nm, 500 nm, etc.) generally using the methods set forth in Oliver, W. C. and Pharr, G. M., "An improved technique for determining hardness and elastic modulus using load and displacement sensing indentation experiments", *J. Mater. Res.*, Vol. 7, No. 6, 1992, 1564-1583; and Oliver, W. C. and Pharr, G. M., "Measurement of Hardness and Elastic Modulus by Instrument Indentation: Advances in Understanding and Refinements to Methodology", *J. Mater. Res.*, Vol. 19, No. 1, 2004, 3-20. Further, when hardness is measured over an indentation depth range (e.g., in the depth range from about 50 nm to about 500 nm), the results can be reported as a maximum hardness within the specified range, wherein the maximum hardness is selected from the measurements taken at each depth within that range. As used herein, "hardness" and "maximum hardness" both refer to as-measured hardness values, not averages of hardness values. Similarly, when hardness is measured at an indentation depth, the value of the hardness obtained from the Berkovich Indenter Hardness Test is given for that particular indentation depth.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response utilizes a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness; but instead, it reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

As noted above, those with ordinary skill in the art can consider various test-related considerations in ensuring that the hardness and maximum hardness values of the coating 120 and article 100 obtained from the Berkovich Indenter Hardness Test are indicative of these elements, rather than being unduly influenced by the substrate 110, for example. Further, embodiments of the articles of the disclosure surprisingly demonstrate high hardness values (e.g., a maximum hardness of 8 GPa or greater) associated with the anti-reflective coating 120 despite the relatively low thickness of the coating 120 (i.e., <500 nm). Indeed, as evidenced by the Examples detailed below in subsequent sections, the hardness of the high refractive index (RI) layer(s) 130B within an anti-reflective coating (see, e.g., FIGS. 2A-2C) can significantly influence the overall hardness and maximum hardness of the anti-reflective coating 120 and article 100, despite the relatively low thickness values associated with these layers. This is surprising because of the above test-related considerations, which detail how measured hardness is directly influenced by the thickness of a coating, for example the anti-reflective coating 120. In general, as a coating (over a thicker substrate) is reduced in thickness, and as the volume of harder material (e.g., as compared to other layers within the coating having a lower hardness) in the coating decreases, it would be expected that the measured hardness of the coating will trend toward the hardness of the underlying substrate. Nevertheless, the articles 100 of the disclosure, as including the anti-reflective coating 120 (and as also exemplified by the Examples outlined in detail below), surprisingly exhibit significantly high hardness values in comparison to the underlying substrate, thus demonstrating a unique combination of coating thickness (<500 nm), volumetric fraction of higher hardness material and optical properties.

In some embodiments, the anti-reflective coating 120 of the article 100 may exhibit a hardness or a maximum hardness of greater than about 8 GPa, as measured on the anti-reflective surface 122, by a Berkovich Indenter Hardness Test at an indentation depth of about 50 nm or greater. The antireflective coating 120 may exhibit a hardness or maximum hardness of about 8 GPa or greater, about 9 GPa or greater, about 10 GPa or greater, about 11 GPa or greater, about 12 GPa or greater, about 13 GPa or greater, about 14 GPa or greater, about 15 GPa or greater, or about 16 GPa or greater by a Berkovich Indenter Hardness Test at an indentation depth of about 50 nm or greater. The article 100, including the anti-reflective coating 120 and any additional coatings, as described herein, may exhibit a hardness or maximum hardness of about 8 GPa or greater, about 9 GPa or greater, about 10 GPa or greater, about 11 GPa or greater, about 12 GPa or greater, about 13 GPa or greater, or about 14 GPa or greater, as measured on the anti-reflective surface 122 by a Berkovich Indenter Hardness Test at an indentation depth of about 50 nm or greater. Such measured hardness and maximum hardness values may be exhibited by the anti-reflective coating 120 and/or the article 100 over an indentation depth of about 50 nm or greater, about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

Figure 2A:
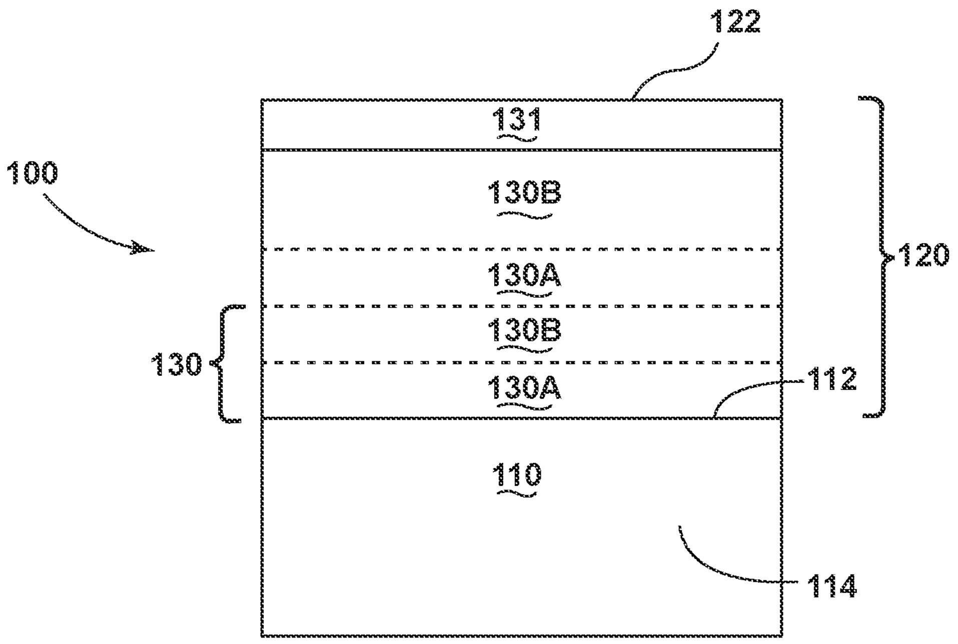
FIG. 2A is a side view of an article, according to one or more embodiments.
Figure 2B:
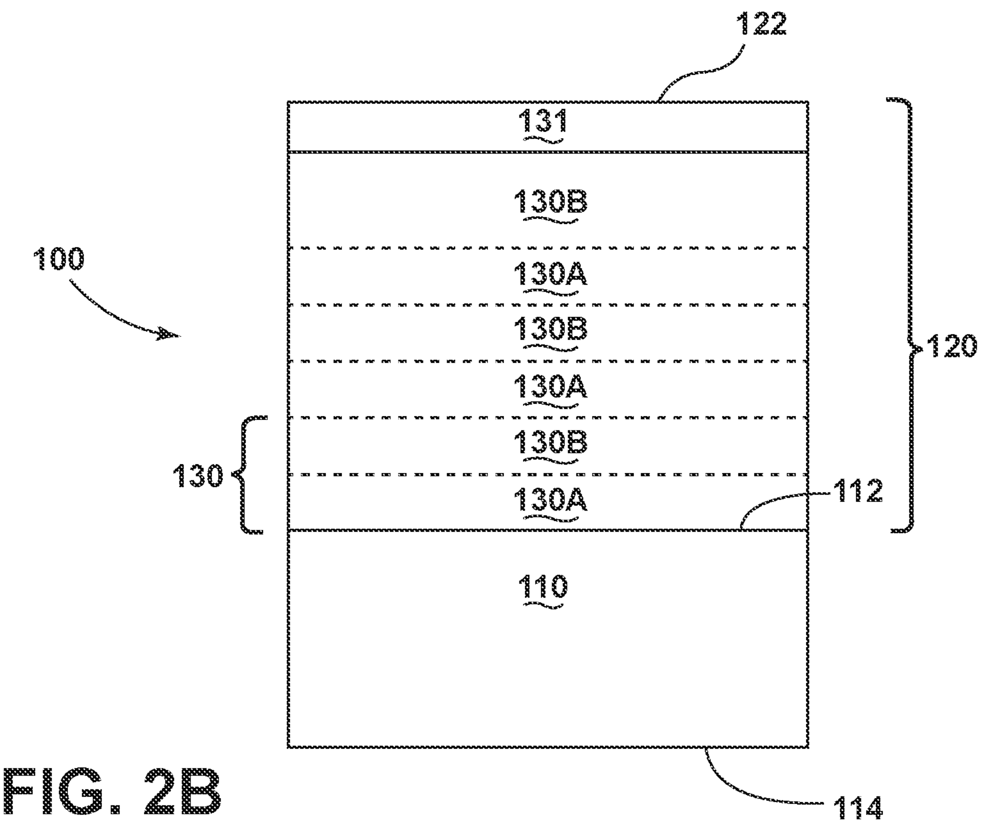
FIG. 2B is a side view of an article, according to one or more embodiments.
Figure 2C:
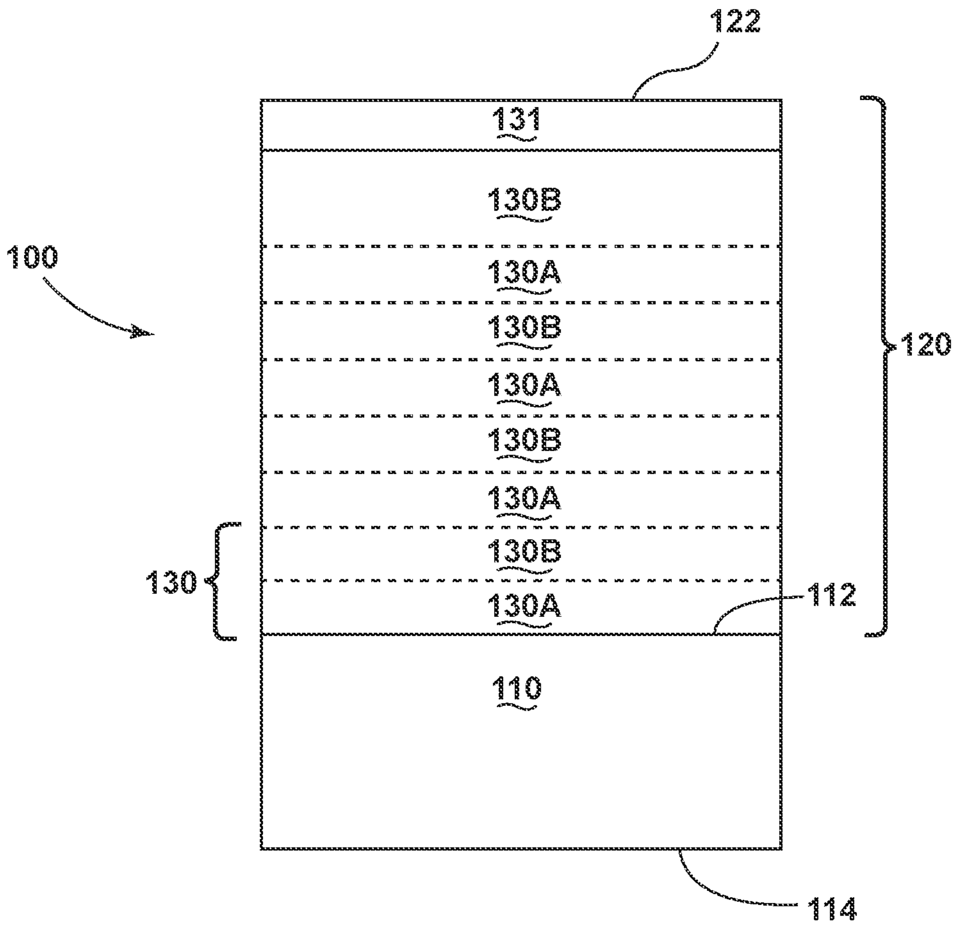
FIG. 2C is a side view of an article, according to one or more embodiments.

The anti-reflective coating 120 may have at least one layer made of material itself having a maximum hardness (as measured on the surface of such a layer, e.g., a surface of the second high RI layer 130B of FIG. 2A) of about 18 GPa or greater, about 19 GPa or greater, about 20 GPa or greater, about 21 GPa or greater, about 22 GPa or greater, about 23 GPa or greater, about 24 GPa or greater, about 25 GPa or greater, and all hardness values therebetween, as measured by the Berkovich Indenter Hardness Test over an indentation depth of about 50 nm or greater. These measurements are made on a hardness test stack comprising the designated layer of the anti-reflective coating 120 at a physical thickness of about 2 microns, as disposed on a substrate 110, to minimize the thickness-related hardness measurement effects described earlier. The maximum hardness of such a layer may be in the range from about 18 GPa to about 26 GPa, as measured by the Berkovich Indenter Hardness Test over an indentation depth from about 50 nm to about 500 nm. Such maximum hardness values may be exhibited by the material of at least one layer (e.g., the high RI layer(s) 130B, as shown in FIG. 2A) over an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article 100 exhibits a hardness that is greater than the hardness of the substrate (which can be measured on the opposite surface from the anti-reflective surface). Similarly, hardness values may be exhibited by the material of at least one layer (e.g., the high RI layer(s) 130B, as shown in FIGS. 2A-2C) over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In addition, these hardness and/or maximum hardness values associated with the at least one layer (e.g., the high RI layer(s) 130B) can also be observed at particular indentation depths (e.g., at 25 nm, at 50 nm, at 75 nm, at 100 nm, 200 nm, etc.) over the measured indentation depth ranges.

Optical interference between reflected waves from the interface between the anti-reflective coating 120 and air, and from the interface between the anti-reflective coating 120 and substrate 110, can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features, for example, under fluorescent lighting and some LED lighting. Angular color shifts in transmission may also play a factor in angular color shifts in reflection and vice versa. Factors in angular color shifts in transmission and/or reflection may also include angular color shifts due to viewing angle or color shifts away from a certain white point that may be caused by material absorption (somewhat independent of angle) defined by a particular illuminant or test system.

The oscillations may be described in terms of amplitude. As used herein, the term "amplitude" includes the peak-to-valley change in reflectance or transmittance. The phrase "average amplitude" includes the peak-to-valley change in reflectance or transmittance averaged within the optical wavelength regime. As used herein, the "optical wavelength regime" includes the wavelength range from about 400 nm to about 800 nm (and more specifically from about 450 nm to about 650 nm). According to some embodiments, the optical wavelength range further includes the infrared spectrum from 800 nm to 1000 nm.

The embodiments of this disclosure include an anti-reflective coating (e.g., anti-reflective coating 120 or optical film structure 120) to provide improved optical performance, in terms of colorlessness and/or smaller angular color shifts when viewed at varying incident illumination angles from normal incidence under different illuminants.

One aspect of this disclosure pertains to an article that exhibits colorlessness in reflectance and/or transmittance even when viewed at different incident illumination angles under an illuminant. In one or more embodiments, the article exhibits an angular color shift in reflectance and/or transmittance of about 5 or less, or about 2 or less, between a reference illumination angle and any incidental illumination angles, in the ranges provided herein. As used herein, the phrase "color shift" (angular or reference point) refers to the change in both a* and b*, under the International Commission on Illumination (CIE) L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following Equation (1):

$$\sqrt{\left((a_2^* - a_1^*)^2 + (b_2^* - b_1^*)^2\right)} \quad (1)$$

with $a^*_1$, and $b^*_1$ representing the a* and b* coordinates of the article when viewed at a reference illumination angle (which may include normal incidence) and $a^*_2$, and $b^*_2$ representing the a* and b* coordinates of the article when viewed at an incident illumination angle, provided that the incident illumination angle is different from the reference illumination angle and in some cases differs from the reference illumination angle by about 1 degree or more, 2 degrees or more, about 5 degrees or more, about 10 degrees or more, about 15 degrees or more, or about 20 degrees or more. In some instances, an angular color shift in reflectance and/or transmittance of about 10 or less, 9 or less, 8 or less, 7 or less, 6 or less, 5 or less, 4 or less, 3 or less, or even 2 or less is exhibited by the article when viewed at various incident illumination angles from a reference illumination angle, under an illuminant. In some instances the angular color shift in reflectance and/or transmittance is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at an incident illumination angle from the reference illumination angle under a CIE F2, F10, F11, F12 or D65 illuminant or more specifically under a CIE F2 illuminant.

The reference illumination angle may include normal incidence (i.e., 0 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided that the difference between the reference illumination angle and the difference between the incident illumination angle and the reference illumination angle is about 1 degree or more, 2 degrees or more, about 5 degrees or more, about 10 degrees or more, about 15 degrees or more, or about 20 degrees or more. The incident illumination angle may be, with respect to the reference illumination angle, in the range from about 5 degrees to about 80 degrees, from about 5 degrees to about 75 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the reference illumination angle is normal incidence. In some embodiments, the article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the difference between the incident illumination angle and the reference illumination angle is about 1 degree or more, 2 degrees or more, about 5 degrees or more, about 10 degrees or more, about 15 degrees or more, or about 20 degrees or more. In one example, the article may exhibit an angular color shift in reflectance and/or transmittance of 2 or less at any incident illumination angle in the range from about 2 degrees to about 60 degrees, from about 5 degrees to about 60 degrees, or from about 10 degrees to about 60 degrees away from a reference illumination angle equal to normal incidence. In other examples, the article may exhibit an angular color shift in reflectance and/or transmittance of 2 or less when the reference illumination angle is 10 degrees and the incident illumination angle is any angle in the range from about 12 degrees to about 60 degrees, from about 15 degrees to about 60 degrees, or from about 20 degrees to about 60 degrees away from the reference illumination angle.

In some embodiments, the angular color shift may be measured at all angles between a reference illumination angle (e.g., normal incidence) and an incident illumination angle in the range from about 20 degrees to about 80 degrees. In other words, the angular color shift may be measured and may be less than about 5, or less than about 2, at all angles in the range from about 0 degrees to about 20 degrees, from about 0 degrees to about 30 degrees, from about 0 degrees to about 40 degrees, from about 0 degrees to about 50 degrees, from about 0 degrees to about 60 degrees, or from about 0 degrees to about 80 degrees.

In one or more embodiments, the article 100 exhibits a color in the CIE L*, a*, b* colorimetry system in reflectance and/or transmittance such that the distance or reference point color shift between the transmittance color or reflectance coordinates from a reference point is less than about 10, less than about 8, less than about 6, less than about 5, less than about 4, less than about 3, or less than about 2, under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). In specific examples, the articles exhibit a color shift in reflectance and/or transmittance of about 2 or less when viewed at an incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the anti-reflective surface 122 having a reference point color shift of less than about 2 from a reference point, as defined herein. Unless otherwise noted, the transmittance color or transmittance color coordinates are measured on two surfaces of the article including at the anti-reflective surface 122 and the opposite bare surface of the article (i.e., 114). Unless otherwise noted, the reflectance color or reflectance color coordinates are measured on only the anti-reflective surface 122 of the article.

In one or more embodiments, the reference point may be the origin (0, 0) in the CIE L*, a*, b* colorimetry system (or the color coordinates a*=0, b*=0), color coordinates (a*=−2, b*=−2) or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

In one or more specific embodiments, the reference point color shift of the transmittance color and/or the reflectance color may be less than 1 or even less than 0.5. In one or more specific embodiments, the reference point color shift for the transmittance color and/or the reflectance color may be 1.8, 1.6, 1.4, 1.2, 0.8, 0.6, 0.4, 0.2, 0 and all ranges and sub-ranges therebetween. Where the reference point is the color coordinates a*=0, b*=0, the reference point color shift is calculated by Equation (2):

$$\text{reference point color shift} = \sqrt{\left((a^*_{article})^2 + (b^*_{article})^2\right)} \tag{2}$$

In some embodiments, the article 100 may exhibit a transmittance color (or transmittance color coordinates) and a reflectance color (or reflectance color coordinates) such that the reference point color shift is less than 2 when the reference point is any one of the color coordinates of the substrate, the color coordinates a*=0, b*=0 and the color coordinates a*=−2, b*=−2.

In some embodiments, the article 100 may exhibit a first-surface reflected color given by Equation (3) below of less than 5, less than 4, less than 3, less than 2, or even less than 1 for 6° and 20° incidence. In some implementations, the article 100 may exhibit a first-surface reflected color given by Equation (3) below of less than 10, less than 9, less than 8, less than 7, less than 6, less than 5, or even less than 4 for all angles from 0° to 60° incidence.

$$\text{first-surface reflected color} = \sqrt{\left((a^*_{article})^2 + (b^*_{article})^2\right)} \tag{3}$$

where the reflected color coordinates in the CIE L*, a*, b* colorimetry system are measured at one or more angles of incidence.

In some embodiments, the article 100 may exhibit a two-surface transmitted color given by Equation (4) below of less than 2, less than 1.8, less than 1.6, less than 1.4, less than 1.2, less than 1.0, or even less than 0.8 for 0° or near-normal incidence.

$$\text{two-surface transmitted color} = \sqrt{\left((a^*_{article})^2 + (b^*_{article})^2\right)} \tag{4}$$

where the transmitted color coordinates in the CIE L*, a*, b* colorimetry system are measured at 0° or near-normal incidence.

The article 100 of one or more embodiments, or the anti-reflective surface 122 of one or more articles, may exhibit a two-surface (e.g., through both major surfaces 112, 114 and one of these surfaces has an anti-reflective coating 120) photopic average light transmittance of about 93% or greater, of about 94% or greater (e.g., about 94% or greater, about 95% or greater, about 96% or greater, about 96.5% or greater, about 97% or greater, about 97.5% or greater, about 98% or greater, about 98.5% or greater or about 99% or greater) at 0° or near-normal incidence.

In some embodiments, the article 100, or the anti-reflective surface 122 of one or more articles, may exhibit an average light reflectance of about 1% or less (e.g., 1%, 0.9%, 0.8%, 0.75%, 0.6%, 0.5% or less, or 0.25% or less) over the optical wavelength regime in the range from about 400 nm to about 800 nm. These light transmittance and light reflectance values may be observed over the entire optical wavelength regime or over selected ranges of the optical wavelength regime (e.g., a 100 nm wavelength range, a 150 nm wavelength range, a 200 nm wavelength range, a 250 nm wavelength range, a 280 nm wavelength range, or a 300 nm wavelength range, within the optical wavelength regime). In some embodiments, these light reflectance and transmittance values may be a total reflectance or total transmittance (taking into account reflectance or transmittance on both the anti-reflective surface 122 and the opposite major surface 114). Unless otherwise specified, the average reflectance or transmittance is measured at an incident illumination angle of 0 degrees (however, such measurements may be provided at incident illumination angles of 45 degrees or 60 degrees).

The article 100 of one or more embodiments, or the anti-reflective surface 122 of one or more articles, may exhibit a two-surface average light transmittance of about 93% or greater, about 94% or greater, or about 95% or greater over the optical wavelength regime in the infrared spectrum from about 800 nm to about 1000 nm, from about 900 nm to 1000 nm, from 840 nm to 860 nm, or from 930 nm to 950 nm at 0° or near-normal incidence. In other implementations, the article 100 may exhibit a two-surface average light transmittance of about 85% or greater, about 87% or greater, about 89% or greater, about 91% or greater, about 93% or greater, or about 95% or greater over the optical wavelength regime in the infrared spectrum from about 800 nm to about 1000 nm, from about 900 nm to 1000 nm, from 840 nm to 860 nm, or from 930 nm to 950 nm at 0° or near-normal incidence. In some embodiments, the article 100, or the anti-reflective surface 122 of one or more articles, may exhibit an average light reflectance of about 3% or less, 2.5% or less, 2% or less, 1.5% or less, 1% or less, 0.75% or less, or even about 0.5% or less over the infrared spectrum from about 800 nm to about 1000 nm, from about 900 nm to 1000 nm, from 840 nm to 860 nm, or from 930 nm to 950 nm at 6° incidence. These light transmittance and light reflectance values may be observed over the entire optical wavelength regime or over selected ranges of the optical wavelength regime (e.g., a 100 nm wavelength range, a 150 nm wavelength range, a 200 nm wavelength range, a 250 nm wavelength range, a 280 nm wavelength range, or a 300 nm wavelength range, within the optical wavelength regime). In some of these embodiments, the light reflectance and transmittance values may be a total reflectance or total transmittance (taking into account reflectance or transmittance on both the anti-reflective surface 122 and the opposite major surface 114). Unless otherwise specified, the average reflectance or transmittance of these embodiments is measured at an incident illumination angle of 0 degrees (however, such measurements may be provided at incident illumination angles of 45 degrees or 60 degrees).

In some embodiments, the article 100 of one or more embodiments, or the anti-reflective surface 122 of one or more articles, may exhibit a visible photopic average reflectance of about 1% or less, about 0.9% or less, about 0.8% or less, about 0.7% or less, about 0.6% or less, about 0.5% or less, about 0.4% or less, about 0.3% or less, or about 0.2% or less, over the optical wavelength regime at 6° and 20° incidence. These photopic average reflectance values may be exhibited at incident illumination angles in the range from about 0° to about 20°, from about 0° to about 40°, or from about 0° to about 60°. As used herein, "photopic average reflectance" mimics the response of the human eye by weighting the reflectance versus wavelength spectrum according to the human eye's sensitivity. Photopic average reflectance may also be defined as the luminance, or tristimulus Y value of reflected light, according to known conventions for example CIE color space conventions. The photopic average reflectance is defined in Equation (5) as the spectral reflectance, $R(\lambda)$, multiplied by the illuminant spectrum, $I(\lambda)$, and the CIE's color matching function, $\bar{y}(\lambda)$, related to the eye's spectral response:

$$\langle R_p \rangle = \int_{380\ nm}^{720\ nm} R(\lambda) \times I(\lambda) \times \bar{y}(\lambda) d\lambda. \quad (5)$$

In some embodiments, the anti-reflective surface 122 of one or more articles (i.e., when measuring the anti-reflective surface 122 only through a single-sided measurement) may exhibit a visible photopic average reflectance of about 1% or less, about 0.9% or less, about 0.7% or less, about 0.5% or less, about 0.45% or less, about 0.4% or less, about 0.35% or less, about 0.3% or less, about 0.25% or less, or about 0.2% or less. In such "single-sided" measurements as described in this disclosure, the reflectance from the second major surface (e.g., surface 114 shown in FIG. 1) is removed by coupling this surface to an index-matched absorber.

Substrate

The substrate 110 may include an inorganic oxide material and may include an amorphous substrate, a crystalline substrate or a combination thereof. In one or more embodiments, the substrate exhibits a refractive index in the range from about 1.45 to about 1.55, e.g., 1.45, 1.46, 1.47, 1.48, 1.49, 1.50, 1.51, 1.52, 1.53, 1.54, 1.55, and all refractive indices therebetween.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's modulus values for the substrate itself as recited in this disclosure refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates, for example, glass-ceramic, or ceramic, substrates (which may be strengthened or non-strengthened), or may include a single crystal structure, for example, sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, for example white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate, for example, glass, various forming methods can include float glass processes, rolling processes, updraw processes, and down-draw processes, for example fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, for example thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, and any additional steps (e.g., annealing, washing, and the like) are generally determined by the composition of the substrate, the desired compressive stress (CS), and the desired depth of compressive stress (CS) layer (or depth of layer) of the substrate that result from the strengthening operation. By way of example, ion exchange of alkali metal-containing glass substrates may be achieved by immersion in at least one molten bath containing a salt for example, but not limited to, nitrates, sulfates, and chlorides of the larger alkali metal ion. The temperature of the molten salt bath typically is in a range from about 380 °C up to about 450 °C, while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications", claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), peak CS, depth of compression (DOC, which is the point along the thickness wherein compression changes to tension), and depth of ion layer (DOL). Peak CS, which is a maximum observed compressive stress, may be measured near the surface of the substrate 110 or within the strengthened glass at various depths. A peak CS value may include the measured CS at the surface ($CS_s$) of the strengthened substrate. In other embodiments, the peak CS is measured below the surface of the strengthened substrate. Compressive stress (including surface CS) is measured by a surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) technique known in the art. Refracted near-field (RNF) method or SCALP may be used to measure (graph, depict visually, or otherwise map out) the complete stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In some embodiments, a strengthened substrate 110 can have a peak CS of 250 MPa or greater, 300 MPa or greater, 400 MPa or greater, 450 MPa or greater, 500 MPa or greater, 550 MPa or greater, 600 MPa or greater, 650 MPa or greater, 700 MPa or greater, 750 MPa or greater, or 800 MPa or greater. The strengthened substrate may have a DOC of 10 μm or greater, 15 μm or greater, 20 μm or greater (e.g., 25 μm, 30 μm, 35 μm, 40 μm, 45 μm, 50 μm, or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a peak CS greater than 500 MPa, a DOC greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3)\geq 66$ mol. %, and $Na_2O\geq 9$ mol. %. In some embodiments, the glass composition includes about 6 wt. % aluminum oxide or more. In some embodiments, the substrate includes a glass composition with one or more alkaline earth oxides, such that a content of alkaline earth oxides is about 5 wt. % or more. Suitable glass compositions, in some embodiments, further comprise at least one of $K_2O$, MgO, or CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$;

less than 50 ppm $As_2O_3$; and less than 50 ppm $Sb_2O_3$; where 12 mol. %≤($Li_2O$+$Na_2O$+$K_2O$)≤20 mol. % and 0 mol. %≤(MgO+CaO)≤10 mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O$+$Na_2O$+$K_2O$)≤18 mol. % and 2 mol. %≤(MgO+CaO)≤7 mol. %.

In some embodiments, an alkali aluminosilicate glass composition suitable for the substrate 110 comprises alumina, at least one alkali metal and, in some embodiments, greater than 50 mol. % $SiO_2$, in other embodiments 58 mol. % $SiO_2$ or more, and in still other embodiments 60 mol. % $SiO_2$ or more, wherein the ratio ($Al_2O_3$+$B_2O_3$)/Σmodifiers (i.e., sum of modifiers) is greater than 1, wherein the ratio of these components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio ($Al_2O_3$+$B_2O_3$)/Σmodifiers (i.e., sum of modifiers) is greater than 1.

In some embodiments, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)—$Al_2O_3$≤2 mol. %; 2 mol. %≤$Na_2O$—$Al_2O_3$≤6 mol. %; and 4 mol. %≤($Na_2O$+$K_2O$)—$Al_2O_3$≤10 mol. %.

In some embodiments, the substrate 110 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass-ceramic substrate, which may be strengthened or non-strengthened. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

The substrate 110, according to one or more embodiments, can have a physical thickness ranging from about 50 μm to about 5 mm. Example substrate 110 physical thicknesses range from about 50 μm to about 500 μm (e.g., 50, 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Anti-Reflective Coating

As shown in FIG. 1, the anti-reflective coating 120 of the article 100 may include a plurality of layers 120A, 120B, 120C. In some embodiments, one or more layers may be disposed on the opposite side of the substrate 110 from the anti-reflective coating 120 (i.e., on the second major surface 114) (not shown in FIG. 1). In some embodiments of the article 100, layer 120C, as shown in FIG. 1, can serve as a capping layer (e.g., capping layer 131 as shown in FIGS. 2A-2C and described in the sections below).

The physical thickness of the anti-reflective coating 120 may be in the range from about 50 nm to less than 500 nm. In some instances, the physical thickness of the anti-reflective coating 120 may be in the range from about 10 nm to less than 500 nm, from about 50 nm to less than 500 nm, from about 75 nm to less than 500 nm, from about 100 nm to less than 500 nm, from about 125 nm to less than 500 nm, from about 150 nm to less than 500 nm, from about 175 nm to less than 500 nm, from about 200 nm to less than 500 nm, from about 225 nm to less than 500 nm, from about 250 nm to less than 500 nm, from about 300 nm to less than 500 nm, from about 350 nm to less than 500 nm, from about 400 nm to less than 500 nm, from about 450 nm to less than 500 nm, from about 200 nm to about 450 nm, and all ranges and sub-ranges therebetween. For example, the physical thickness of the anti-reflective coating 120 may be from: 10 nm to 490 nm, from 10 nm to 480 nm, from 10 nm to 475 nm, from 10 nm to 460 nm, from 10 nm to 450 nm, from 10 nm to 430 nm, from 10 nm to 425 nm, from 10 nm to 420 nm, from 10 nm to 410 nm, from 10 nm to 400 nm, from 10 nm to 350 nm, from 10 nm to 300 nm, from 10 nm to 250 nm, from 10 nm to 225 nm, from 10 nm to 200 nm, from 15 nm to 490 nm, from 20 nm to 490 nm, from 25 nm to 490 nm, from 30 nm to 490 nm, from 35 nm to 490 nm, from 40 nm to 490 nm, from 45 nm to 490 nm, from 50 nm to 490 nm, from 55 nm to 490 nm, from 60 nm to 490 nm, from 65 nm to 490 nm, from 70 nm to 490 nm, from 75 nm to 490 nm, from 80 nm to 490 nm, from 85 nm to 490 nm, from 90 nm to 490 nm, from 95 nm to 490 nm, from 100 nm to 490 nm, from 10 nm to 485 nm, from 15 nm to 480 nm, from 20 nm to 475 nm, from 25 nm to 460 nm, from 30 nm to 450 nm, from 35 nm to 440 nm, from 40 nm to 430 nm, from 50 nm to 425 nm, from 55 nm to 420 nm, from 60 nm to 410 nm, from 70 nm to 400 nm, from 75 nm to 400 nm, from 80 nm to 390 nm, from 90 nm to 380 nm, from 100 nm to 375 nm, from 110 nm to 370 nm, from 120 nm to 360 nm, from 125 nm to 350 nm, from 130 nm to 325 nm, from 140 nm to 320 nm, from 150 nm to 310 nm, from 160 nm to 300 nm, from 170 nm to 300 nm, from 175 nm to 300 nm, from 180 nm to 290 nm, from 190 nm to 280 nm, from 200 nm to 275 nm, from 275 nm to 350 nm. Further, in some implementations of the article 100 shown in FIG. 1 (and FIGS. 2A-2C as detailed in the subsequent corresponding description) the physical thickness of the anti-reflective coating 120 (again, also referred herein as the optical film structure 120) can be 50 nm, 75 nm, 100 nm, 125 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 475 nm, and 500 nm, and all physical thickness values between the foregoing thicknesses.

In one or more embodiments, as shown in FIGS. 2A, 2B and 2C, the anti-reflective coating 120 of the article 100 may include a period 130 comprising two or more layers. In one or more embodiments, the two or more layers may be characterized as having different refractive indices from each another. In some embodiments, the period 130 includes a first low RI layer 130A and a second high RI layer 130B. The difference in the refractive index of the first low RI layer 130A and the second high RI layer 130B may be about 0.01 or greater, 0.05 or greater, 0.1 or greater or even 0.2 or greater. In some implementations, the refractive index of the low RI layer(s) 130A is within the refractive index of the substrate 110 such that the refractive index of the low RI layer(s) 130A is less than or equal to about 1.8; and the high RI layer(s) 130B have a refractive index that is greater than 1.8, greater than 1.9, greater than 2.0, greater than 2.1, or even greater than 2.2.

As shown in FIG. 2A, the anti-reflective coating 120 of the article 100 may include a plurality of periods (130). A single period includes a first low RI layer 130A and a second high RI layer 130B, such that when a plurality of periods are provided, the first low RI layer 130A (designated for illustration as "L") and the second high RI layer 130B (designated for illustration as "H") alternate in the following sequence of layers: L/H/L/H, such that the first low RI layer and the second high RI layer appear to alternate along the physical thickness of the anti-reflective coating 120. In the example in FIG. 2A, the anti-reflective coating 120 includes two (2) periods 130 such that there are two pairs of low RI and high RI layers 130A and 130B, respectively (i.e., four layers in total of 130A, 130B beneath the capping layer 131). In the example in FIG. 2B, the anti-reflective coating 120 includes three (3) periods 130 such that there are three pairs of low RI and high RI layers 130A and 130B, respectively (i.e., six layers in total of 130A, 130B beneath the capping layer 131). In the example in FIG. 2C, the anti-reflective coating 120 includes four (4) periods 130 such that there are four pairs of low RI and high RI layers 130A and 130B, respectively (i.e., eight layers in total of 130A, 130B beneath the capping layer 131). In some embodiments, the anti-reflective coating 120 may include one (1) period, two (2) periods, three (3) periods, or four (4) periods 130. Preferably, the anti-reflective coating 120 includes two (2) periods or three (3) periods 130.

In the embodiments of the article 100 shown in FIGS. 2A-2C, the anti-reflective coating 120 includes an additional capping layer 131, which may include a lower refractive index material than the second high RI layer 130B. In some implementations, the refractive index of the capping layer 131 is the same or substantially the same as the refractive index of the low RI layers 130A. That is, the capping layer 131 can be a low RI layer with the same composition, structure and refractive index of the low RI layers 130A.

In the embodiments of the article 100 shown in FIGS. 2A-2C, the anti-reflective coating 120 is configured such that one low RI layer 130A is directly on and disposed in contact with a major surface (e.g., major surface 112) of the substrate 110. According to embodiments, the low RI layer 130A that is directly on and disposed in contact with one of the major surfaces 112, 114 of the substrate 110 may have the same composition as the other low RI layers 130A, or it may have a different composition, provided that it has a refractive index of less than or equal to about 1.8.

As used herein, the terms "low RI" and "high RI" refer to the relative values for the RI of each layer relative to the RI of another layer within the anti-reflective coating 120 (e.g., low RI<high RI). In one or more embodiments, the term "low RI" when used with the first low RI layer 130A or with the capping layer 131, includes a range from about 1.3 to about 1.8. In one or more embodiments, the term "high RI" when used with the high RI layer 130B, includes a range from greater than about 1.8 to about 2.5, e.g., about 1.9, 2.0, 2.1, 2.2, 2.3, 2.4 or 2.5.

Exemplary materials suitable for use in the anti-reflective coating 120 include: $SiO_2$, $Al_2O_3$, $GeO_2$, $SiO_x$, $AlO_xN_y$, AlN, oxygen-doped $SiN_x$, $SiN_x$, $SiO_xN_y$, $Si_uAl_vO_xN_y$, $TiO_2$, $ZrO_2$, TiN, MgO, $HfO_2$, $Y_2O_3$, $ZrO_2$, diamond-like carbon, and $MgAl_2O_4$.

Some examples of suitable materials for use in the low RI layer(s) 130A include $SiO_2$, $Al_2O_3$, $GeO_2$, $SiO_x$, $AlO_xN_y$, $SiO_xN_y$, $Si_uAl_vO_xN_y$, MgO, and $MgAl_2O_4$. The nitrogen content of the materials for use in the first low RI layer 130A (i.e., the layer 130A in contact with the substrate 110) may be minimized (e.g., in materials, for example, $Al_2O_3$ and $MgAl_2O_4$). In some embodiments, the low RI layer(s) 130A and the capping layer 131 in the anti-reflective coating 120 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the low RI layer(s) 130A and the capping layer 131 comprise a silicon-containing oxide, e.g., $SiO_2$ or $SiO_x$.

Some examples of suitable materials for use in the high RI layer(s) 130B include $Si_uAl_vO_xN_y$, AlN, oxygen-doped $SiN_x$, $Si_3N_4$, $AlO_xN_y$, $SiO_xN_y$, $HfO_2$, $TiO_2$, $ZrO_2$, $Y_2O_3$, $ZrO_2$, $Al_2O_3$, and diamond-like carbon. The oxygen content of the materials for the high RI layer(s) 130B may be minimized, especially in $SiN_x$ or $AlN_x$ materials. The foregoing materials may be hydrogenated up to about 30% by weight. In some embodiments, the high RI layer(s) 130B in the anti-reflective coating 120 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the high RI layer(s) 130B comprise a silicon-containing nitride or a silicon-containing oxynitride, e.g., $Si_3N_4$ or $SiO_xN_y$. The hardness of the high RI layer may be characterized specifically. In some embodiments, the maximum hardness of the high RI layer(s) 130B, as measured by the Berkovich Indenter Hardness Test over an indentation depth of about 50 nm or greater (i.e., as on a hardness test stack with a 2 micron thick layer of the material of the layer 130B disposed on a substrate 110), may be about 18 GPa or greater, about 20 GPa or greater, about 22 GPa or greater, about 24 GPa or greater, about 26 GPa or greater, and all values therebetween.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, for example $Al_2O_3$. It is also common to describe solids using an equivalent "atomic fraction formula" description, for example $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6, respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. To speak generally about an alloy, for example aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e., v+x=1), then the formula would be an atomic fraction description. Similarly, more complicated mixtures can be described, for example $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance, an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the anti-reflective coating 120, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the anti-reflective coating 120 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

In one or more embodiments, one or more of the layers of the anti-reflective coating 120 of the article 100 (e.g., as shown in FIGS. 2A-2C) may include a specific optical thickness range. As used herein, the term "optical thickness" is determined by (n*d), where "n" refers to the RI of the sub-layer and "d" refers to the physical thickness of the layer. In one or more embodiments, at least one of the layers of the anti-reflective coating 120 may include an optical thickness in the range from about 2 nm to about 200 nm, from about 10 nm to about 100 nm, or from about 15 nm to about 100 nm. In some embodiments, all of the layers in the anti-reflective coating 120 have an optical thickness in the range from about 2 nm to about 200 nm, from about 10 nm to about 100 nm, or from about 15 nm to about 100 nm. In some cases, at least one layer of the anti-reflective coating 120 has an optical thickness of about 50 nm or greater. In some cases, each of the low RI layers 130A and capping layer 131 have an optical thickness in the range from about 2 nm to about 200 nm, from about 10 nm to about 100 nm, or from about 15 nm to about 100 nm. In other cases, each of the high RI layers 130B have an optical thickness in the range from about 2 nm to about 200 nm, from about 10 nm to about 100 nm, or from about 15 nm to about 100 nm. In some embodiments, each of the high RI layers 130B have an optical thickness in the range from about 2 nm to about 500 nm, or from about 10 nm to about 490 nm, or from about 15 nm to about 480 nm, or from about 25 nm to about 475 nm, or from about 25 nm to about 470 nm, or from about 30 nm to about 465 nm, or from about 35 nm to about 460 nm, or from about 40 nm to about 455 nm, or from about 45 nm to about 450 nm, and any and all sub-ranges between these values. In some embodiments, the capping layer 131 (see FIGS. 2A-2C and 3), or the outermost low RI layer 130A for configurations without a capping layer 131, has a physical thickness of less than about 100 nm, less than about 90 nm, less than about 85 nm, or less than 80 nm. In other embodiments of the article 100, the capping layer 131 has a physical thickness from 80 nm to 100 nm, or from 85 nm to 95 nm. In some implementations, the capping layer 131 has a physical thickness of 70 nm, 75 nm, 80 nm, 85 nm, 90 nm, 95 nm, 100 nm, 105 nm, 110 nm, 115 nm, 120 nm, 125 nm, or any of the thickness values between the foregoing thicknesses.

As noted earlier, embodiments of the article 100 are configured such that the physical thickness of one or more of the layers of the anti-reflective coating 120 are minimized. In one or more embodiments, the physical thickness of the high RI layer(s) 130B and/or the low RI layer(s) 130A are minimized such that they total from about 50 nm to less than about 500 nm. In one or more embodiments, the combined physical thickness of the high RI layer(s) 130B, the low RI layer(s) 130A and any capping layer 131 may be from: 10 nm to 490 nm, from 10 nm to 480 nm, from 10 nm to 475 nm, from 10 nm to 460 nm, from 10 nm to 450 nm, from 10 nm to 430 nm, from 10 nm to 425 nm, from 10 nm to 420 nm, from 10 nm to 410 nm, from 10 nm to 400 nm, from 10 nm to 350 nm, from 10 nm to 300 nm, from 10 nm to 250 nm, from 10 nm to 225 nm, from 10 nm to 200 nm, from 15 nm to 490 nm, from 20 nm to 490 nm, from 25 nm to 490 nm, from 30 nm to 490 nm, from 35 nm to 490 nm, from 40 nm to 490 nm, from 45 nm to 490 nm, from 50 nm to 490 nm, from 55 nm to 490 nm, from 60 nm to 490 nm, from 65 nm to 490 nm, from 70 nm to 490 nm, from 75 nm to 490 nm, from 80 nm to 490 nm, from 85 nm to 490 nm, from 90 nm to 490 nm, from 95 nm to 490 nm, from 100 nm to 490 nm, from 10 nm to 485 nm, from 15 nm to 480 nm, from 20 nm to 475 nm, from 25 nm to 460 nm, from 30 nm to 450 nm, from 35 nm to 440 nm, from 40 nm to 430 nm, from 50 nm to 425 nm, from 55 nm to 420 nm, from 60 nm to 410 nm, from 70 nm to 400 nm, from 75 nm to 400 nm, from 80 nm to 390 nm, from 90 nm to 380 nm, from 100 nm to 375 nm, from 110 nm to 370 nm, from 120 nm to 360 nm, from 125 nm to 350 nm, from 130 nm to 325 nm, from 140 nm to 320 nm, from 150 nm to 310 nm, from 160 nm to 300 nm, from 170 nm to 300 nm, from 175 nm to 300 nm, from 180 nm to 290 nm, from 190 nm to 280 nm, from 200 nm to 275 nm, from 275 nm to 350 nm. Further, in some implementations of the article 100 shown in FIG. 1 (and FIGS. 2A-2C as detailed in the subsequent corresponding description) the combined physical thickness of the high RI layer(s) 130B, the low RI layer(s) 130A and any capping layer 131 can be 50 nm, 75 nm, 100 nm, 125 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 475 nm, and 500 nm, and all physical thickness values between the foregoing thicknesses.

In one or more embodiments, the combined physical thickness of the high RI layer(s) 130B of the anti-reflective coating 120 of the article 100 shown in FIGS. 2A-2C may be characterized. For example, in some embodiments, the combined physical thickness of the high RI layer(s) 130B may be about 90 nm or greater, about 100 nm or greater, about 150 nm or greater, about 200 nm or greater, about 250 nm or greater, or about 300 nm or greater, but less than 500 nm. The combined physical thickness is the calculated combination of the physical thicknesses of the individual high RI layer(s) 130B in the anti-reflective coating 120, even when there are intervening low RI layer(s) 130A or other layer(s). In some embodiments, the combined physical thickness of the high RI layer(s) 130B, which may also comprise a high-hardness material (e.g., a nitride or an oxynitride), may be from about 30%, to about 60% of the total physical thickness of the anti-reflective coating (or, alternatively referred to in the context of volume). In some implementations, the combined physical thickness of the high RI layer(s) 130B, which may also comprise a high-hardness material (e.g., a nitride or an oxynitride), may be from about 40% to about 60%, or from about 45% to about 55%, of the total physical thickness of the anti-reflective coating. For example, the combined physical thickness (or volume) of the high RI layer(s) 130B may be about 30%, 35%, 40%, 41%, 42%, 43%, 44%, 45%, 46%, 47%, 48%, 49%, 50%, 51%, 52%, 53%, 54%, 55%, 56%, 57%, 58%, 59%, or 60% of the total physical thickness (or volume) of the anti-reflective coating 120. Without being bound by theory, embodiments of the article 100 are configured with the combined thickness levels of the high RI layers 130B to maintain a careful balance of abrasion resistance and optical properties (e.g., as manifested by the maximum hardness levels and optical transmittance in the infrared spectrum, as also detailed in this disclosure). At higher combined thickness levels >60%, abrasion resistance may be acceptable, but optical properties may be somewhat degraded relative to the levels outlined in the disclosure. Conversely, at lower combined thickness levels >40%, the optical properties may be acceptable, but the mechanical properties could be degraded to levels below those outlined in this disclosure.

In one or more embodiments of the articles 100 shown in FIGS. 2A-2C, the thickest high RI layer 130B in the anti-reflective coating 120 (e.g., the high RI layer 130B beneath the capping layer 131) can be configured with a physical thickness that ranges from 100 nm to 250 nm, 120 nm to 180 nm, or 125 nm to 160 nm. In some implementations of the articles 100 shown in FIGS. 2A-2C, the first low RI layer 130A directly on and disposed in contact with the first or second major surface 112, 114 of the substrate 110 can be configured with a physical thickness that ranges from 10 nm to 40 nm, 15 nm to 35 nm, or from 20 nm to 30 nm. Without being bound by theory, embodiments of the article 100 that are configured with one or more of the foregoing physical thickness ranges from the thickest high RI layer 130B and the low RI layer 130A directly on and disposed in contact with the first or second major surface 112, 114 of the substrate 110 can exhibit a superior combination of abrasion resistance and optical properties (e.g., as manifested by the maximum hardness levels and optical reflectance and/or transmittance in the infrared spectrum, as also detailed in this disclosure).

Figure 3:
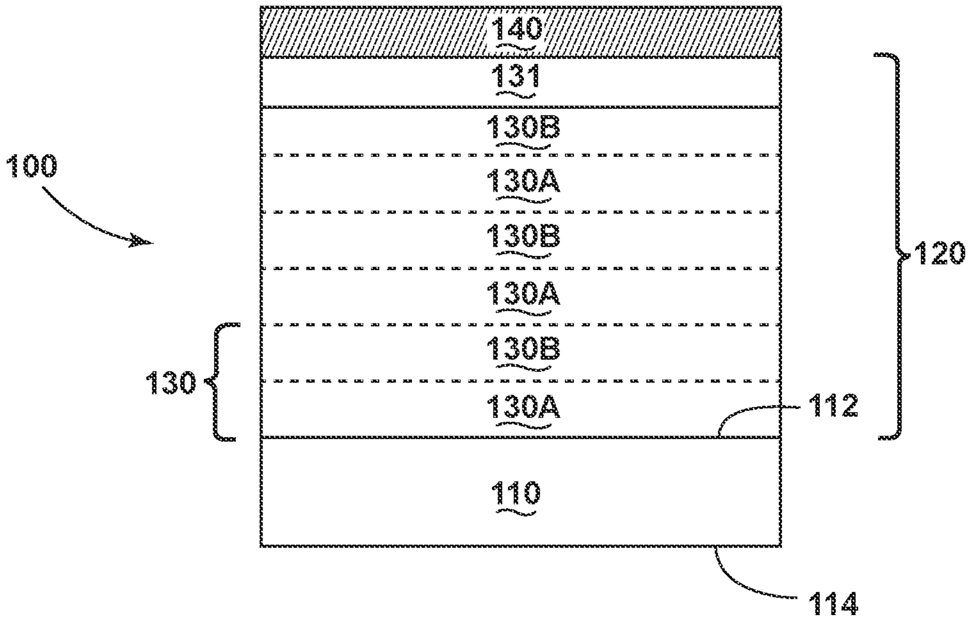
FIG. 3 is a side view of an article, according to one or more embodiments.

The article 100 (e.g., as shown in exemplary form in FIGS. 2A-2C) may include one or more additional coatings 140 disposed on the anti-reflective coating, as shown in FIG. 3. In one or more embodiments, the additional coating may include an easy-to-clean coating. An example of a suitable easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, which is incorporated herein in its entirety by reference. The easy-to-clean coating may have a physical thickness in the range from about 5 nm to about 50 nm and may include known materials, for example, fluorinated silanes. In some embodiments, the easy-to-clean coating may have a physical thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch resistant coating. Exemplary materials used in the scratch resistant coating may include an inorganic carbide, nitride, oxide, diamond-like material, or combination of these. Examples of suitable materials for the scratch resistant coating include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch resistant coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

In some embodiments, the additional coating 140 includes a combination of easy-to-clean material and scratch resistant material. In one example, the combination includes an easy-to-clean material and diamond-like carbon. Such additional coatings 140 may have a physical thickness in the range from about 5 nm to about 20 nm. The constituents of the additional coating 140 may be provided in separate layers. For example, the diamond-like carbon material may be disposed as a first layer and the easy-to-clean material can be disposed as a second layer on the first layer of diamond-like carbon. The physical thicknesses of the first layer and the second layer may be in the ranges provided above for the additional coating. For example, the first layer of diamond-like carbon may have a physical thickness of about 1 nm to about 20 nm or from about 4 nm to about 15 nm (or more specifically about 10 nm) and the second layer of the easy-to-clean material may have a physical thickness of about 1 nm to about 10 nm (or more specifically about 6 nm). The diamond-like coating may include tetrahedral amorphous carbon (Ta—C), Ta—C:H, and/or Ta—C—H.

A further aspect of this disclosure pertains to a method for forming the articles 100 described herein (e.g., as shown in FIGS. 1-3). In some embodiments, the method includes providing a substrate having a major surface in a coating chamber, forming a vacuum in the coating chamber, forming a durable anti-reflective coating having a physical thickness of about 500 nm or less on the major surface, optionally forming an additional coating comprising at least one of an easy-to-clean coating and a scratch resistant coating, as situated on the anti-reflective coating, and removing the substrate from the coating chamber. In one or more embodiments, the anti-reflective coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The anti-reflective coating 120 (e.g., including layers 130A, 130B and capping layer 131) and/or the additional coating 140 may be formed using various deposition methods, for example, vacuum deposition techniques, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used for example spraying or slot coating. Where vacuum deposition is utilized, inline processes may be used to form the anti-reflective coating 120 and/or the additional coating 140 in one deposition run. In some instances, the vacuum deposition can be made by a linear PECVD source. In some implementations of the method, and articles 100 made according to the method, the anti-reflective coating 120 can be prepared using a sputtering process (e.g., a reactive sputtering process), chemical vapor deposition (CVD) process, plasma-enhanced chemical vapor deposition process, or some combination of these processes. In one implementation, an anti-reflective coating 120 comprising low RI layer(s) 130A, high RI layer(s) 130B and capping layer 131 can be prepared according to a reactive sputtering process. According to some embodiments, the anti-reflective coating 120 (including low RI layer 130A, high RI layer 130B and capping layer 131) of the article 100 is fabricated using a metal-mode, reactive sputtering in a rotary drum coater. The reactive sputtering process conditions were defined through careful experimentation to achieve the desired combinations of hardness, refractive index, optical transparency, low color and controlled film stress.

In some embodiments, the method may include controlling the physical thickness of the anti-reflective coating 120 (e.g., including its low RI layer(s) 130A, high RI layer(s) 130B and capping layer 131) and/or the additional coating 140 so that it does not vary by more than about 4% along about 80% or more of the area of the anti-reflective surface 122 or from the target physical thickness for each layer at any point along the substrate area. In some embodiments, the physical thickness of the anti-reflective layer coating 120 and/or the additional coating 140 is controlled so that it does not vary by more than about 4% along about 95% or more of the area of the anti-reflective surface 122.

Figure 4A:
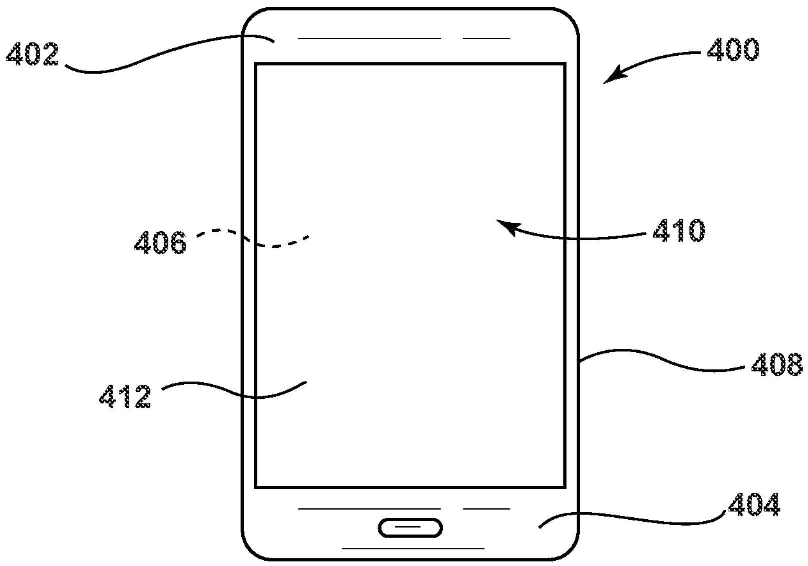
FIG. 4A is a plan view of an exemplary electronic device incorporating any of the articles disclosed herein.
Figure 4B:
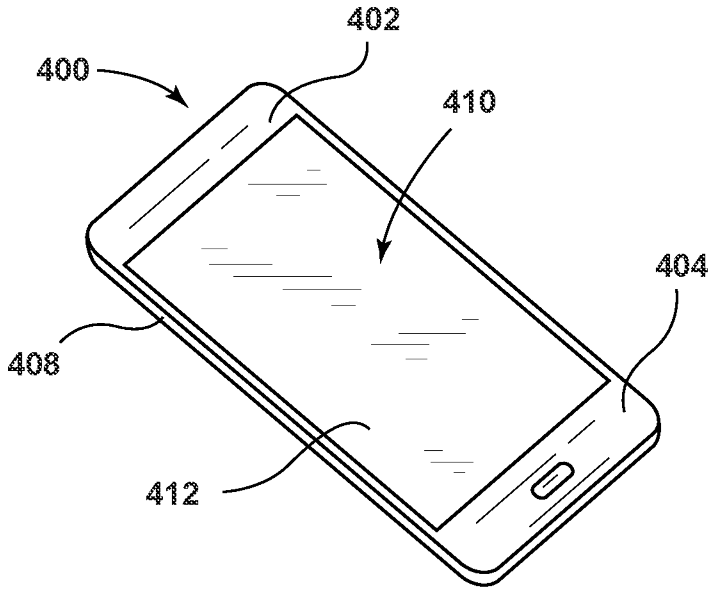
FIG. 4B is a perspective view of the exemplary electronic device of FIG. 4A.

The articles 100 disclosed herein (e.g., as shown in FIGS. 1-3) may be incorporated into a device article, for example, a device article with a display (or display device articles) and one or more cameras and/or sensors (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. As noted earlier, these display devices can include a display that operates in the visible spectrum and one or more sensors and/or cameras that operate primarily in the infrared spectrum. An exemplary device article incorporating any of the articles disclosed herein (e.g., as consistent with the articles 100 depicted in FIGS. 1-3) is shown in FIGS. 4A and 4B. Specifically, FIGS. 4A and 4B show a consumer electronic device 400 including a housing 402 having a front 404, a back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In some embodiments, the cover substrate 412 may include any of the articles disclosed herein. In some embodiments, at least one of a portion of the housing or the cover glass comprises the articles disclosed herein.

Figure 5:
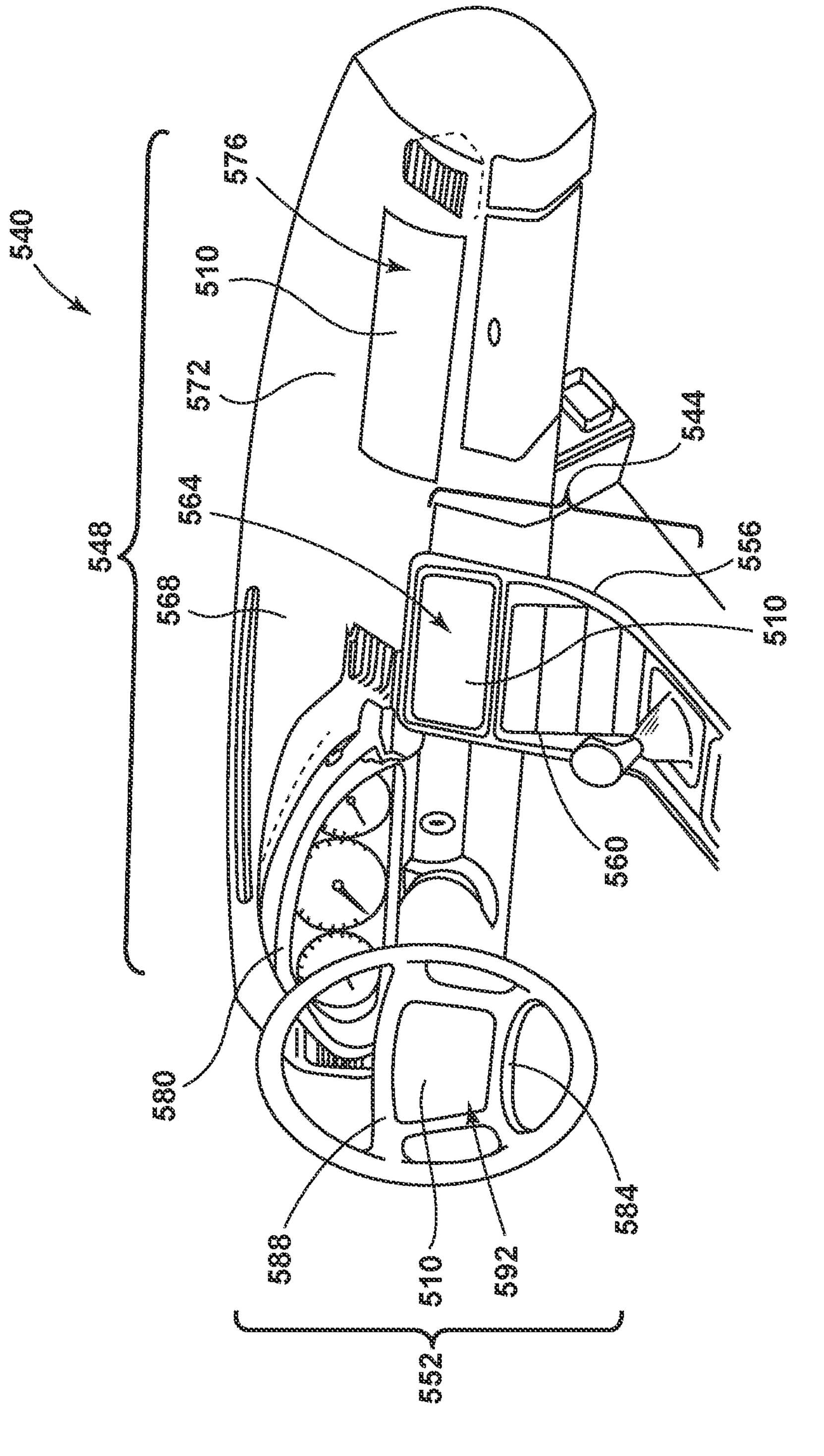
FIG. 5 is a perspective view of a vehicle interior with vehicular interior systems that may incorporate any of the articles disclosed herein.

According to some embodiments, the articles 100 (e.g., as shown in FIGS. 1-3) may be incorporated within a vehicle interior with vehicular interior systems, as depicted in FIG. 5. More particularly, the article 100 may be used in conjunction with a variety of vehicle interior systems. A vehicle interior 540 is depicted that includes three different examples of a vehicle interior system 544, 548, 552. Vehicle interior system 544 includes a center console base 556 with a surface 560 including a display 564. Vehicle interior system 548 includes a dashboard base 568 with a surface 572 including a display 576. The dashboard base 568 typically includes an instrument panel 580 which may also include a display. Vehicle interior system 552 includes a dashboard steering wheel base 584 with a surface 588 and a display 592. In one or more examples, the vehicle interior system may include a base that is an armrest, a pillar, a seat back, a floor board, a headrest, a door panel, or any portion of the interior of a vehicle that includes a surface. It will be understood that the article 100 described herein can be used interchangeably in each of vehicle interior systems 544, 548 and 552.

According to some embodiments, the articles 100 (e.g., as shown in FIGS. 1-3) may be used in a passive optical element, for example a lens, windows, lighting covers, eyeglasses, or sunglasses, that may or may not be integrated with an electronic display or electrically active device.

EXAMPLES

Various embodiments will be further clarified by the following examples.

Example 1

The as-fabricated samples of Example 1A ("Ex. 1A") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2A and listed in Table 1A. Modeled samples ("Ex. 1B" and "Ex. 1C") were assumed to possess the same glass substrate composition of Ex. 1A, and assumed to possess the anti-reflective coating structure listed in Tables 1B and 1C, respectively. The anti-reflective coating (e.g., as consistent with the anti-reflective coatings 120 outlined in the disclosure) of each of the samples of Ex. 1A was deposited using a reactive sputtering process according to the methods of the disclosure; and the anti-reflective coating of Exs. 1B and 1C was assumed to be deposited using a reactive sputtering process according to the methods of the disclosure.

TABLE 1A

Anti-reflective coating attributes for Ex. 1A

| Reference No. (see FIG. 2A) | Material | Refractive Index (@ 550 nm) | Extinction Coefficient (@ 550 nm) | Thickness (nm) |
|---|---|---|---|---|
| N/A | Air | 1 | 0 | |
| 131 | $SiO_2$ | 1.471 | 0 | 94.6 |
| 130B | $SiN_x$ | 2.028 | 0.00057 | 158.5 |
| 130A | $SiO_2$ | 1.456 | 0 | 37.2 |
| 130B | $SiN_x$ | 2.041 | 0.00057 | 23.1 |
| 130A | $SiO_2$ | 1.449 | 0 | 25.0 |
| 110 | Glass substrate | 1.508 | 0 | |
| Total thickness | | | | 338.4 |
| Total thickness % of high RI layers 130B | | | | 181.6/338.4 = 53.7% |

TABLE 1B

Anti-reflective coating attributes for Ex. 1B

| Reference No. (see FIG. 2A) | Material | Refractive Index (@ 550 nm) | Thickness (nm) |
|---|---|---|---|
| N/A | Air | 1 | |
| 131 | $SiO_2$ | 1.477 | 87.7 |
| 130B | $SiN_x$ | 2.041 | 135.0 |
| 130A | $SiO_2$ | 1.477 | 38.6 |
| 130B | $SiN_x$ | 2.041 | 15.2 |
| 130A | $SiO_2$ | 1.477 | 25.0 |
| 110 | Glass substrate | 1.506 | |
| Total thickness | | | 301.48 |
| Total thickness % of high RI layers 130B | | | 150.2/301.48 = 49.8% |

TABLE 1C

Anti-reflective coating attributes for Ex. 1C

| Reference No. (see FIG. 2A) | Material | Refractive Index (@ 550 nm) | Thickness (nm) |
|---|---|---|---|
| N/A | Air | 1 | |
| 131 | $SiO_2$ | 1.465 | 90.4 |
| 130B | $SiN_x$ | 2.043 | 128.0 |
| 130A | $SiO_2$ | 1.465 | 37.8 |
| 130B | $SiN_x$ | 2.043 | 14.4 |
| 130A | $SiO_2$ | 1.465 | 25.0 |
| 110 | Glass substrate | 1.506 | |
| Total thickness | | | 295.5 |
| Total thickness % of high RI layers 130B | | | 142.4/295.5 = 48.2% |

Figure 6:
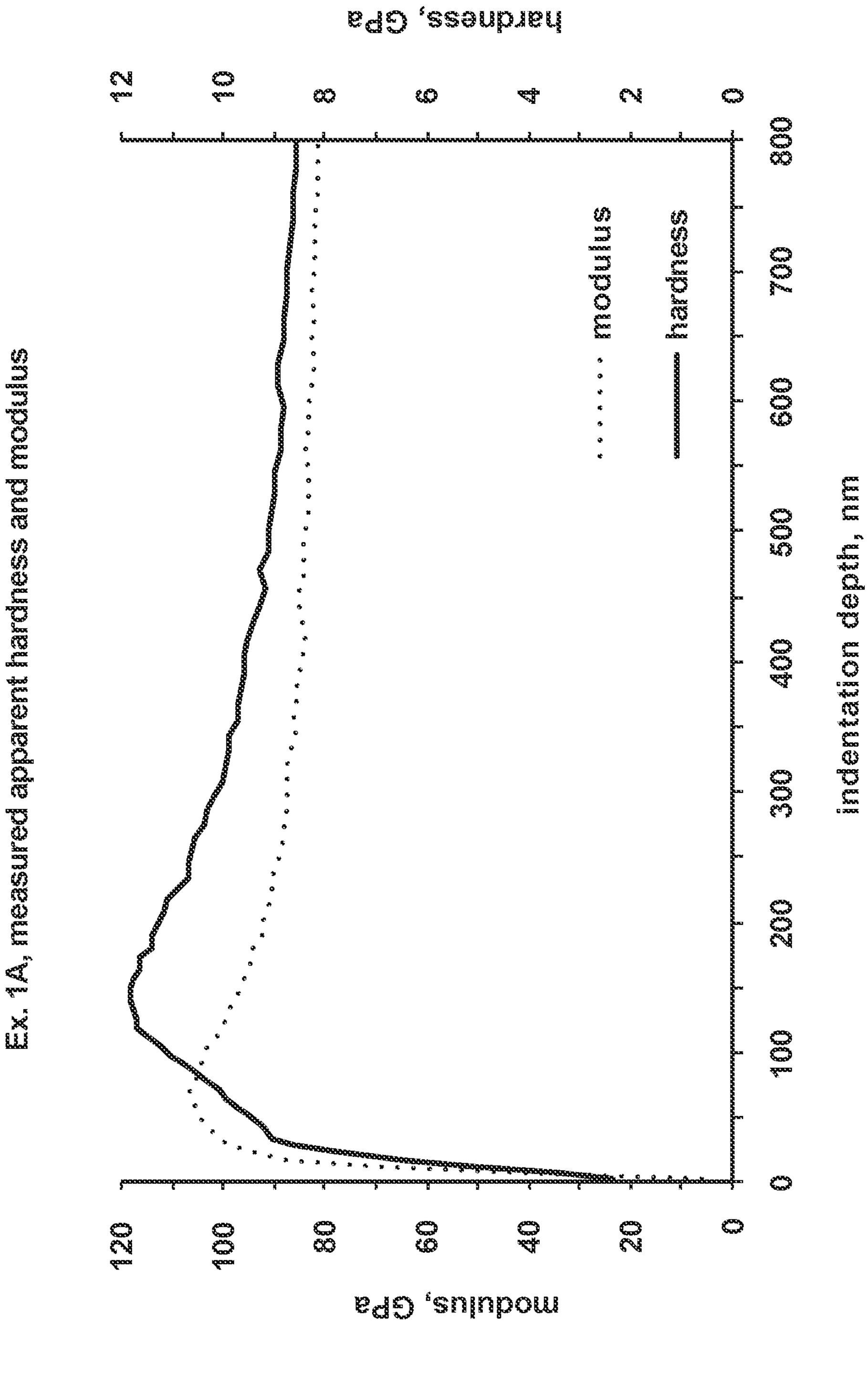
FIG. 6 is a plot of hardness and modulus vs. indentation depth for articles disclosed herein.

Referring now to FIG. 6, a plot of hardness (GPa) and elastic modulus (GPa) vs. indentation depth (nm) for the as-fabricated articles of Ex. 1A is provided. The data shown in FIG. 6 was generated by employing a Berkovich Indenter Hardness Test, as outlined earlier in this disclosure. As is evident from FIG. 6, the maximum hardness of 11.8 GPa is observed at an indentation depth from 140 to 160 nm.

Referring now to Tables 2A-2C below, optical properties were measured on the samples of this Example (i.e. Exs. 1A-1C) and reported in these tables. In Tables 2A-2C, reflectance and transmittance values are reported as polarization averages, that is, average values combining both s- and p-polarization values into a single average. Photopic averages (Y), L*, a*, and b* values were calculated from measured sample data using known methods according to the CIE 1964 standards with 10° observer and D65 illuminant. These create weighted values according to the human eye's response to visible light. Specular reflectance was measured in an angular range of +/−2.5 degrees using an Agilent Cary 5000 UV-Vis-NIR spectrophotometer. $1^{st}$-surface reflectance values were obtained by using an index matching oil to couple the back surface of the glass sample to a light absorber.

TABLE 2A

Optical properties for display article with antireflective coating of Ex. 1A

| $1^{st}$-surface Reflectance % average | 6 ° | 20 ° | 40 ° | 45 ° | 60 ° |
|---|---|---|---|---|---|
| R % (photopic, Y) | 0.71 | 0.69 | 1.12 | 1.53 | 5.30 |
| R % (840-860 nm) | 1.37 | 1.50 | 2.41 | 3.02 | 7.48 |
| R % (930-950 nm) | 2.17 | 2.49 | 4.08 | 4.92 | 10.02 |
| **1st-surface Reflected Lightness and Color metrics** | **6 °** | **20 °** | **40 °** | **45 °** | **60 °** |
| L* | 6.43 | 6.27 | 9.97 | 12.77 | 27.56 |
| a* | −2.72 | −2.54 | 3.85 | 5.27 | 5.27 |
| b* | −1.16 | 1.48 | 3.27 | 2.95 | 2.83 |

| 2-surface Transmitted light metrics, coating on 1 surface only | 0 ° |
|---|---|
| T % (photopic, Y) | 94.51 |
| T % (840-860 nm) | 93.89 |
| T % (930-950 nm) | 93.15 |

TABLE 2A-continued

| Optical properties for display article with antireflective coating of Ex. 1A | |
|---|---|
| L* | 97.84 |
| a* | 0.06 |
| b* | 0.46 |

TABLE 2B

Optical properties for display article with antireflective coating of Ex. 1B

| 1$^{st}$-surface Reflectance % average | 6 ° | 20 ° | 40 ° | 45 ° | 60 ° |
|---|---|---|---|---|---|
| R % (photopic, Y) | 0.80 | 0.82 | 1.30 | 1.70 | 5.24 |
| R % (840-860 nm) | 2.99 | 3.44 | 5.55 | 6.55 | 12.39 |
| R % (930-950 nm) | 5.97 | 6.55 | 8.99 | 10.08 | 15.97 |

| 1st-surface Reflected Lightness and Color metrics | 8 ° | 20 ° | 40 ° | 45 ° | 60 ° |
|---|---|---|---|---|---|
| L* | 7.22 | 7.41 | 11.28 | 13.81 | 27.41 |
| a* | −2.80 | −2.40 | −2.50 | −2.65 | −2.46 |
| b* | −1.87 | 1.87 | 2.66 | 2.63 | 1.45 |

| 2-surface Transmitted light metrics, coating on 1 surface only | 0 ° |
|---|---|
| T % (photopic, Y) | 95.10 |
| T % (840-860 nm) | 93.15 |
| T % (930-950 nm) | 90.40 |
| L* | 98.07 |
| a* | 0.12 |
| b* | −0.01 |

TABLE 2C

Optical properties for display article with antireflective coating of Ex. 1C

| 1$^{st}$-surface Reflectance % average | 6 ° | 20 ° | 40 ° | 45 ° | 60 ° |
|---|---|---|---|---|---|
| R % (photopic, Y) | 0.68 | 0.65 | 0.92 | 1.24 | 4.42 |
| R % (840-860 nm) | 3.80 | 4.33 | 6.66 | 7.72 | 13.70 |
| R % (930-950 nm) | 7.04 | 7.64 | 10.14 | 11.22 | 17.03 |

| 1st-surface Reflected Lightness and Color metrics | 8 ° | 20 ° | 40 ° | 45 ° | 60 ° |
|---|---|---|---|---|---|
| L* | 6.14 | 5.83 | 8.32 | 10.82 | 25.01 |
| a* | −4.26 | −3.88 | −3.86 | −3.39 | −1.58 |
| b* | −4.41 | −4.30 | −2.81 | −2.17 | −1.49 |

| 2-surface Transmitted light metrics, coating on 1 surface only | 0 ° |
|---|---|
| T % (photopic, Y) | 95.13 |
| T % (840-860 nm) | 92.43 |
| T % (930-950 nm) | 89.45 |
| L* | 98.09 |
| a* | 0.14 |
| b* | 0.40 |

Figure 7A:
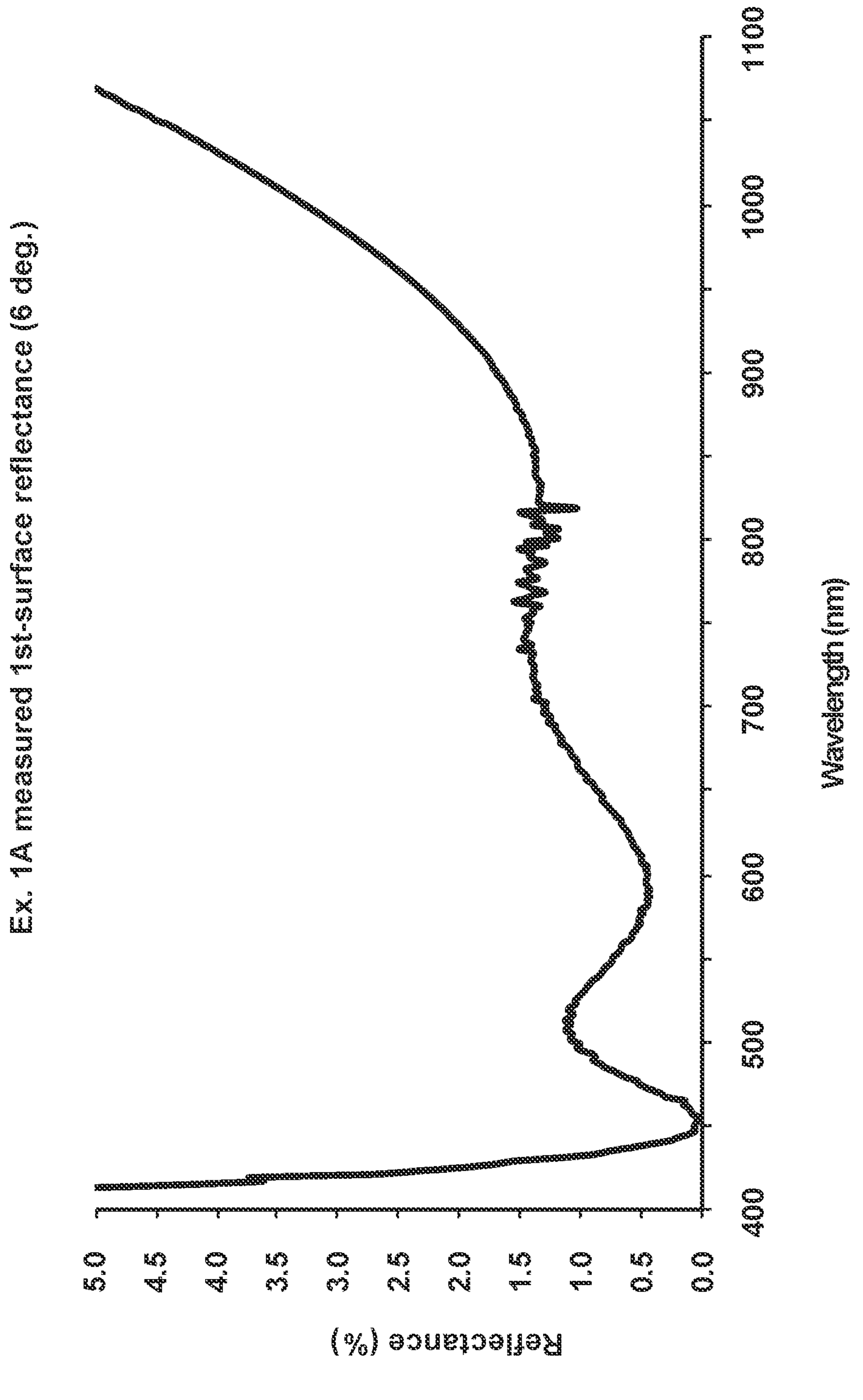
FIG. 7A is a plot of first-surface reflectance vs. wavelength at 6° incidence for an article disclose herein.

Referring now to FIG. 7A, a plot is provided of first-surface reflectance (%) vs. wavelength (nm) at 6° incidence for the Ex. 1A samples in this example. As is evident from this figure, Ex. 1A exhibits a visible photopic average first-surface reflectance of 0.71%. Ex. 1A also exhibits a first-surface reflectance at IR wavelengths of 850 nm of less than 1.5% and at 940 nm of less than 2.5%.

Figure 7B:
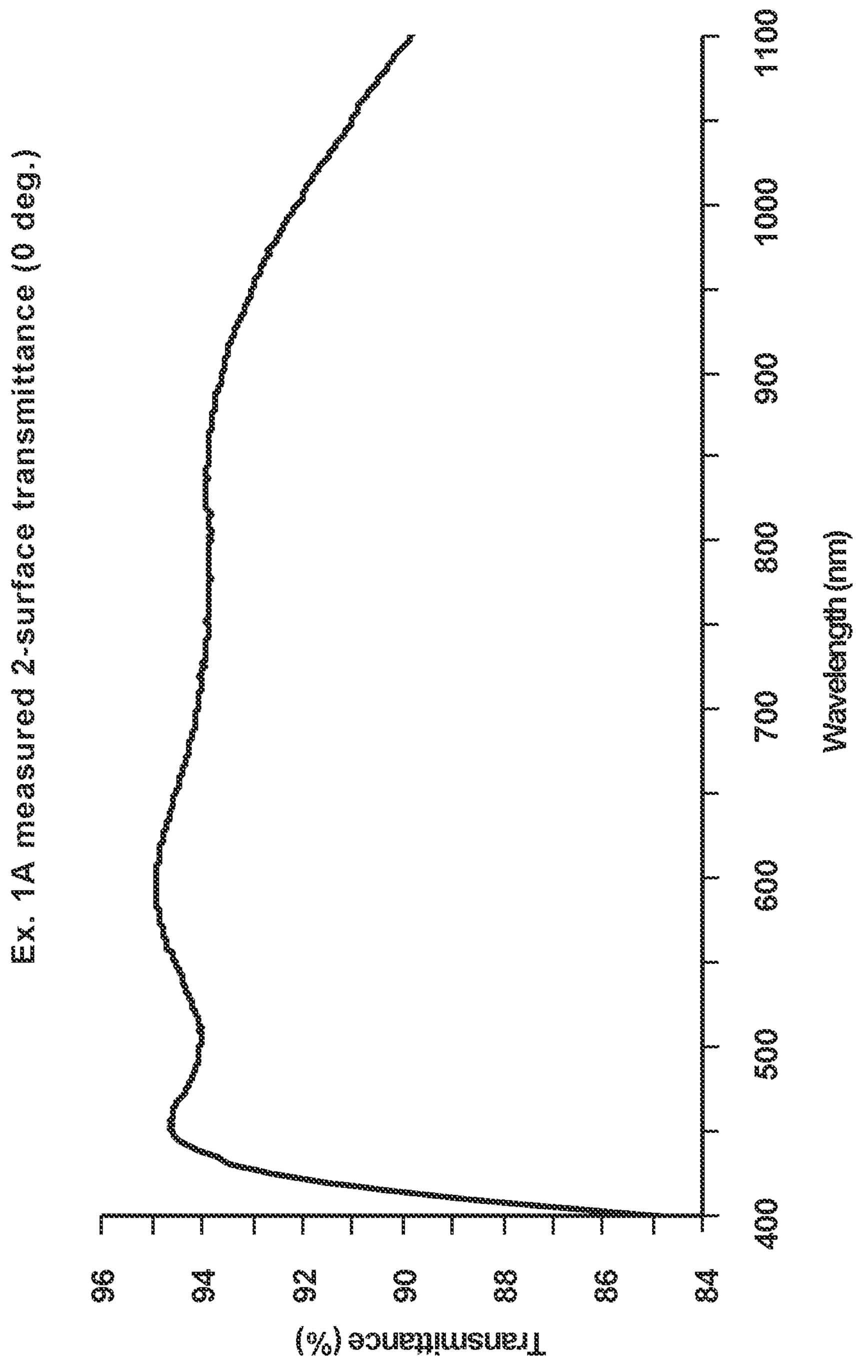
FIG. 7B is a plot of two-surface transmittance vs. wavelength at 0° incidence for an article disclosed herein.

Referring now to FIG. 7B, a plot is provided of two-surface transmittance (%) vs. wavelength (nm) at 0° incidence for the Ex. 1A samples in this example. One side of these samples includes the antireflective coating of Ex. 1A (see Table 1A), and the other side is bare glass. The bare glass surface has ~4% reflectance, thus limiting the maximum transmittance of this sample to about 96%. Visible photopic average transmittance for the Ex. 1A samples is 94.51%. Also, transmittance for the Ex. 1A samples at 850 nm is greater than 93.5% and at 940 nm is greater than 92.5%.

Figure 7C:
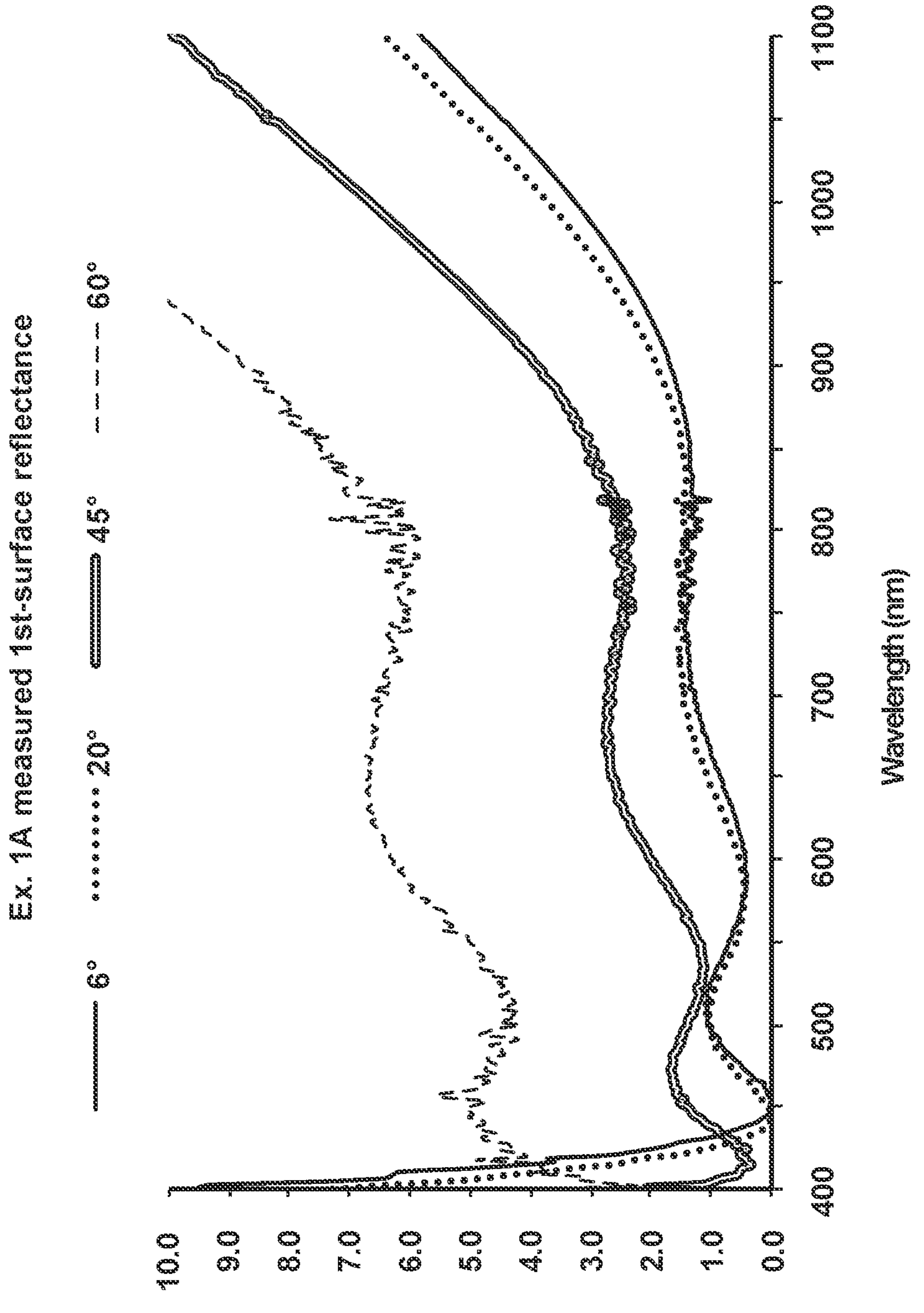
FIG. 7C is a plot of first-surface reflectance vs. wavelength at 6°, 20°, 45° and 60° incidence for an article disclosed herein.

Referring now to FIG. 7C, a plot is provided of first-surface reflectance (%) vs. wavelength (nm) at 6°, 20°, 45° and 60° incidence for the Ex. 1A samples in this example. The reflectance over the entire wavelength range from 425 to 950 nm remains below 3.0% for angles of incidence from 0° to 20°. The reflectance over the entire wavelength range from 425 nm to 950 nm remains below 5.5% for all angles of incidence from 0° to 45°.

Figure 8A:
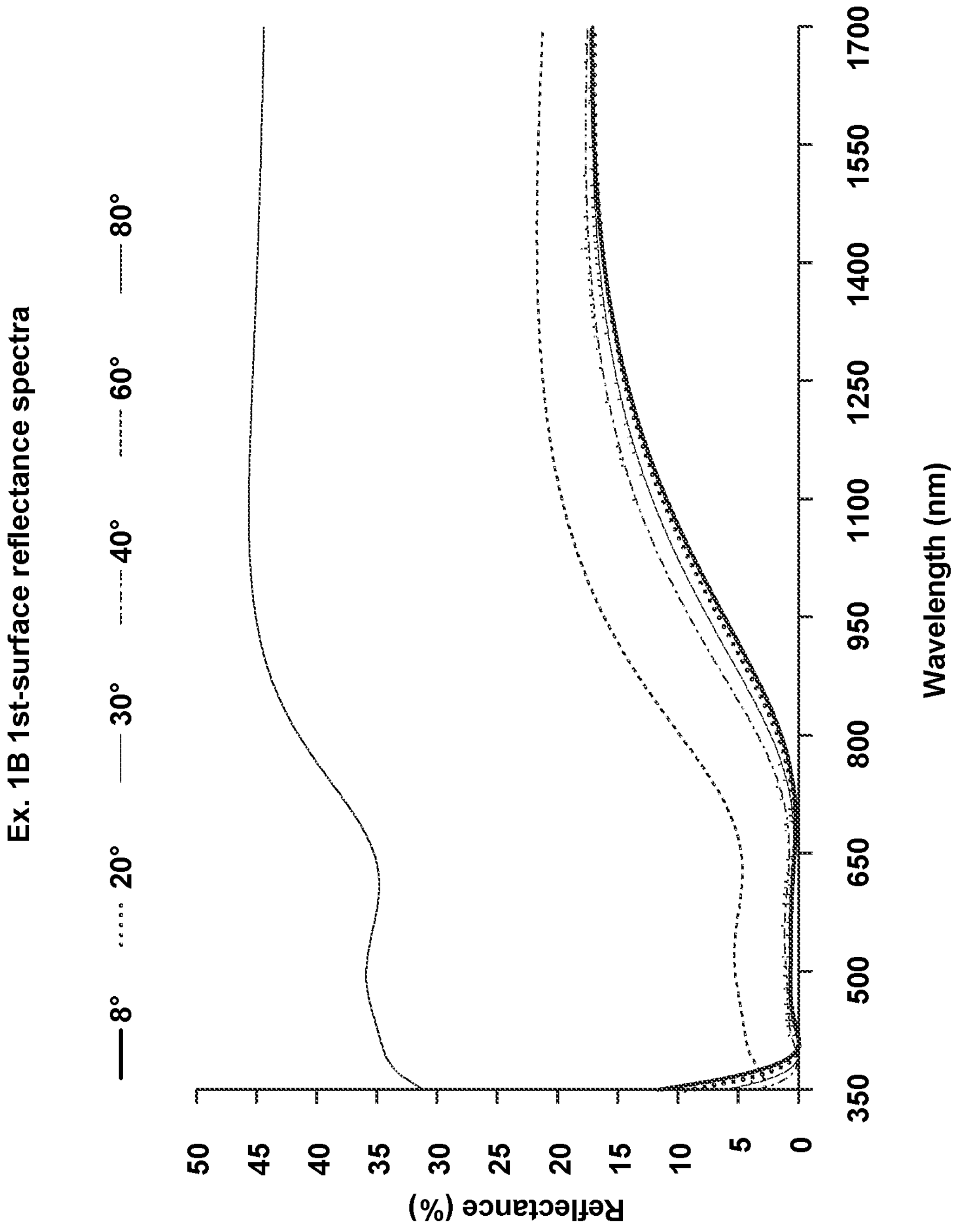
FIG. 8A is a plot of first-surface reflectance vs. wavelength at from 8° to 80° incidence for an article disclosed herein.

Referring now to FIG. 8A, a plot is provided of first-surface reflectance (%) vs. wavelength (nm) at from 8° to 80° incidence for the Ex. 1B samples in this example. The reflectance over the entire wavelength range from 425 to 950 nm remains below 3.0% for angles of incidence from 0° to 20°. The reflectance over the entire wavelength range from 425 nm to 950 nm remains below 5.5% for all angles of incidence from 0° to 20°.

Figure 8B:
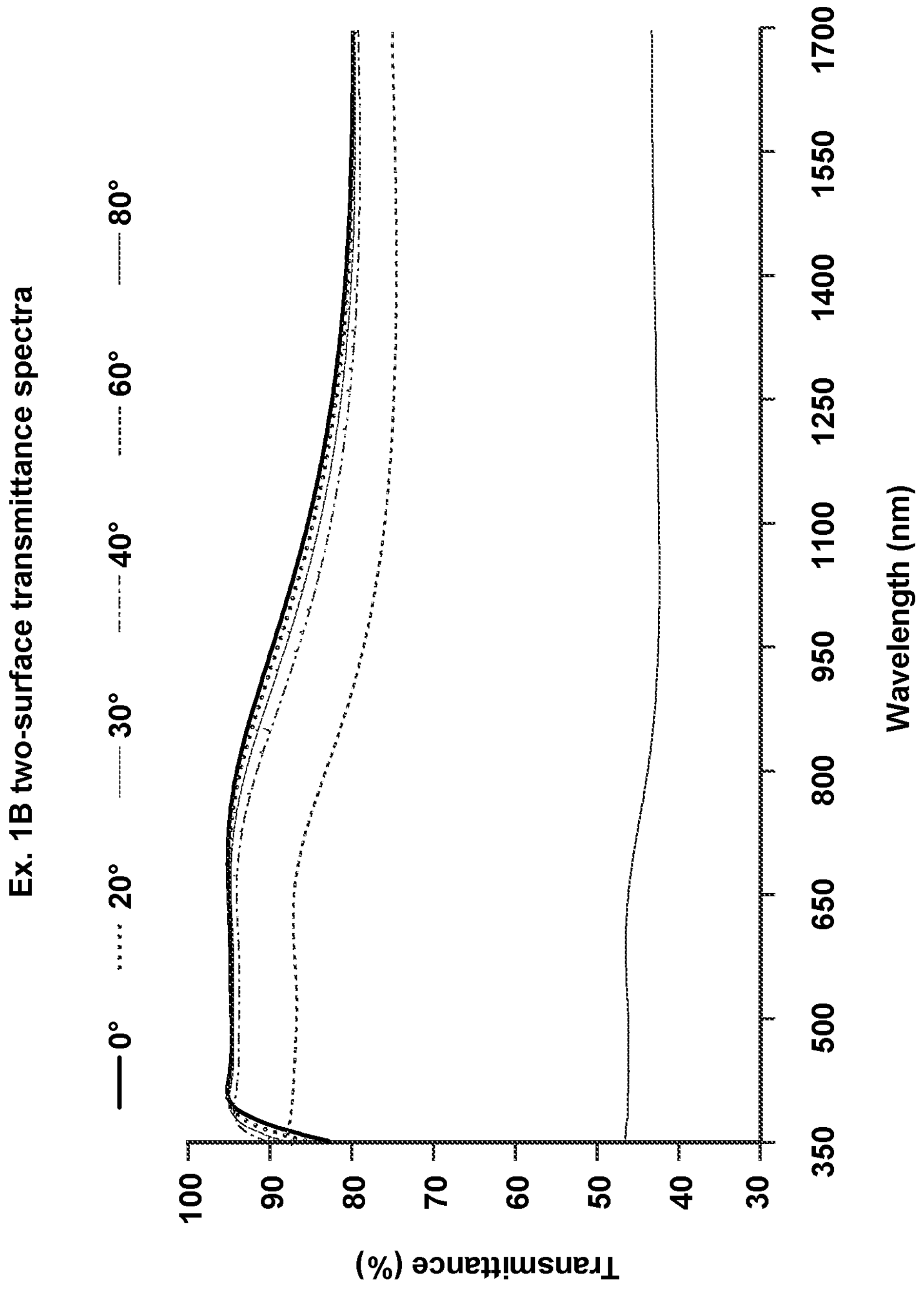
FIG. 8B is a plot of two-surface transmittance vs. wavelength at from 8° to 80° incidence for an article disclosed herein.

Referring now to FIG. 8B, a plot is provided of two-surface transmittance (%) vs. wavelength (nm) at from 8° to 80° incidence for the Ex. 1B samples of this example. One side of these samples includes the antireflective coating of Ex. 1B (see Table 1B), and the other side is bare glass. The bare glass surface has ~4% reflectance, thus limiting the maximum transmittance of this sample to about 96%. Visible photopic average transmittance for the Ex. 1B samples is 95.10%. Also, transmittance for the Ex. 1B samples from 840 to 860 nm is 93.15% and from 930 to 950 nm is 90.40%.

Figure 8C:
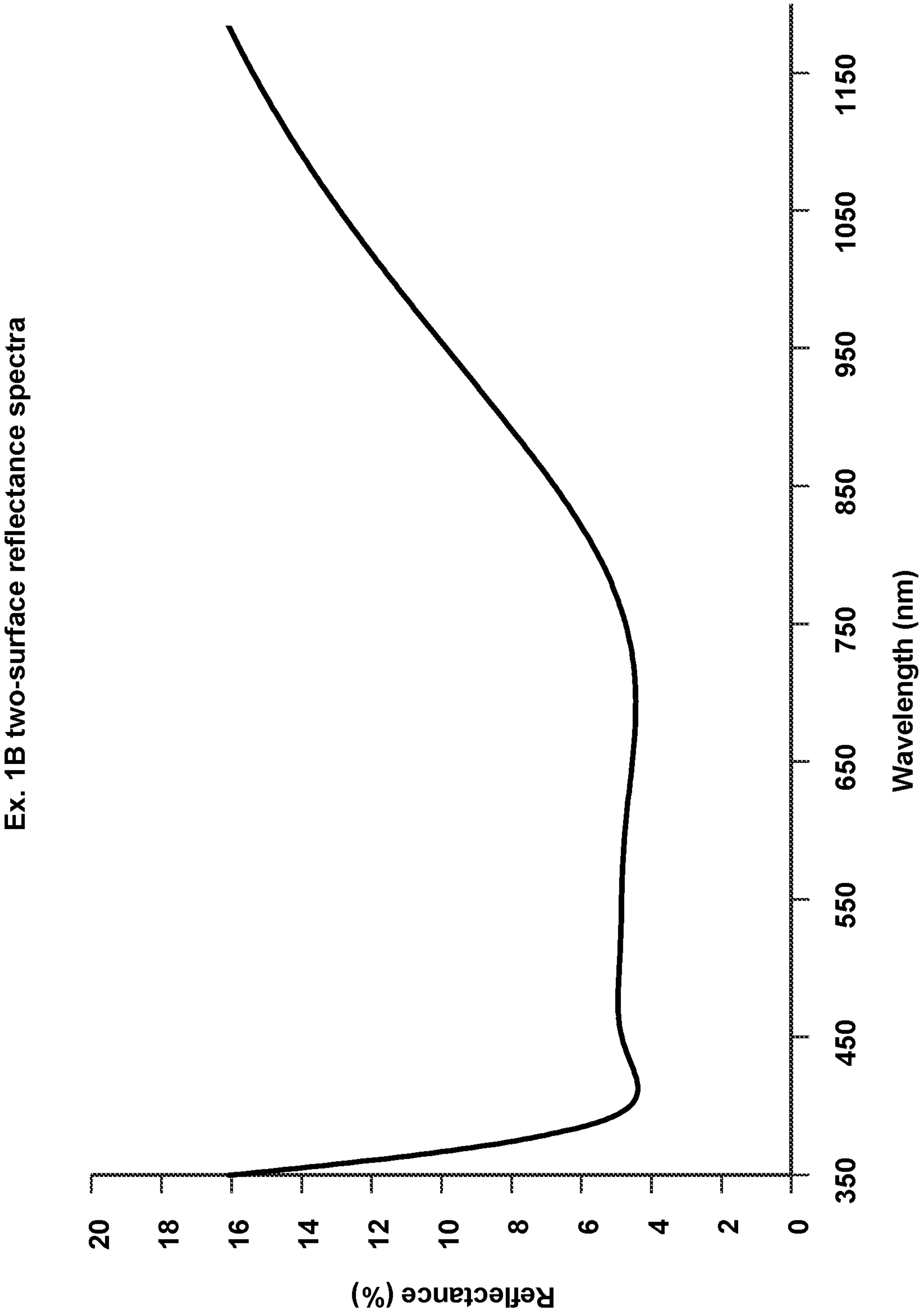
FIG. 8C is a plot of two-surface reflectance vs. wavelength at 8° incidence for an article disclosed herein.

Referring now to FIG. 8C, a plot is provided of two-surface reflectance (%) vs. wavelength (nm) at 8° incidence for the Ex. 1B samples of this example. As is evident from this figure, the two-surface reflectance levels of Ex. 1B remain below 5% from 450 nm to 750 nm.

Figure 8D:
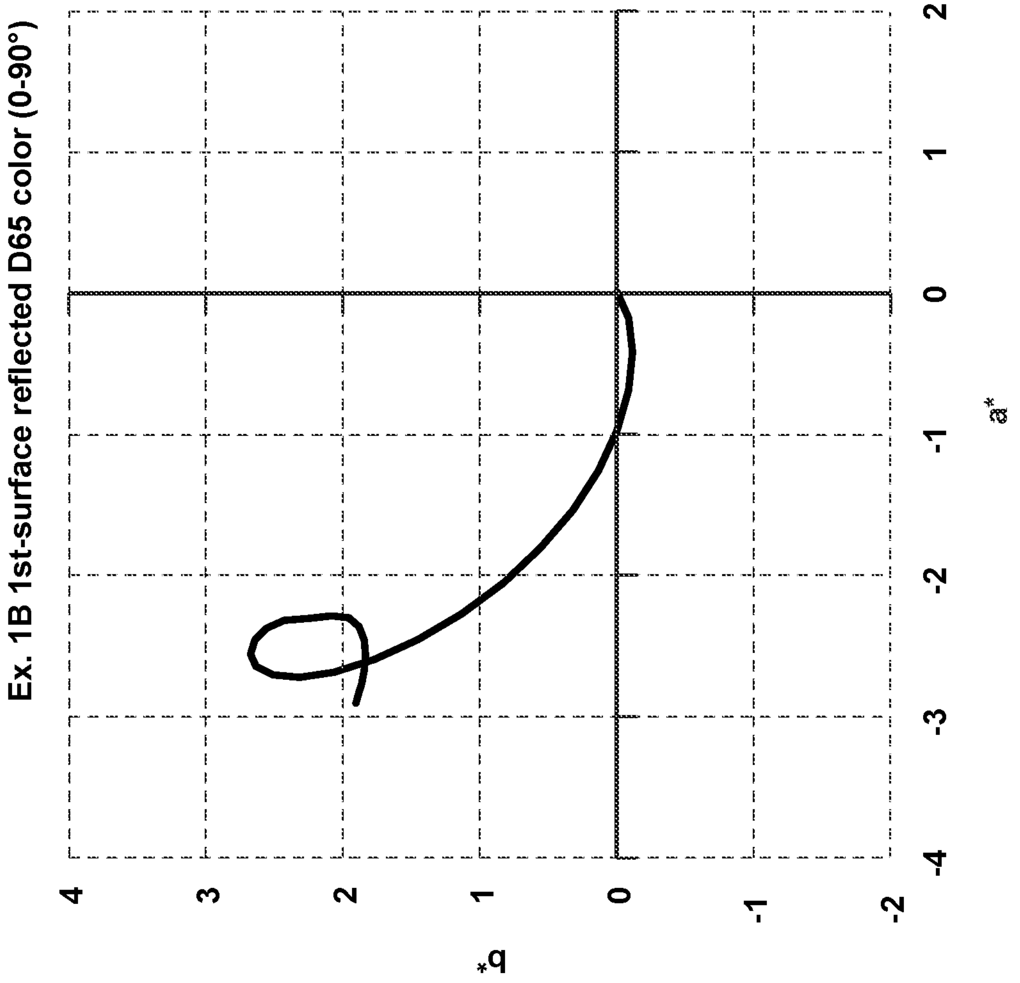
FIG. 8D is a plot of first-surface reflected color under a D65 illuminant at from 0°-90° incidence for an article disclosed herein.

Referring now to FIG. 8D, a plot is provided of first-surface reflected color under a D65 illuminant at from 0°-90° incidence for the Ex. 1B samples of this example. As is evident from this figure, a* is greater than −3 and b* is less than +3 for all angles of incidence from 0°-90°.

Figure 9A:
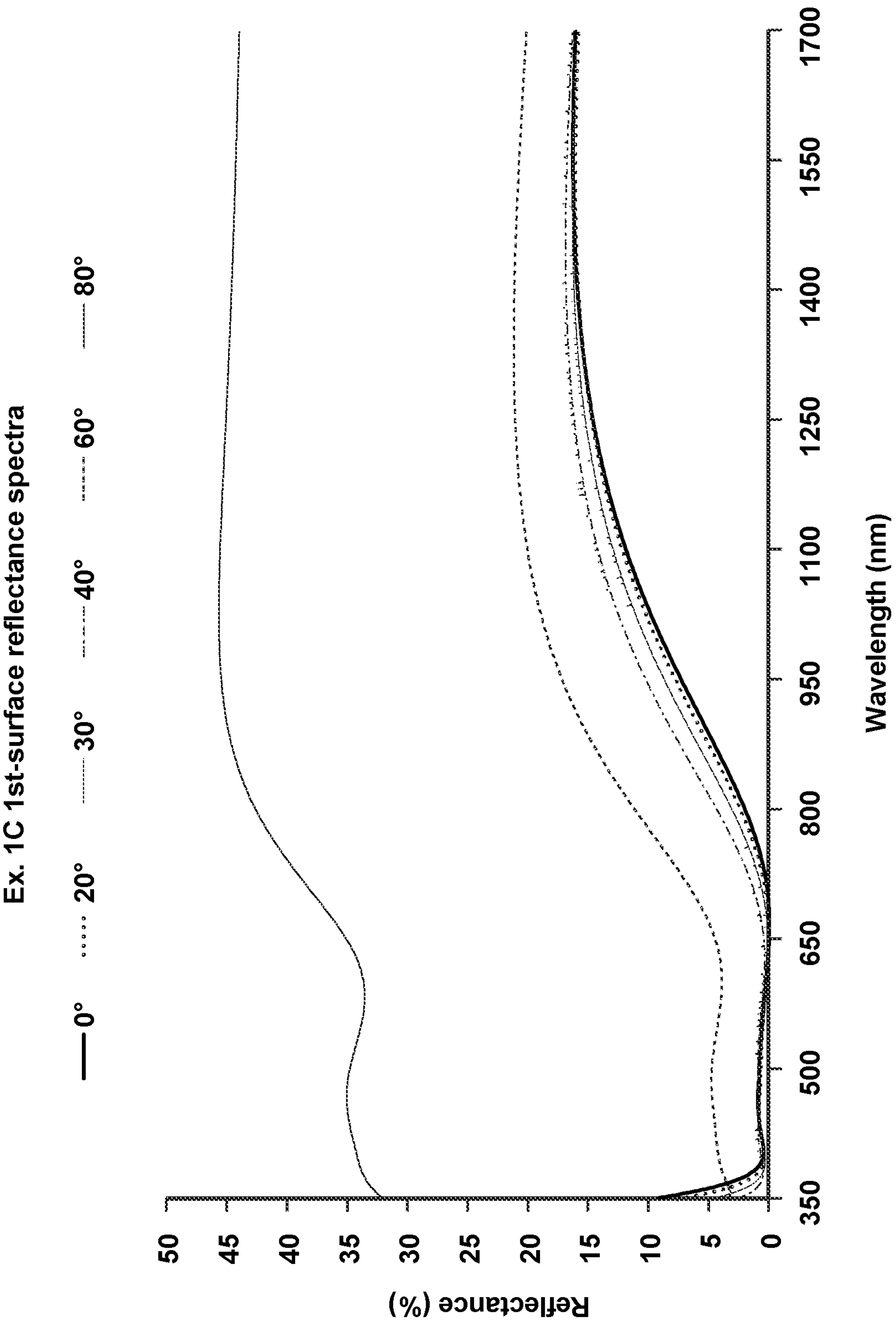
FIG. 9A is a plot of first-surface reflectance vs. wavelength at from 8° to 80° incidence for an article disclosed herein.

Referring now to FIG. 9A, a plot is provided of first-surface reflectance (%) vs. wavelength (nm) at from 8° to 80° incidence for the Ex. 1C samples in this example. The reflectance over the entire wavelength range from 425 to about 825 nm remains below 3.0% for angles of incidence from 0° to 20°. The reflectance over the entire wavelength range from 425 nm to 950 nm remains below about 8% for all angles of incidence from 0° to 20°.

Figure 9B:
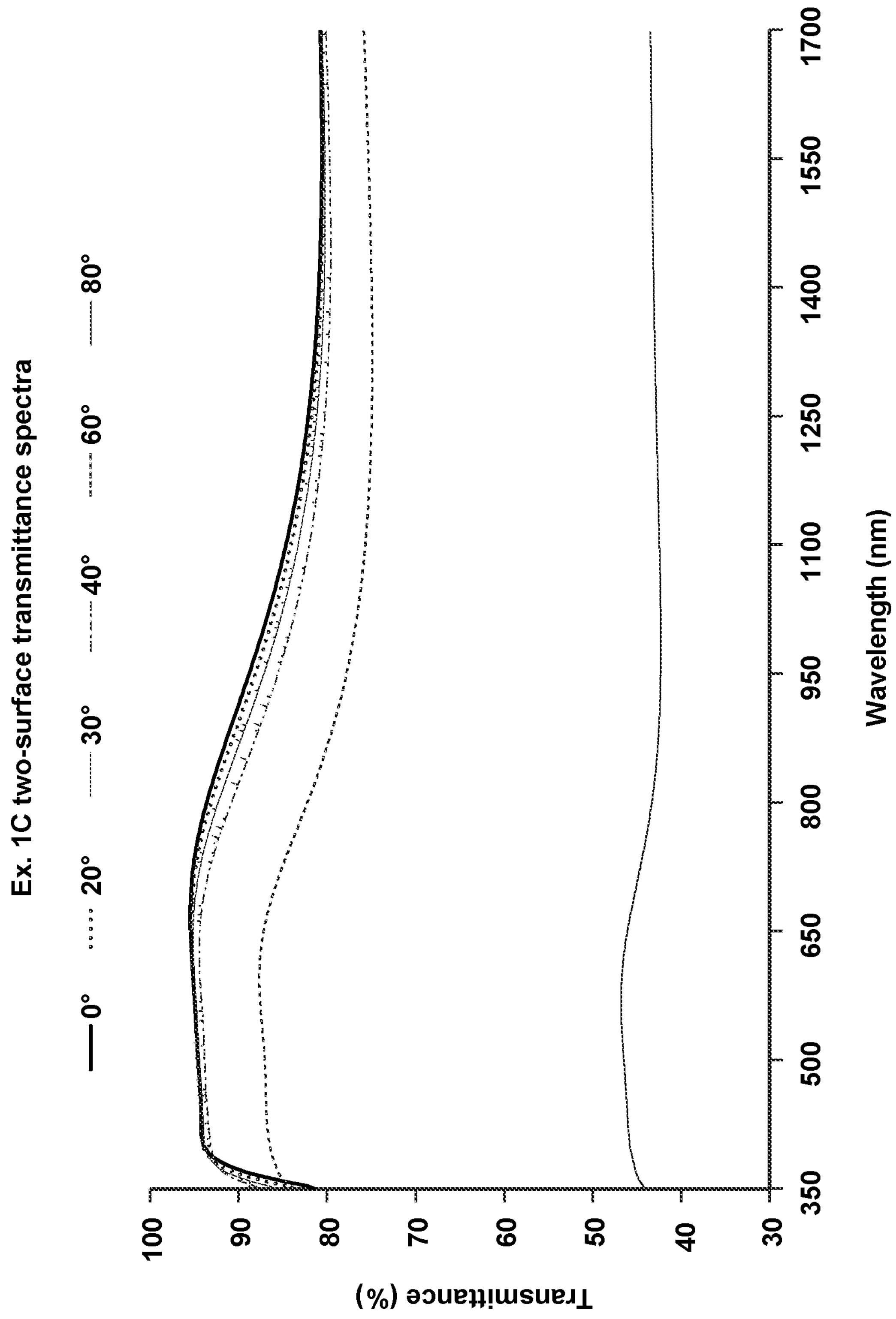
FIG. 9B is a plot of two-surface transmittance vs. wavelength at from 8° to 80° incidence for an article disclosed herein.

Referring now to FIG. 9B, a plot is provided of two-surface transmittance (%) vs. wavelength (nm) at from 8° to 80° incidence for the Ex. 1C samples of this example. One side of these samples includes the antireflective coating of Ex. 1C (see Table 1C), and the other side is bare glass. The bare glass surface has ~4% reflectance, thus limiting the maximum transmittance of this sample to about 96%. Visible photopic average transmittance for the Ex. 1C samples is 95.13%. Also, transmittance for the Ex. 1C samples from 840 to 860 nm is 92.43% and from 930 to 950 nm is 89.45%.

Figure 9C:
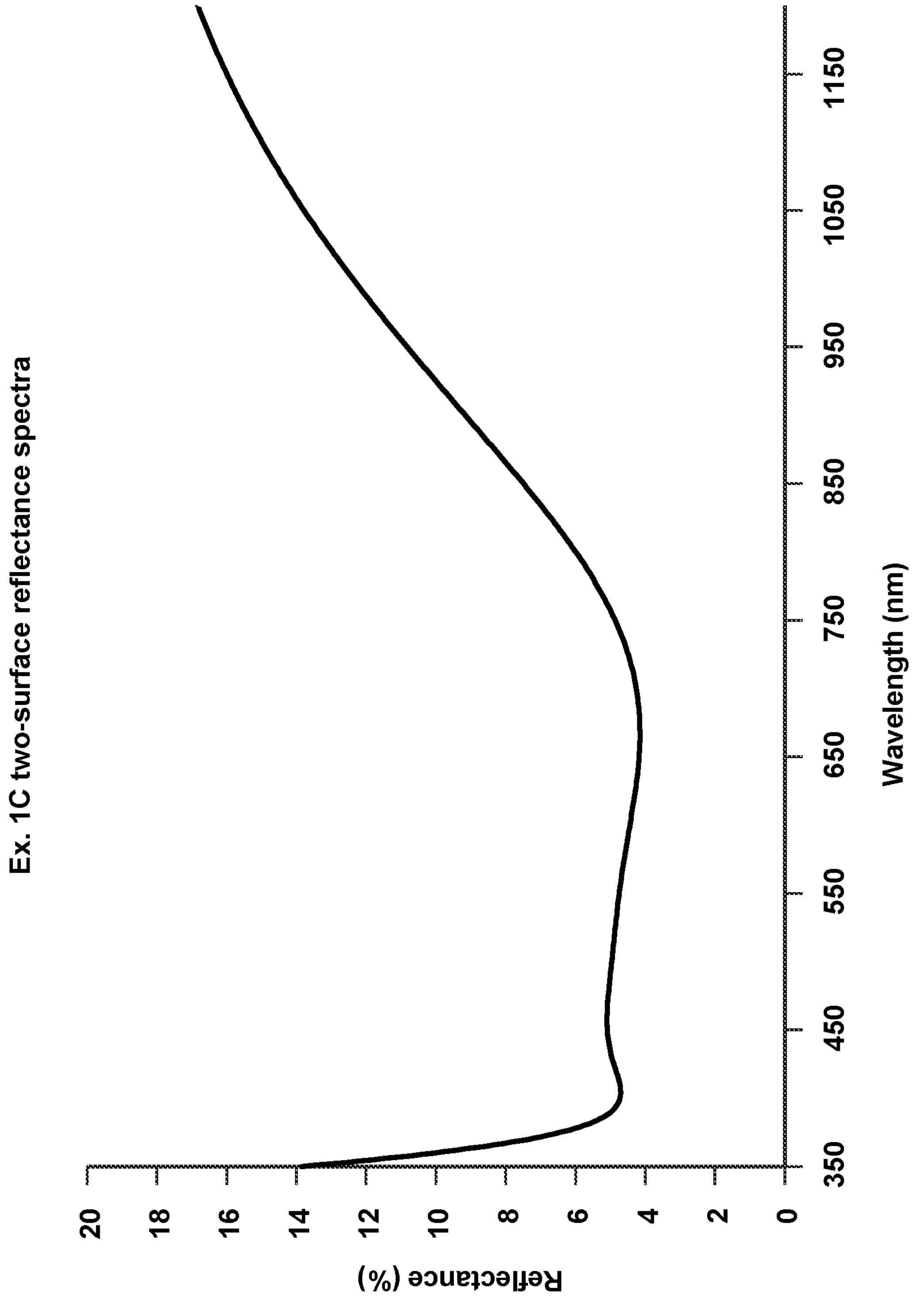
FIG. 9C is a plot of two-surface reflectance vs. wavelength at 8° incidence for an article disclosed herein.

Referring now to FIG. 9C, a plot is provided of two-surface reflectance (%) vs. wavelength (nm) at 8° incidence for the Ex. 1C samples of this example. As is evident from this figure, the two-surface reflectance levels of Ex. 1C remain below 5% from 450 nm to 750 nm.

Figure 9D:
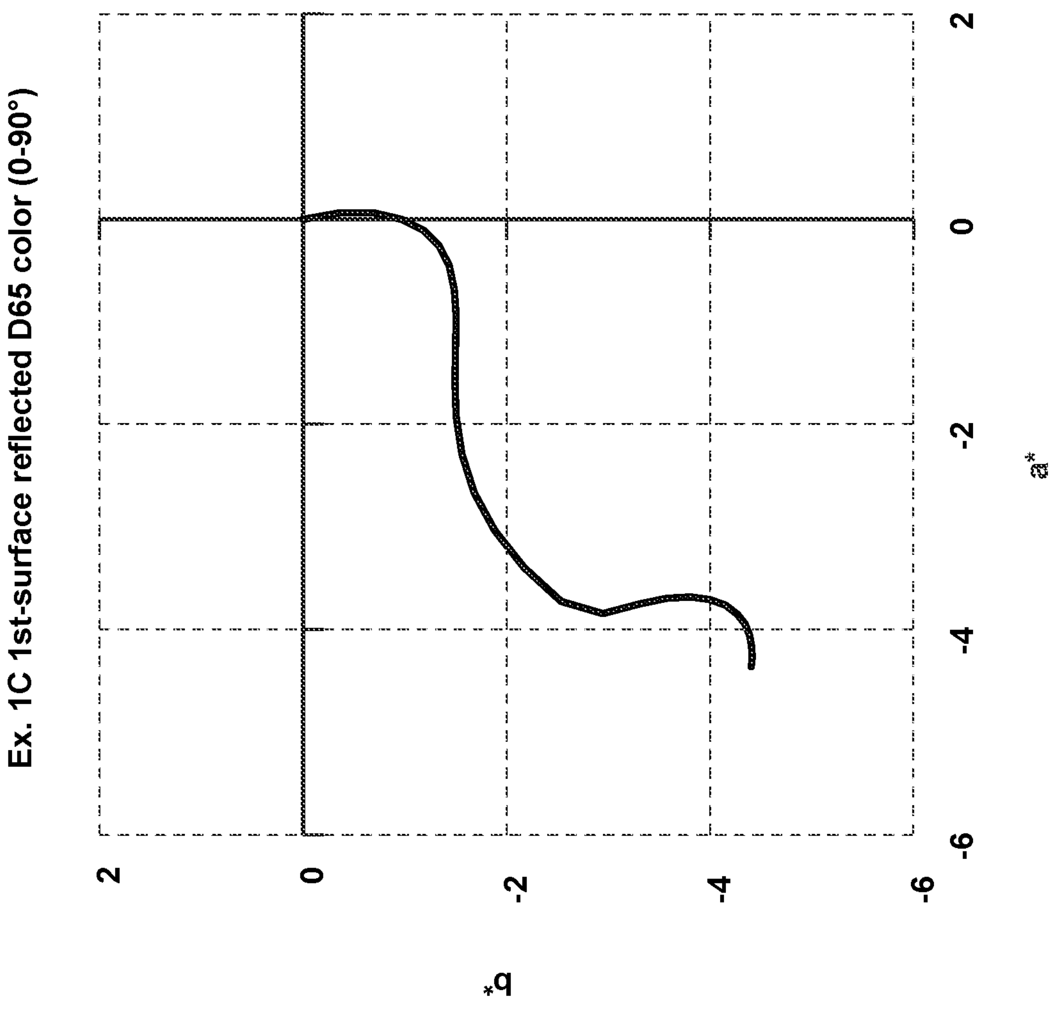
FIG. 9D is a plot of first-surface reflected color under a D65 illuminant at from 0°-90° incidence for an article disclosed herein.

Referring now to FIG. 9D, a plot is provided of first-surface reflected color under a D65 illuminant at from 0°-90° incidence for the Ex. 1C samples of this example. As is evident from this figure, a* is greater than or equal to about −4 and b* is greater than or equal to about −4 for all angles of incidence from 0°-90°.

Embodiment 1. An article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. Further, the article exhibits a two-side average transmittance that is greater than 85% at infrared wavelengths from 840 nm to 860 nm and greater than 85% at infrared wavelengths from 930 nm to 950 nm at 0° incidence.

Embodiment 2. The article of Embodiment 1 is provided, wherein the article exhibits a maximum hardness of 10 GPa or greater measured over an indentation depth of about 50 nm or greater.

Embodiment 3. The article of Embodiment 1 or Embodiment 2 is provided, wherein the article exhibits a single-side average reflectance that is less than 1.5% at infrared wavelengths from 840 nm to 860 nm and less than 3% at infrared wavelengths from 930 nm to 950 nm at 6° incidence.

Embodiment 4. The article of any one of Embodiments 1-3 is provided, wherein the article exhibits a two-side average transmittance that is greater than 92% at infrared wavelengths from 840 nm to 860 nm and greater than 89% at infrared wavelengths from 930 nm to 950 nm at 0° incidence.

Embodiment 5. The article of any one of Embodiments 1~4 is provided, wherein the article exhibits a single-side photopic average reflectance that is less than 1% at 6° incidence and 20° incidence and a two-surface photopic average transmittance of greater than 93% at 0° incidence.

Embodiment 6. The article of any one of Embodiments 1-5 is provided, wherein the article exhibits a first-surface reflected color ($\sqrt{(a^{*2}+b^{*2})}$) of less than 5 at 6° and 20° incidence, a first-surface reflected color ($\sqrt{(a^{*2}+b^{*2})}$) of less than 10 for all angles from 0° to 60° incidence, and a two-surface transmitted color ($\sqrt{(a^{*2}+b^{*2})}$) of less than 2 at 0° incidence.

Embodiment 7. The article of any one of Embodiments 1-6 is provided, wherein the substrate is a glass substrate or a glass-ceramic substrate.

Embodiment 8. The article of any one of Embodiments 1-7 is provided, wherein the capping low RI layer and the plurality of alternating high RI and low RI layers total five (5) layers to (7) layers.

Embodiment 9. The article of any one of Embodiments 1-8 is provided, wherein the optical film structure comprises a physical thickness from 275 nm to 350 nm, each high RI layer is $SiN_x$, each low RI layer is $SiO_2$ and the capping low RI layer is $SiO_2$.

Embodiment 10. A consumer electronic product is provided which includes: a housing comprising a front surface, a back surface and side surfaces; electrical components at least partially within the housing, the electrical components comprising a controller, a memory, and a display, the display at or adjacent to the front surface of the housing; and a cover substrate disposed over the display. At least one of a portion of the housing or the cover substrate comprises the article of any one of Embodiments 1-9.

Embodiment 11. An article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. In addition, a combined physical thickness of the high RI layers is from about 40% to 60% of the physical thickness of the optical film structure. Further, the article exhibits a two-side average transmittance that is greater than 85% at infrared wavelengths from 840 nm to 860 nm and greater than 85% at infrared wavelengths from 930 nm to 950 nm at 0° incidence.

Embodiment 12. The article of Embodiment 11 is provided, wherein the article exhibits a maximum hardness of 10 GPa or greater measured over an indentation depth of about 50 nm or greater.

Embodiment 13. The article of Embodiment 11 or Embodiment 12 is provided, wherein the article exhibits a single-side average reflectance that is less than 1.5% at infrared wavelengths from 840 nm to 860 nm and less than 3% at infrared wavelengths from 930 nm to 950 nm at 6° incidence.

Embodiment 14. The article of any one of Embodiments 11-13 is provided, wherein the article exhibits a two-side average transmittance that is greater than 89% at infrared wavelengths from 840 nm to 860 nm and greater than 92% at infrared wavelengths from 930 nm to 950 nm at 0° incidence.

Embodiment 15. The article of any one of Embodiments 11-14 is provided, wherein the article exhibits a single-side photopic average reflectance that is less than 1% at 6° incidence and 20° incidence and a two-surface photopic average transmittance of greater than 93% at 0° incidence.

Embodiment 16. The article of any one of Embodiments 11-15 is provided, wherein the article exhibits a first-surface reflected color ($\sqrt{(a^{*2}+b^{*2})}$) of less than 5 at 6° and 20° incidence, a first-surface reflected color ($\sqrt{(a^{*2}+b^{*2})}$) of less than 10 for all angles from 0° to 60° incidence, and a two-surface transmitted color ($\sqrt{(a^{*2}+b^{*2})}$) of less than 2 at 0° incidence.

Embodiment 17. The article of any one of Embodiments 11-16 is provided, wherein the substrate is a glass substrate or a glass-ceramic substrate.

Embodiment 18. The article of any one of Embodiments 11-17 is provided, wherein the capping low RI layer and the plurality of alternating high RI and low RI layers total five (5) layers to (7) layers.

Embodiment 19. The article of any one of Embodiments 11-18 is provided, wherein the optical film structure comprises a physical thickness from 275 nm to 350 nm, each high RI layer is $SiN_x$, each low RI layer is $SiO_2$ and the capping low RI layer is $SiO_2$.

Embodiment 20. The article of any one of Embodiments 11-19 is provided, wherein the combined physical thickness of the high RI layers is from about 45% to 55% of the physical thickness of the optical film structure.

Embodiment 21. A consumer electronic product is provided which includes: a housing comprising a front surface, a back surface and side surfaces; electrical components at least partially within the housing, the electrical components comprising a controller, a memory, and a display, the display at or adjacent to the front surface of the housing; and a cover substrate disposed over the display. At least one of a portion of the housing or the cover substrate comprises the article of any one of Embodiments 11-20.

Embodiment 22. An article is provided that includes: a substrate having opposing major surfaces including a first major surface and a second major surface; and an optical film structure in direct contact with the first major surface of the substrate, the optical film structure comprising a physical thickness from about 50 nm to less than 500 nm, a plurality of alternating high refractive index (RI) and low RI layers with a first low RI layer directly on and in contact with the first major surface, and a capping low RI layer. The capping low RI layer and the plurality of alternating high RI and low RI layers total three (3) layers to nine (9) layers, wherein each low RI layer and the capping low RI layer comprises a silicon-containing oxide and each high RI layer comprises a silicon-containing nitride or a silicon-containing oxynitride. The article exhibits a maximum hardness of 8 GPa or greater measured over an indentation depth of about 50 nm or greater, the maximum hardness measured by a Berkovich Indenter Hardness Test. In addition, the thickest high RI layer has a physical thickness from 120 nm to 180 nm, the first low RI layer directly on and in contact with the first major surface has a physical thickness from 15 nm to 35 nm, and the capping low RI layer has a thickness from 80 nm to 100 nm. Further, the article exhibits a two-side average transmittance that is greater than 85% at infrared wavelengths from 840 nm to 860 nm and greater than 85% at infrared wavelengths from 930 nm to 950 nm at 0° incidence.

Embodiment 23. The article of Embodiment 22 is provided, wherein the article exhibits a maximum hardness of 10 GPa or greater measured over an indentation depth of about 50 nm or greater.

Embodiment 24. The article of Embodiment 22 or Embodiment 23 is provided, wherein the article exhibits a single-side average reflectance that is less than 1.5% at infrared wavelengths from 840 nm to 860 nm and less than 3% at infrared wavelengths from 930 nm to 950 nm at 6° incidence.

Embodiment 25. The article of any one of Embodiments 22-24 is provided, wherein the article exhibits a two-side average transmittance that is greater than 89% at infrared wavelengths from 840 nm to 860 nm and greater than 92% at infrared wavelengths from 930 nm to 950 nm at 0° incidence.

Embodiment 26. The article of any one of Embodiments 22-25 is provided, wherein the article exhibits a single-side photopic average reflectance that is less than 1% at 6° incidence and 20° incidence and a two-surface photopic average transmittance of greater than 93% at 0° incidence.

Embodiment 27. The article of any one of Embodiments 22-26 is provided, wherein the article exhibits a first-surface reflected color ($\sqrt{(a^{*2}+b^{*2})}$) of less than 5 at 6° and 20° incidence, a first-surface reflected color ($\sqrt{(a^{*2}+b^{*2})}$) of less than 10 for all angles from 0° to 60° incidence, and a two-surface transmitted color ($\sqrt{(a^{*2}+b^{*2})}$) of less than 2 at 0° incidence.

Embodiment 28. The article of any one of Embodiments 22-27 is provided, wherein the substrate is a glass substrate or a glass-ceramic substrate.

Embodiment 29. The article of any one of Embodiments 22-28 is provided, wherein the capping low RI layer and the plurality of alternating high RI and low RI layers total five (5) layers to (7) layers.

Embodiment 30. The article of any one of Embodiments 22-29 is provided, wherein the optical film structure comprises a physical thickness from 275 nm to 350 nm, each high RI layer is $SiN_x$, each low RI layer is $SiO_2$ and the capping low RI layer is $SiO_2$.

Embodiment 31. The article of any one of Embodiments 22-30 is provided, wherein the thickest high RI layer has a physical thickness from 125 nm to 160 nm, the first low RI layer directly on and in contact with the first major surface has a physical thickness from 20 nm to 30 nm, and the capping low RI layer has a thickness from 85 nm to 95 nm.

Embodiment 32. A consumer electronic product is provided which includes: a housing comprising a front surface, a back surface and side surfaces; electrical components at least partially within the housing, the electrical components comprising a controller, a memory, and a display, the display at or adjacent to the front surface of the housing; and a cover substrate disposed over the display. At least one of a portion of the housing or the cover substrate comprises the article of any one of Embodiments 22-31.

Many variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

What is claimed is:

1. An article comprising:

a substrate comprising opposing major surfaces including a first major surface and a second major surface; and an optical film structure in direct contact with the first major surface of the substrate, the optical film structure comprising a plurality of alternating high refractive index (RI) and low RI layers with a first low RI layer directly on and in contact with the first major surface, and a capping low RI layer, wherein the capping low RI layer and the plurality of alternating high RI and low RI layers total five (5) layers to nine (9) layers, wherein each low RI layer and the capping low RI layer comprises a silicon-containing oxide and each high RI layer is $SiN_x$, wherein two or more of the high RI layers of the optical film structure have different physical thicknesses and the thickest high RI layer of the optical film structure has a physical thickness from 120 nm to 180 nm, wherein the optical film structure comprises a physical thickness from 275 nm to 350 nm, each low RI layer is $SiO_2$ and the capping low RI layer is $SiO_2$, wherein the article exhibits a maximum hardness of 8 GPa or greater measured over an indentation depth of about 50 nm or greater, the maximum hardness measured by a Berkovich Indenter Hardness Test, and further wherein the article exhibits a two-side average transmittance that is greater than 89% at infrared wavelengths from 930 nm to 950 nm at 0° incidence.

2. The article of claim 1, wherein the article exhibits a single-side average reflectance that is less than 1.5% at infrared wavelengths from 840 nm to 860 nm and less than 3% at infrared wavelengths from 930 nm to 950 nm at 6° incidence.

3. The article of claim 1, wherein the article exhibits a two-side average transmittance that is greater than 92% at infrared wavelengths from 840 nm to 860 nm and greater than 89% at infrared wavelengths from 930 nm to 950 nm at 0° incidence.

4. The article of claim 1, wherein the substrate is a glass substrate or a glass-ceramic substrate.

5. A consumer electronic product, comprising:

a housing comprising a front surface, a back surface and side surfaces;

electrical components at least partially within the housing, the electrical components comprising a controller, a memory, and a display, the display at or adjacent to the front surface of the housing; and a cover substrate disposed over the display, wherein at least one of a portion of the housing or the cover substrate comprises the article of claim 1.

6. The article of claim 1, wherein the thickest high RI layer has a physical thickness from 125 nm to 160 nm, wherein the optical film structure comprises a physical thickness from 300 nm to 350 nm, and further wherein the capping low RI layer and the plurality of alternating high RI and low RI layers total five (5) layers.

7. The article of claim 1, wherein the article exhibits a first-surface photopic average reflectance of 1% or less, as measured at 6 degrees incidence, and further wherein the article exhibits a first-surface reflected color of less than 10 for all angles of incidence of from 0 degrees to 60 degrees.

8. An article comprising:

a substrate comprising opposing major surfaces including a first major surface and a second major surface; and an optical film structure in direct contact with the first major surface of the substrate, the optical film structure comprising a plurality of alternating high refractive index (RI) and low RI layers with a first low RI layer directly on and in contact with the first major surface, and a capping low RI layer, wherein the capping low RI layer and the plurality of alternating high RI and low RI layers total five (5) layers to nine (9) layers, wherein each low RI layer and the capping low RI layer comprises a silicon-containing oxide and each high RI layer is $SiN_x$, wherein two or more of the high RI layers of the optical film structure have different physical thicknesses and the thickest high RI layer of the optical film structure has a physical thickness from 120 nm to 180 nm, wherein the optical film structure comprises a physical thickness from 275 nm to 350 nm, each low RI layer is $SiO_2$ and the capping low RI layer is $SiO_2$, wherein the article exhibits a maximum hardness of 8 GPa or greater measured over an indentation depth of about 50 nm or greater, the maximum hardness measured by a Berkovich Indenter Hardness Test, wherein a combined physical thickness of the high RI layers is from about 40% to 60% of the physical thickness of the optical film structure, and further wherein the article exhibits a two-side average transmittance that is greater than 89% at infrared wavelengths from 930 nm to 950 nm at 0° incidence.

9. The article of claim 8, wherein the article exhibits a single-side average reflectance that is less than 1.5% at infrared wavelengths from 840 nm to 860 nm and less than 3% at infrared wavelengths from 930 nm to 950 nm at 6° incidence.

10. The article of claim 8, wherein the article exhibits a two-side average transmittance that is greater than 89% at infrared wavelengths from 840 nm to 860 nm and greater than 92% at infrared wavelengths from 930 nm to 950 nm at 0° incidence.

11. The article of claim 8, wherein the substrate is a glass substrate or a glass-ceramic substrate.

12. The article of claim 8, wherein the combined physical thickness of the high RI layers is from about 45% to 55% of the physical thickness of the optical film structure.

13. A consumer electronic product, comprising:

a housing comprising a front surface, a back surface and side surfaces;

electrical components at least partially within the housing, the electrical components comprising a controller, a memory, and a display, the display at or adjacent to the front surface of the housing; and a cover substrate disposed over the display, wherein at least one of a portion of the housing or the cover substrate comprises the article of claim 8.

14. The article of claim 8, wherein the thickest high RI layer has a physical thickness from 125 nm to 160 nm, wherein the optical film structure comprises a physical thickness from 300 nm to 350 nm, and further wherein the capping low RI layer and the plurality of alternating high RI and low RI layers total five (5) layers.

15. The article of claim 8, wherein the article exhibits a first-surface photopic average reflectance of 1% or less, as measured at 6 degrees incidence, and further wherein the article exhibits a first-surface reflected color of less than 10 for all angles of incidence of from 0 degrees to 60 degrees.

16. An article comprising:

a substrate comprising opposing major surfaces including a first major surface and a second major surface; and an optical film structure in direct contact with the first major surface of the substrate, the optical film structure comprising a plurality of alternating high refractive index (RI) and low RI layers with a first low RI layer directly on and in contact with the first major surface, and a capping low RI layer, wherein the capping low RI layer and the plurality of alternating high RI and low RI layers total five (5) layers to nine (9) layers, wherein each low RI layer and the capping low RI layer comprises a silicon-containing oxide and each high RI layer is $SiN_x$, wherein two or more of the high RI layers of the optical film structure have different physical thicknesses and the thickest high RI layer of the optical film structure has a physical thickness from 120 nm to 180 nm, wherein the optical film structure comprises a physical thickness from 275 nm to 350 nm, each low RI layer is $SiO_2$ and the capping low RI layer is $SiO_2$, wherein the article exhibits a maximum hardness of 8 GPa or greater measured over an indentation depth of about 50 nm or greater, the maximum hardness measured by a Berkovich Indenter Hardness Test, wherein the first low RI layer directly on and in contact with the first major surface has a physical thickness from 15 nm to 35 nm, and the capping low RI layer has a thickness from 80 nm to 100 nm, and further wherein the article exhibits a two-side average transmittance that is greater than 89% at infrared wavelengths from 930 nm to 950 nm at 0° incidence.

17. The article of claim 16, wherein the article exhibits a single-side average reflectance that is less than 1.5% at infrared wavelengths from 840 nm to 860 nm and less than 3% at infrared wavelengths from 930 nm to 950 nm at 6° incidence.

18. The article of claim 16, wherein the article exhibits a two-side average transmittance that is greater than 89% at infrared wavelengths from 840 nm to 860 nm and greater than 92% at infrared wavelengths from 930 nm to 950 nm at 0° incidence.

19. The article of claim 16, wherein the substrate is a glass substrate or a glass-ceramic substrate.

20. The article of claim 16, wherein the thickest high RI layer has a physical thickness from 125 nm to 160 nm, the first low RI layer directly on and in contact with the first major surface has a physical thickness from 20 nm to 30 nm, and the capping low RI layer has a thickness from 85 nm to 95 nm.

21. A consumer electronic product, comprising:

a housing comprising a front surface, a back surface and side surfaces;

electrical components at least partially within the housing, the electrical components comprising a controller, a memory, and a display, the display at or adjacent to the front surface of the housing; and a cover substrate disposed over the display, wherein at least one of a portion of the housing or the cover substrate comprises the article of claim 16.

22. The article of claim 16, wherein the thickest high RI layer has a physical thickness from 125 nm to 160 nm, wherein the optical film structure comprises a physical thickness from 300 nm to 350 nm, and further wherein the capping low RI layer and the plurality of alternating high RI and low RI layers total five (5) layers.

23. The article of claim 16, wherein the article exhibits a first-surface photopic average reflectance of 1% or less, as measured at 6 degrees incidence, and further wherein the article exhibits a first-surface reflected color of less than 10 for all angles of incidence of from 0 degrees to 60 degrees.

* * * * *